(12) United States Patent
Odinak

(10) Patent No.: US 8,175,886 B2
(45) Date of Patent: *May 8, 2012

(54) DETERMINATION OF SIGNAL-PROCESSING APPROACH BASED ON SIGNAL DESTINATION CHARACTERISTICS

(75) Inventor: Gilad Odinak, Bellevue, WA (US)

(73) Assignee: Intellisist, Inc., Bellevue, WA (US)

( * ) Notice: Subject to any disclaimer, the term of this patent is extended or adjusted under 35 U.S.C. 154(b) by 1198 days.

This patent is subject to a terminal disclaimer.

(21) Appl. No.: 11/929,574

(22) Filed: Oct. 30, 2007

(65) Prior Publication Data

US 2008/0147410 A1 Jun. 19, 2008

Related U.S. Application Data

(63) Continuation of application No. 10/910,801, filed on Aug. 2, 2004, which is a continuation-in-part of (Continued)

(51) Int. Cl.
*G10L 21/00* (2006.01)
(52) U.S. Cl. .................................. 704/270.1
(58) Field of Classification Search ............... 704/270.1
See application file for complete search history.

(56) References Cited

U.S. PATENT DOCUMENTS 4,052,568 A 10/1977 Jankowski
(Continued)

FOREIGN PATENT DOCUMENTS

DE 19516647 11/1996
(Continued)

OTHER PUBLICATIONS

Zhao, Yilin, Efficient and reliable data transmission for cellular and GPS based mayday systems, Intelligent Transportation System, 1997. ITSC'97, IEEE Conference, pp. 555-559, Nov. 9-12, 1997, Boston, MA, USA, entire document.

(Continued)

*Primary Examiner* — Susan McFadden
(74) *Attorney, Agent, or Firm* — Foster Pepper PLLC; Richard T. Black; P. G. Scott Born

(57) ABSTRACT

A comprehensive system and method for telematics including the following features individually or in sub-combinations: vehicle user interfaces, telecommunications, speech recognition, digital commerce and vehicle parking, digital signal processing, wireless transmission of digitized voice input, navigational assistance for motorists, data communication to vehicles, mobile client-server communication, extending coverage and bandwidth of wireless communication services, and noise reduction.

7 Claims, 39 Drawing Sheets

Related U.S. Application Data

(63) application No. 09/884,854, filed on Jun. 18, 2001, now Pat. No. 7,472,075, application No. 11/929,574, which is a continuation-in-part of application No. 09/884,902, filed on Jun. 18, 2001, now Pat. No. 7,392,191, and a continuation-in-part of application No. 09/955,476, filed on Sep. 17, 2001, now abandoned, and a continuation-in-part of application No. 10/059,905, filed on Jan. 29, 2002, now Pat. No. 6,885,735, application No. 11/929,574, which is a continuation-in-part of application No. 10/689,504, filed on Oct. 21, 2003, now Pat. No. 7,092,816, which is a continuation of application No. 10/273,403, filed on Oct. 16, 2002, now Pat. No. 6,671,617, which is a continuation of application No. 09/884,856, filed on Jun. 18, 2001, now Pat. No. 6,487,494, application No. 11/929,574, which is a continuation-in-part of application No. 10/765,720, filed on Jan. 26, 2004, now Pat. No. 7,912,512, which is a continuation of application No. 10/076,027, filed on Feb. 12, 2002, now Pat. No. 6,748,244, application No. 11/929,574, which is a continuation-in-part of application No. 10/454,390, filed on Jun. 3, 2003, now abandoned, which is a continuation of application No. 09/955,475, filed on Sep. 17, 2001, now Pat. No. 6,591,168, application No. 11/929,574, which is a continuation-in-part of application No. 10/440,023, filed on May 16, 2003, now Pat. No. 7,236,777, application No. 11/929,574, which is a continuation-in-part of application No. 10/076,874, filed on Feb. 14, 2002, now Pat. No. 7,406,421.

(60) Provisional application No. 60/280,375, filed on Mar. 29, 2001, provisional application No. 60/280,377, filed on Mar. 29, 2001, provisional application No. 60/278,454, filed on Apr. 2, 2001, provisional application No. 60/281,231, filed on Apr. 2, 2001, provisional application No. 60/280,376, filed on Mar. 29, 2001, provisional application No. 60/281,231, filed on Apr. 2, 2001, provisional application No. 60/280,379, filed on Mar. 29, 2001, provisional application No. 60/280,378, filed on Mar. 29, 2001, provisional application No. 60/364,538, filed on Mar. 15, 2002, provisional application No. 60/322,025, filed on Nov. 21, 2001, provisional application No. 60/316,650, filed on Aug. 31, 2001, provisional application No. 60/291,203, filed on May 15, 2001, provisional application No. 60/381,142, filed on May 16, 2002, provisional application No. 60/345,939, filed on Oct. 26, 2001.

(56) References Cited

U.S. PATENT DOCUMENTS

| | | | |
|---|---|---|---|
| 4,625,083 | A | 11/1986 | Poikela |
| 4,630,304 | A | 12/1986 | Borth et al. |
| 4,759,212 | A | 7/1988 | Sawada et al. |
| 4,827,500 | A | 5/1989 | Binkerd et al. |
| 4,876,710 | A | 10/1989 | Reed et al. |
| 4,878,170 | A | 10/1989 | Zeevi |
| 4,918,732 | A | 4/1990 | Gerson et al. |
| 5,029,233 | A | 7/1991 | Metroka |
| 5,062,132 | A | 10/1991 | Yasuda et al. |
| 5,168,277 | A | 12/1992 | LaPinta et al. |
| 5,259,018 | A | 11/1993 | Grimmett et al. |
| 5,263,181 | A | 11/1993 | Reed |
| 5,357,513 | A | 10/1994 | Kay et al. |
| 5,371,901 | A | 12/1994 | Reed et al. |
| 5,414,624 | A | 5/1995 | Anthonyson |
| 5,539,810 | A | 7/1996 | Kennedy, III et al. |
| 5,564,796 | A | 10/1996 | Saito et al. |
| 5,570,087 | A | 10/1996 | Lemelson |
| 5,649,055 | A | 7/1997 | Gupta et al. |
| 5,668,854 | A | 9/1997 | Minakami et al. |
| 5,712,788 | A | 1/1998 | Liaw et al. |
| 5,719,921 | A | 2/1998 | Vysotsky et al. |
| 5,729,531 | A | 3/1998 | Raith et al. |
| 5,732,074 | A | 3/1998 | Spaur et al. |
| 5,749,072 | A | 5/1998 | Mazurkiewicz |
| 5,761,638 | A | 6/1998 | Knittle et al. |
| 5,764,644 | A * | 6/1998 | Miska et al. .................. 370/465 |
| 5,777,580 | A | 7/1998 | Janky et al. |
| 5,805,079 | A | 9/1998 | Lemelson |
| 5,835,868 | A | 11/1998 | McElroy et al. |
| 5,835,881 | A | 11/1998 | Trovato et al. |
| 5,855,003 | A * | 12/1998 | Ladden et al. ................ 704/270 |
| 5,867,780 | A | 2/1999 | Malackowski et al. |
| 5,870,667 | A | 2/1999 | Globuschutz |
| 5,877,723 | A | 3/1999 | Fan |
| 5,937,355 | A | 8/1999 | Joong et al. |
| 5,940,481 | A | 8/1999 | Zeitman |
| 5,940,503 | A | 8/1999 | Palett et al. |
| 5,943,429 | A | 8/1999 | Handel |
| 5,945,985 | A | 8/1999 | Babin et al. |
| 5,946,343 | A | 8/1999 | Schotz et al. |
| 5,956,683 | A | 9/1999 | Jacobs et al. |
| 5,960,399 | A | 9/1999 | Barclay et al. |
| 5,963,861 | A | 10/1999 | Hanson |
| 6,006,148 | A | 12/1999 | Strong |
| 6,011,786 | A | 1/2000 | Dent |
| 6,019,475 | A | 2/2000 | Lynam et al. |
| 6,037,880 | A | 3/2000 | Manion |
| 6,044,266 | A | 3/2000 | Kato |
| 6,052,604 | A | 4/2000 | Bishop, Jr. et al. |
| 6,085,428 | A | 7/2000 | Casby et al. |
| 6,105,060 | A | 8/2000 | Rothblatt |
| 6,111,539 | A | 8/2000 | Mannings et al. |
| 6,111,964 | A | 8/2000 | Ishibashi |
| 6,125,284 | A | 9/2000 | Moore et al. |
| 6,128,482 | A | 10/2000 | Nixon et al. |
| 6,151,539 | A | 11/2000 | Bergholz et al. |
| 6,154,658 | A | 11/2000 | Caci |
| 6,154,662 | A | 11/2000 | Norton et al. |
| 6,157,317 | A | 12/2000 | Walker |
| 6,161,071 | A | 12/2000 | Shuman et al. |
| 6,163,752 | A | 12/2000 | Sievers et al. |
| 6,199,013 | B1 | 3/2001 | O'Shea |
| 6,202,008 | B1 | 3/2001 | Beckert et al. |
| 6,206,283 | B1 | 3/2001 | Bansal et al. |
| 6,208,927 | B1 | 3/2001 | Mine et al. |
| 6,212,473 | B1 | 4/2001 | Stefan et al. |
| 6,233,452 | B1 | 5/2001 | Nishino |
| 6,240,365 | B1 | 5/2001 | Bunn |
| 6,243,003 | B1 | 6/2001 | DeLine et al. |
| 6,249,233 | B1 | 6/2001 | Rosenberg et al. |
| 6,275,231 | B1 | 8/2001 | Obradovich |
| 6,279,946 | B1 | 8/2001 | Johnson et al. |
| 6,292,781 | B1 | 9/2001 | Urs et al. |
| 6,296,280 | B1 | 10/2001 | Struble et al. |
| 6,308,126 | B2 | 10/2001 | Yokoyama et al. |
| 6,317,684 | B1 | 11/2001 | Roeseler et al. |
| 6,334,089 | B2 | 12/2001 | Hessing |
| 6,336,090 | B1 | 1/2002 | Chou et al. |
| 6,349,329 | B1 | 2/2002 | Mackintosh et al. |
| 6,351,698 | B1 | 2/2002 | Kubota et al. |
| 6,353,785 | B1 | 3/2002 | Shuman et al. |
| 6,363,324 | B1 | 3/2002 | Hildebrant |
| 6,363,349 | B1 * | 3/2002 | Urs et al. ...................... 704/275 |
| 6,370,237 | B1 | 4/2002 | Schier |
| 6,370,506 | B1 | 4/2002 | Ahluwalia |
| 6,374,214 | B1 | 4/2002 | Friedland et al. |
| 6,377,210 | B1 | 4/2002 | Moore |
| 6,389,332 | B1 | 5/2002 | Hess et al. |
| 6,389,389 | B1 | 5/2002 | Meunier et al. |
| 6,393,403 | B1 | 5/2002 | Majaniemi |

| | | |
|---|---|---|
| 6,405,027 B1 | 6/2002 | Bell |
| 6,408,272 B1 | 6/2002 | White et al. |
| 6,421,607 B1 | 7/2002 | Gee et al. |
| 6,441,790 B1 | 8/2002 | Forrester et al. |
| 6,453,020 B1 | 9/2002 | Hughes et al. |
| 6,484,174 B1 | 11/2002 | Wall et al. |
| 6,487,402 B1 | 11/2002 | Faus et al. |
| 6,487,494 B2 | 11/2002 | Odinak et al. |
| 6,496,776 B1 | 12/2002 | Blumberg |
| 6,496,799 B1 | 12/2002 | Pickering |
| 6,516,466 B1 | 2/2003 | Jackson |
| 6,526,335 B1 | 2/2003 | Treyz et al. |
| 6,526,486 B2 | 2/2003 | Theimer |
| 6,591,168 B2 | 7/2003 | Odinak et al. |
| 6,615,381 B1 | 9/2003 | Fukuda et al. |
| 6,628,928 B1 | 9/2003 | Crosby et al. |
| 6,671,617 B2 | 12/2003 | Odinak et al. |
| 6,765,497 B2 | 7/2004 | Ablay et al. |
| 6,779,196 B1 | 8/2004 | Igbinadolor |
| 6,810,323 B1 | 10/2004 | Bullock et al. |
| 6,895,238 B2 | 5/2005 | Newell et al. |
| 7,236,777 B2 | 6/2007 | Tolhurst |
| 7,330,786 B2 * | 2/2008 | Odinak et al. ............... 701/202 |
| 7,392,191 B2 * | 6/2008 | Odinak ........................ 704/270 |
| 7,406,421 B2 | 7/2008 | Odinak et al. |
| 7,634,064 B2 * | 12/2009 | Odinak ..................... 379/88.01 |
| 7,769,143 B2 * | 8/2010 | Odinak ..................... 379/88.01 |
| 2001/0010500 A1 | 8/2001 | Lundin et al. |
| 2001/0014863 A1 | 8/2001 | Williams, III |
| 2001/0016500 A1 | 8/2001 | Son et al. |
| 2001/0020211 A1 | 9/2001 | Takayama et al. |
| 2001/0021646 A1 | 9/2001 | Antonucci et al. |
| 2001/0030598 A1 | 10/2001 | Deline et al. |
| 2001/0033643 A1 | 10/2001 | Mulvey et al. |
| 2002/0028655 A1 | 3/2002 | Rosener et al. |
| 2002/0065037 A1 | 5/2002 | Messina et al. |
| 2002/0068543 A1 | 6/2002 | Shah |
| 2002/0069071 A1 | 6/2002 | Knockeart et al. |
| 2002/0075168 A1 | 6/2002 | Ablay et al. |
| 2002/0103639 A1 | 8/2002 | Chang et al. |
| 2002/0111172 A1 | 8/2002 | DeWolf et al. |
| 2002/0113203 A1 | 8/2002 | Heslin et al. |
| 2002/0140545 A1 | 10/2002 | Nietupski et al. |
| 2002/0142803 A1 | 10/2002 | Yamamoto |
| 2002/0143999 A1 | 10/2002 | Yamagami |
| 2002/0158753 A1 | 10/2002 | DeLine et al. |
| 2002/0173347 A1 | 11/2002 | Kinnunen |
| 2003/0169160 A1 | 9/2003 | Rodriguez et al. |
| 2004/0110515 A1 | 6/2004 | Blumberg et al. |
| 2005/0028208 A1 | 2/2005 | Ellis et al. |

FOREIGN PATENT DOCUMENTS

| | | |
|---|---|---|
| EP | 0829704 | 3/1998 |
| EP | 0911783 | 4/1999 |
| FR | 2762906 | 11/1988 |
| FR | 02762906 | 11/1998 |
| JP | 04219783 | 8/1992 |
| JP | 07159186 | 6/1995 |
| JP | 08044996 | 2/1996 |
| WO | WO 9909374 | 2/1999 |

OTHER PUBLICATIONS

Nusser, et al., Bluetooth-based wireless connectivity in an automatic environment, Vehicular Technology Conference, 2000. IEEE-VTS, Fall VTC 200. 52nd, pp. 2541-2548, vol. 6, Sep. 24-28, 2000. Boston, MA. USA. entire document.

Stirling, A., Mobile multimedia platforms, Vehicular Technology Conference, 2000. IEEE-VTS Fall VTC 200. 52nd, pp. 2541-2548, vol. 6, Sep. 24-28, 2000, Boston, MA, USA, entire document.

Jameel, et al., Interest multimedia on wheels: connecting cars to cyberspace, Intelligent Transportation System, 1997. ITSC'97, IEEE Conference, pp. 637-642, Nov. 9-12, 1997, Boston, MA. USA. entire document.

Kushner, et al., Effects of subtractive-type speech enhancement/noise reduction algorithms on parameter estimation for improved recognition and coding in high noise environments, vol. 1, ICASSP-89, May 23-26, 1989, pp. 211-221.

Boll, Steven F., Supression of acoustic noise in speech using spectral subtraction, IEEE Transaction on ASSP, vol. ASSP-2 No. 2, Apr. 1979.

Un and Choi, Improving LPC analysis of noisy speech by autocorrelation subtraction method, ICASSP 81 Proceedings, Mar. 30-Apr. 1, 1981, pp. 1082-1085.

* cited by examiner

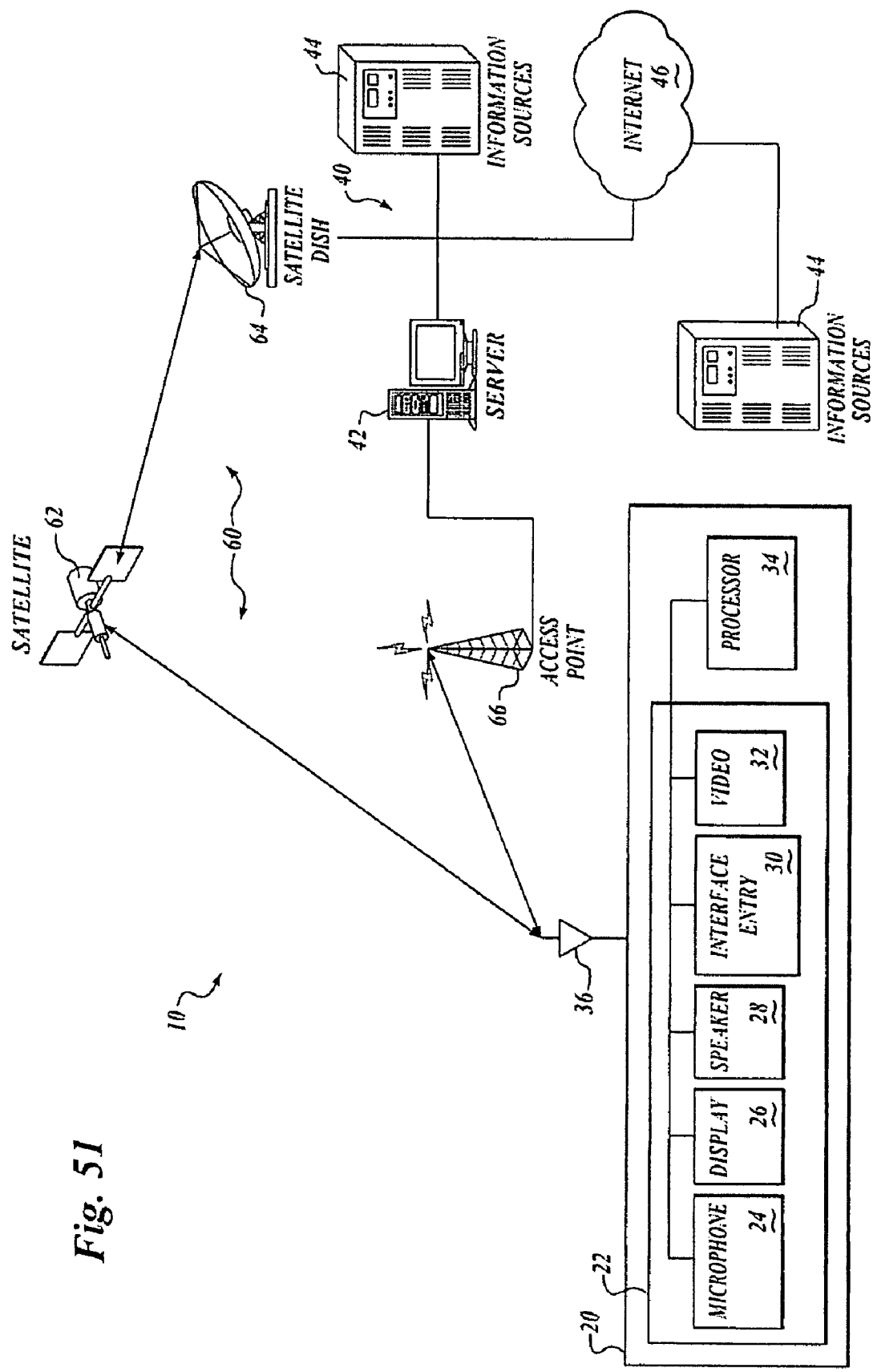

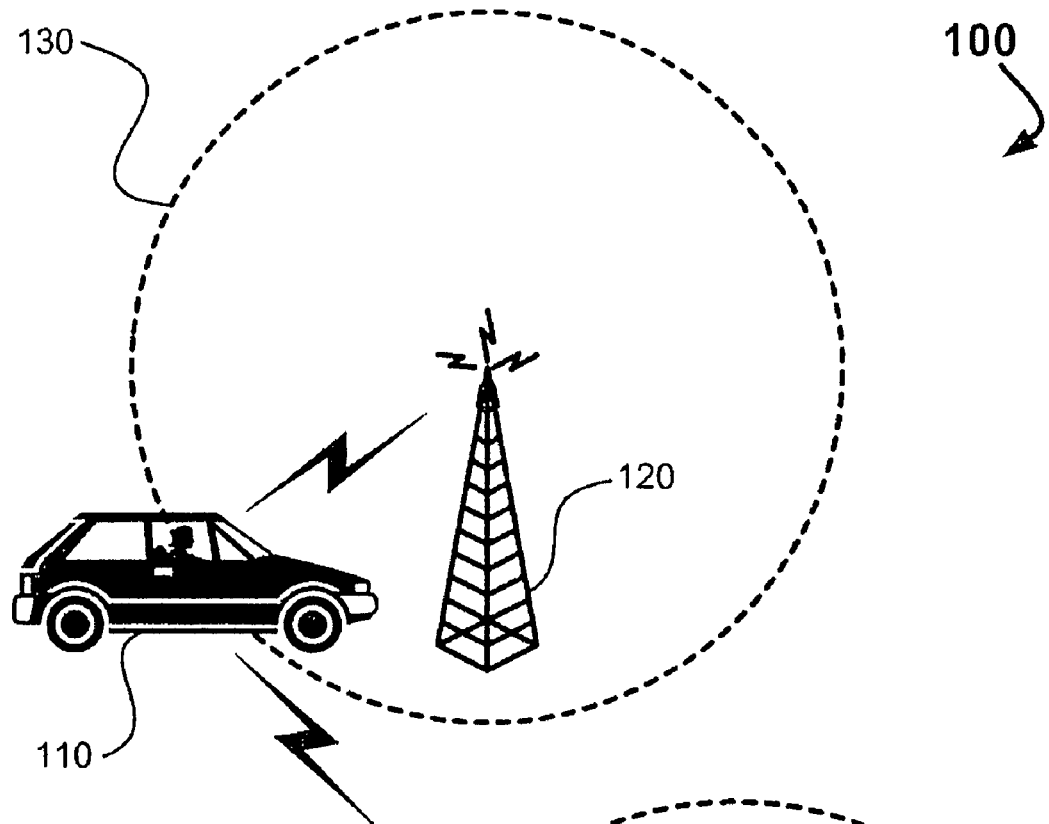
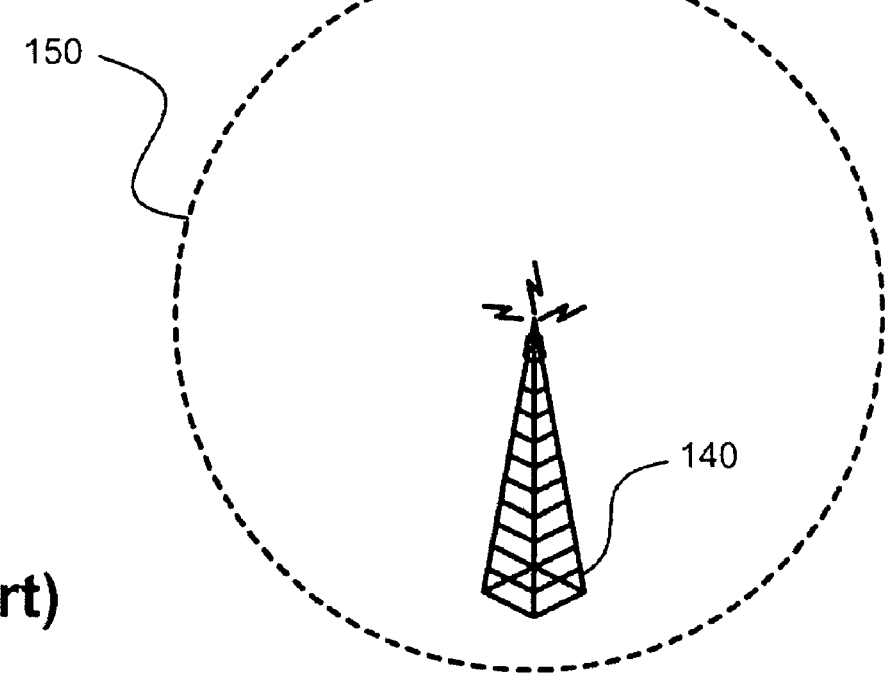
*Fig. 91*
(Prior Art)

DETERMINATION OF SIGNAL-PROCESSING APPROACH BASED ON SIGNAL DESTINATION CHARACTERISTICS

PRIORITY CLAIM

This application is a continuation of U.S. application Ser. No. 10/910,801 filed Aug. 2, 2004 which is a Continuation-in-Part of U.S. application Ser. No. 09/884,854 filed Jun. 18, 2001 now U.S. Pat. No. 7,472,075, which claims priority from U.S. application Ser. No. 09/860,024 filed May 16, 2001 (now abandoned), which claims priority to U.S. Provisional Application Ser. No. 60/280,375 filed Mar. 29, 2001. This application is also a Continuation-in-Part of U.S. application Ser. No. 09/884,902 filed Jun. 18, 2001 now U.S. Pat. No. 7,392,191, which claims priority to U.S. application Ser. No. 09/859,967 filed May 16, 2001 (now abandoned), which claims priority to U.S. Provisional Application Ser. Nos. 60/280,377 filed Mar. 29, 2001, 60/278,454 filed Apr. 2, 2001 and 60/281,231 filed Apr. 2, 2001. This application is also a Continuation-in-Part of U.S. application Ser. No. 09/955,476 filed Sep. 17, 2001 now abandoned, which claims priority to U.S. Provision Application Ser. Nos. 60/280,376 filed Mar. 29, 2001 and 60/281,231 filed Apr. 2, 2001. This application is also a Continuation-in-Part of U.S. application Ser. No. 10/059,905 filed Jan. 29, 2002 now U.S. Pat. No. 6,885,735, which claims priority to U.S. Provision Application Ser. No. 60/280,379 filed Mar. 29, 2001. This application is also a Continuation-in-Part of U.S. application Ser. No. 10/689,504 filed Oct. 21, 2003 now U.S. Pat. No. 7,092,816, which is a Continuation of U.S. application Ser. No. 10/273,403 filed Oct. 16, 2001 (U.S. Pat. No. 6,671,617 issued Dec. 30, 2003), which is a Continuation of U.S. application Ser. No. 09/884,856 filed Jun. 18, 2001 now U.S. Pat. No. 6,487,494, which claims priority to U.S. Provisional Application Ser. No. 60/280,378 filed Mar. 29, 2001. This application also claims priority to currently pending PCT Application No. PCT/US03/07976 filed Mar. 14, 2003 which claims priority to U.S. application Ser. No. 10/142,670 filed May 10, 2002 (U.S. Pat. No. 6,691,026 issued Feb. 10, 2004), which claims priority to U.S. Provisional Application Ser. No. 60/364,538 filed Mar. 15, 2002 and is a Continuation-in-Part of U.S. application Ser. No. 09/884,856 filed Jun. 18, 2001 (U.S. Pat. No. 6,487,494 issued Nov. 26, 2002, which claims priority to U.S. Provisional Application Ser. No. 60/280,378 filed Mar. 29, 2001. This application is also a Continuation-in-Part of U.S. application Ser. No. 10/765,720 filed Jan. 26, 2004 now U.S. Pat. No. 7,912,512, which is a Continuation of U.S. application Ser. No. 10/076,027 filed Feb. 12, 2002 (U.S. Pat. No. 6,748,244 issued Jun. 8, 2004), which claims priority to U.S. Provisional Application Ser. No. 60/332,025 filed Nov. 21, 2001. This application is also a Continuation-in-Part of U.S. application Ser. No. 10/454,390 filed Jun. 3, 2003 now abandoned, which is a continuation of U.S. application Ser. No. 09/955,475 filed Sep. 17, 2001 (U.S. Pat. No. 6,591,168 issued Jul. 8, 2003), which claims priority to U.S. Provisional Application Ser. No. 60/316,650 filed Aug. 31, 2001. This application is also a Continuation-in-Part of European National Phase Application No. EUR. 02731874.0 (European National Phase entered Nov. 15, 2003), proceeding from PCT Application No. PCT/US02/15917, which claims priority to U.S. application Ser. No. 09/955,474 filed Sep. 17, 2001 (U.S. Pat. No. 6,766,233 issued Jul. 20, 2004) which claims priority to U.S. Provisional Application No. 60/291,203 filed May 15, 2001. This application is also a Continuation-in-Part of U.S. application Ser. No. 10/440,023 filed May 16, 2003 now U.S. Pat. No. 7,236,777 which claims priority to U.S. Provisional Application Ser. No. 60/381,142 filed May 16, 2002. This application is also a Continuation-in-Part of U.S. application Ser. No. 10/076,874 filed Feb. 14, 2002 now U.S. Pat. No. 7,406,421 which claims priority to U.S. Provisional Application Ser. No. 60/345,939 filed Oct. 26, 2001. All of the applications above herein incorporated by reference in their entirety.

FIELD OF THE INVENTION

This invention relates generally or preferably to the fields of telematics, vehicle user interfaces, telecommunications, speech recognition, digital commerce and vehicle parking, digital signal processing, wireless transmission of digitized voice input, navigational assistance for motorists, data communication to vehicles, mobile client-server communication, extending coverage and bandwidth of wireless communication services.

BACKGROUND OF THE INVENTION

The following application is incorporated by reference as if fully set forth herein: U.S. application Ser. No. 10/910,801 filed Aug. 2, 2004.

The full potential of the telematics industry has yet to be realized in part because of several deficiencies in functionality, features, performance, reliability, cost-effectiveness, and convenience of existing systems. There is a need for a comprehensively improved telematics system. The improved system preferably includes improvements and/or features to address one or more, or any combination of the following problems.

1) Various vehicle devices exist that are designed to provide a vehicle operator with travel-related information. For example, a display coupled to a global positioning system (GPS) may be used to present to the vehicle operator a detailed map showing the vehicle location, a desired destination, and the geographic details of the surrounding area. Under certain situations, the vehicle operator has the opportunity to study the map in exact and thorough detail. An example is a parked vehicle. There are other times, however, when the vehicle operator is too busy operating the vehicle to safely view the displayed information, let alone study the displayed information in exacting detail. This is particularly the case where the vehicle operator is in the midst of a particularly taxing circumstance, for example, driving in heavy traffic, driving at high speed, or otherwise distracted by an emergency situation or telephone conversation. In such situations, the display presentation distracts the vehicle operator because the operator focuses attention on the details shown on the display.

Therefore, there exists a need to provide valuable and timely travel-related information to a vehicle operator while minimizing potentially dangerous distractions to the vehicle operator. See our co-pending application entitled SYSTEM AND METHOD FOR ADAPTABLE MOBILE USER INTERFACE, U.S. patent application Ser. No. 10/454,390 filed Jun. 3, 2003.

2) Worldwide, regulatory bodies have begun to mandate the use of hands free systems for phone conversations in vehicles. A hands free system enables the driver to carry on a phone conversation without holding a phone to their ear. While some systems incorporate a headset, typically a hands free system comprises a microphone and speaker mounted in the vehicle and connected to a cellular phone mounted in a cradle. Existing systems typically require pressing keys on the phone or on a separate keypad embedded in the dashboard to dial a phone number. Newer systems use voice recognition, implemented as part of the hands free system or embedded phone system, to enable a true hands free operation. Some providers of applications attempt to use hands free systems (a.k.a. hands free kits) in tandem with the user's personal phone to deliver their service, removing the need for an in-vehicle embedded phone.

There exist disadvantages with current systems. A system based on a portable phone mounted in a cradle is inherently unreliable as the phone may become detached from its cradle at the time it is most needed (e.g., because of crash impact.) In addition, the driver may have forgotten their phone outside of the vehicle and only discover that when the phone is needed.

Bluetooth (BT) is a short-range wireless technology originally designed to replace patch cable between personal computers and related peripherals. This technology is making its way into mobile cellular phones to enable them to communicate over short range with other devices. BT applications may be connected to a personal phone in an in-vehicle hands free system. In one scenario, the driver gets into their vehicle and starts driving without pulling their phone out of their pocket. A BT transceiver that is part of the in-vehicle hands free system and the BT transceiver in the phone discover each other and establish a continuous wireless link. The hands free system now uses the driver's personal phone to connect with the cellular network.

The above solution suffers from limitations similar to the cradle solution and more severe. For example, wireless connections are inherently unreliable. On occasions the two systems do not establish a connection when the driver enters the car. Unlike when placing a phone into a cradle, there is no physical, tangible cue to the driver to indicate a likely connection failure. Even after the initial connection has been established, it may be dropped at any time; even in the middle of a conversation. In addition, the phone may be placed at a location in the vehicle with poor cellular reception (e.g. below glass window level) that does not have access to a vehicle mounted external antenna. Lastly, in dense traffic and given BT security issues, conversation privacy may be compromised as it may leak over the BT network to other vehicles in close proximity.

Therefore, there exists a need to provide a more reliable, less costly, hands free vehicle phone system. See our co-pending application entitled SHARING ACCOUNT INFORMATION AND A PHONE NUMBER BETWEEN PERSONAL MOBILE PHONE AND AN IN-VEHICLE EMBEDDED PHONE, U.S. patent application Ser. No. 10/765,720 filed Jan. 26, 2004.

Voice transmission over a digital wireless network involves capturing sound waves using a microphone and converting them to electrical signals and then binary data. The process comprises sampling, digitizing, and other digital signal processes at the receiver unit (e.g., telematics module or cell phone.)

There is a fundamental difference between the way humans process auditory input and the way automated speech recognition (ASR) servers process voice input. Thus, different algorithms for signal processing should be used. In current applications, however, a single, compromise process is used, with resultant inefficiencies. See our co-pending application entitled METHOD AND DEVICE TO DISTINGUISH BETWEEN VOICE CONVERSATION AND AUTOMATED SPEECH RECOGNITION, U.S. patent application Ser. No. 09/884,902 filed Jun. 18, 2001.

There exist a few locations where a vehicle owner must make a payment based on the location of the owner's vehicle. For example, the owner must make a payment in order to use a toll road or bridge or to park in a pay parking location. Many times when the owner parks in a pay parking location they forget to pay or pay an incorrect amount based on the parking rate that varies depending upon the time and day of the week. When the owner fails to properly remit payment, they can be assessed hefty penalties. Therefore, there exists a need to allow a vehicle owner to easily and accurately pay the required amount when using a toll-based facility or for parking. See our co-pending application entitled VEHICLE PARKING VALIDATION SYSTEM AND METHOD, U.S. patent application Ser. No. 09/955,476 filed Sep. 17, 2001.

Cellular telephone transmission has long been used in mobile communication. Traditionally, cellular telephone transmission has been used to facilitate conversations between remote individuals. More recently, these same systems have been modified to facilitate the communication of verbal instructions to remote computer systems using speech recognition programs. In these modified systems, the speaker's verbal instructions are converted to digital data instructions, which in turn are used by a computer system to carry out the desired operation. The ability to communicate verbal instructions "hands-free" carries obvious advantages, not the least of which include safety advantages, especially when the speaker is concurrently attempting to operate a vehicle.

The traditional implementation of this type of speech transmission and recognition occurs in one of two ways: (1) sending raw audio (i.e., the speaker's verbal instructions) from a receiver in the vehicle, such as a cellular telephone, to the remote computer system, where the verbal instructions are converted to data instructions; or (2) performing extensive automated speech recognition (ASR) in the receiver (e.g., recognizing words and phrases), and sending the converted digital data instructions to the remote computer system. Both existing implementations suffer from significant disadvantages. Raw audio sent across a cellular network suffers from signal degradation, in turn diminishing the integrity of the audio signal to be converted to digital data instructions and, hence, the accuracy of the ultimate instructions. While converting the audio signal to digital data at the vehicle addresses this problem, it requires expensive computing power in the vehicle, which is logistically and cost prohibitive.

Thus, there is a need for a mobile speech recognition system and method that addresses the disadvantages with the current implementations. See our co-pending application entitled SYSTEM AND METHOD FOR TRANSMITTING VOICE INPUT FROM A REMOTE LOCATION OVER A WIRELESS DATA CHANNEL, U.S. patent application Ser. No. 10/059,905 filed Jan. 29, 2002.

With advances in on-board vehicle computer systems and wireless technologies, vehicle navigation systems that provide users with current location and driving directions to a desired destination have become a reality. Vehicle navigation systems have taken one of two forms: on-board systems and network-based systems. On-board systems are driven by a computer and associated database resident in each vehicle. These systems generate driving instructions based on user voice or keyboard input and map information stored in the on-board computing system. Network-based navigation systems do not rely on an on-board computer and associated database, but rather provide a voice interface to an off-vehicle computer or human information provider.

Significant disadvantages exist with both forms of vehicle navigation systems. The on-board navigation system requires expensive and quickly outdated computer hardware. Moreover, with the on-board computing approach, the database needs to be updated periodically to maintain current navigation information. Indeed, such systems can never really be up to date or comprehensive as they rely on external updates, typically via a CD-ROM or other removable electronic storage medium. The network-based system requires an open wireless link to the server. In these systems, the user typically dials a number and gives their starting and ending addresses (current location and destination). The system computes the route and vocally recites it to the user turn by turn. If the user hangs up, or it otherwise disconnected, they need to call again and give their new location and the destination address. Maintaining an active phone connection, especially in a situation involving long distance travel, is inefficient and expensive, as well as distracting to the vehicle user.

Thus, there is a need for a system and method that addresses the disadvantages associated with current attempts at vehicle navigation systems. See our co-pending application entitled SYSTEM AND METHOD FOR REDUCING THE AMOUNT OF REPETITIVE DATA SENT BY A SERVER TO A CLIENT FOR VEHICLE NAVIGATION, U.S. patent application Ser. No. 10/689,504 filed Oct. 21, 2003.

With the increased popularity of wireless telecommunication via cellular phones, personal data assistants, and computers, literally millions of consumers are gaining access to the Internet for information, services, and applications. Mobile telecommunication is especially useful for vehicular travelers, providing them with universal access to information and applications. Attempts have been made to parley traditional mobile telecommunications systems into vehicle-based systems that allow users to more easily and safely gain information and complete transactions from the convenience of their automobile. One such attempt, for instance, allows users to purchase music heard over the radio by contacting an automated purchasing service via a cellular telephone after hearing the music over the vehicle radio. Such attempts, however, are generally limited to a single transaction or information request for only a specific type of product, and do not provide the user with a wide range of information and transaction options related to a variety of products and services. Moreover, such attempts do not incorporate the use of vehicle information, such as vehicle location, traveling speed, and direction, to customize and tailor the information and transaction options to the specific needs of the user.

There is a need for a system and method that provides greater flexibility for a user to obtain information and complete transactions related to a wide range of products and services advertised over the radio, for example, food, music, event tickets, and books. The system and method should also allow a mobile user to obtain customized information and complete transactions associated with broadcast radio content based on specific information related to the vehicle's particular circumstances. See our co-pending application entitled A SYSTEM AND METHOD TO ASSOCIATE BROADCAST RADIO CONTENT WITH A TRANSACTION VIA AN INTERNET SERVER, U.S. patent application Ser. No. 09/884,854 filed Jun. 18, 2001.

Vehicle-based telematics units connect to a telematics server via a wireless connection in order to receive information with which to interact with the vehicle operator. Presently, when a telematics unit is activated it places a call to a cellular phone number in a cellular network that then makes a connection between the telematics unit and the telematics server. When the vehicle of the telematics unit is not in its local calling area, roaming or long distance fees are incurred for a unit/server session. The telematics unit requires a phone number that is local relative to the present location of the telematics unit in order to access the telematics server without incurring increased communication fees. In order for the telematics unit to call a phone number that is different than its base or default phone number, the user must take the time to figure out what phone number is a proper phone number given the present vehicle location, and must enter that number while operating the vehicle. This imposes a number of problems, one of which is safety. The whole point of the telematics unit is to provide hands-free operation and interaction with the telematics server. Safety is compromised when the user must manually enter a phone number. Also, the user would have to find the proper phone number, which may be hard to locate under the circumstances or be unavailable to the user.

Therefore, there exists a need to provide easier and more cost effective access to a telematics server. See our co-pending application entitled LOCAL PHONE NUMBER LOOKUP AND CACHE, U.S. patent application Ser. No. 10/059,893 filed Jan. 9, 2002.

Wireless communication grows in importance daily. Cellular telephones have become standard accessories for adults and children. Coffee shops and other public venues are equipped with "wi-fi" connections allowing visitors to access the Internet with wireless-enabled notebook computers, handheld computers, and portable digital assistants. Even automobiles are equipped with wireless communication devices that allow drivers to call for roadside assistance or, if an owner should lock himself or herself out of the car, to telephone a service operator to remotely unlock the car's doors.

Not surprisingly, the proliferation of wireless communication inspires both increased capabilities and commensurate increased demands for wireless communication bandwidths. To name one example, recently cellular telephone vendors have begun to market wireless interfaces that allow for capture of still photographs, short movies, and voice narration. If the popularity of these devices grows as the cellular telephone companies expect them to grow, just as the proliferation of cellular telephones has consumed available telephone exchanges and area codes, proliferation of multifunctional devices will consume available cellular bandwidth.

Unfortunately, just as cellular telephone companies have devised products such as "picture phones," other technologies doubtlessly will be devised which will require even more wireless bandwidth. This is a costly problem. Once capacity within allocated frequency ranges has been exhausted, additional parallel networks will have to be created in existing frequency ranges. Wireless network base station transceivers provide coverage across a limited geographic area. Thus, coverage is extendable only by deploying additional base station transceivers, antennas, and other facilities in the same way that such infrastructure has been built to create the geographical coverage of existing wireless networks. Without expansion of wireless network infrastructure, wireless communication device users may not be able to fully benefit from wireless communication devices they use.

For example, FIG. 91 depicts a situation 100 concerning an automobile 110 that has suffered mechanical failure. The automobile 110 is equipped with two different wireless communication transceivers. A first transceiver is a conventional wireless telephone configured to communicate with a first communication network 120. The automobile 110 is within a communication range 130 of the first communication network 120, thus an operator of the automobile 110 is able to telephone for assistance.

The automobile 110 also is equipped with a second transceiver using a proprietary communication system which allows the automobile 110 itself and/or its operator to communicate with an automobile service facility through a second communication network 140. Potentially, data communication between a computer system associated with the automobile 110 might even allow for some faults to be corrected remotely. Alternatively, the fault might be able to be remotely diagnosable through the second communication network 140 or, at a minimum, the operators of the second communication network 140 network likely would be better prepared to arrange to dispatch a tow truck or other service vehicles. Unfortunately, as can be seen in the situation 100 depicted in FIG. 91, the automobile 110 is outside of the communication range 150 of the second communication network 140. As a result, any assistance that might be offered through the second communication network 140 is not available to the operator of the automobile 110. Thus, the operator of the automobile 110 is left to determine his or her location and to try to find the telephone number of a towing service. This can be a troubling ordeal, particularly if the operator has driven the automobile 110 to an unfamiliar location.

Thus, there is an unmet need in the art for expanding wireless communication coverage capabilities to support the bandwidth and/or geographical coverage needed to support desired wireless functionality. See our co-pending application entitled SYSTEM AND METHOD FOR DYNAMICALLY CONFIGURING WIRELESS NETWORK GEOGRAPHIC COVERAGE OR SERVICE LEVELS, U.S. patent application Ser. No. 10/440,023 filed May 16, 2003.

Various vehicle devices exist that are designed to provide a vehicle operator with travel-related information. For example, a display coupled to a global positioning system (GPS) may be used to present to the vehicle operator a detailed map showing the vehicle location, a desired destination, and the geographic details of the surrounding area. Under certain situations, the vehicle operator has the opportunity to study the map in exact and thorough detail. An example is a parked vehicle. There are other times, however, when the vehicle operator is too busy operating the vehicle to safely view the displayed information, let alone study the displayed information in exacting detail. This is particularly the case where the vehicle operator is in the midst of a particularly taxing circumstance, for example, driving in heavy traffic, driving at a high speed, or otherwise distracted by an emergency situation or telephone conversation. In such situations, the display presentation distracts the vehicle operator because the operator focuses attention on the details shown on the display.

Therefore, there exists a need to provide valuable and timely travel-related information to a vehicle operator while minimizing potentially dangerous distractions to the vehicle operator. See our co-pending application entitled REAL-TIME DISPLAY OF SYSTEM INSTRUCTIONS, U.S. patent application Ser. No. 10/076,874 filed Feb. 14, 2002.

The sound captured by a microphone is the sum of many sounds, including vocal commands spoken by the person talking plus background environmental noise. Speech recognition is a process by which a spoken command is translated into a set of specific words. To do that, a speech recognition engine compares an input utterance against a set of previously calculated patterns. If the input utterance matches a pattern, the set of words associated with the matched pattern is recognized. Patterns are typically calculated using clean speech data (speech without noise). During the comparison phase of recognition, any input speech utterance containing noise is usually not recognized.

In a quiet environment, there is little need for noise reduction because the input is usually sufficiently clean to allow for adequate pattern recognition. However, in a high noise environment, such as a motor vehicle, extraneous noise will undoubtedly be added to spoken commands. This will result in poor performance of a speech recognition system. Various methods have been attempted to reduce the amount of noise that is included with spoken commands when input into a speech recognition engine. One method attempts to eliminate extraneous noise by providing sound recordation at two microphones. The first microphone records the speech from the user, while a second microphone is placed at some other position in that same environment for recording only noise. The noise recorded from the second microphone is subtracted from the signal recorded at the first microphone. This process is sometimes referred to as spectral noise reduction. This works well in many environments, but in a vehicle the relatively small distance between the first and second microphones will result in some speech being recorded at the second microphone. As such, speech may be subtracted from the recordation from the first microphone recording. Also, in a vehicle, the cost of running more wire for a second microphone outweighs any benefit provided by the second microphone.

In another example, only a single microphone is used. In this example, a signal that is recorded when the system is first started is assumed to be only noise. This is recorded and subtracted from the signal once speech is begun. This type of spectral noise reduction assumes that the noise is predictable over time and does not vary much. However, in a dynamic noise environment such as a vehicle, the noise is unpredictable, for example, car horns, sirens, passing trucks, or vehicle noise. As such, noise that is greater than the initial recorded noise may be included in the signal sent to the speech recognition engine, thereby causing false speech analysis based on noise.

Therefore, there exists a need to remove as much environmental noise from the input speech data as possible to facilitate accurate speech recognition. See our application entitled NOISE REDUCTION SYSTEM AND METHOD, U.S. patent application Ser. No. 10/024,446 filed Dec. 17, 2001.

SUMMARY OF THE INVENTION

The present invention includes multiple systems, methods, features, and embodiments which, either individually or in any combination or sub-combination provide, an enhanced and superior telematics system.

One feature or embodiment of the present invention is a system, method, and computer program product for automatically adjusting the output of presentation content to a user based upon one or more vehicle conditions. The method includes receiving presentation content for output to a vehicle operator or other system user that may include display format information in a particular text font or icon size, map detail, or audio content. The method determines whether one of a plurality of vehicle conditions exists, including conditions related to vehicle speed, rate of change in vehicle speed, rate of change in vehicle direction, vehicle emergencies, cellular phone or headphone activation, radar detector activation, noise level decibels above a certain value, etc. A vehicle emergency condition could indicate events ranging from anti-lock braking system activation to radiator overheating to outside temperature variations that correlate to icy road conditions. The method determines an output format for the presentation content based on the determined vehicle condition. Then, the method outputs at least a portion of the presentation content based on the determined output format. In accordance with still further aspects of the invention, the content is received from a server over a network link. At least a portion of the network link is a wireless link. As will be readily appreciated from the foregoing summary, this embodiment of the invention provides a method for automatically adjusting output content based on current vehicle conditions. See SYSTEM AND METHOD FOR ADAPTABLE MOBILE USER INTERFACE Ser. No. 10/454,390

Another feature or embodiment of the present invention is a phone embedded within a vehicle for automatically using a service plan of a personal mobile phone. The embedded phone includes an internal communication component that detects the presence of the personal mobile phone, and receives a mobile subscriber identification number from the detected phone. The embedded phone also includes an external communication component that sends the received mobile subscriber identification number to a wireless network authority, and receives an authentication request to the personal mobile phone via the embedded phone. The internal communication component sends the authentication request to the personal mobile phone. The personal mobile phone generates an authentication signal, and the external communication component sends the authentication signal to the wireless network authority. In accordance with further aspects of the invention, the internal communication component performs interaction with the personal mobile phone based on a Bluetooth link, an infrared wireless (IR) link, an 802.11 wireless network link, or a physical electrical wire link. See SHARING ACCOUNT INFORMATION AND A PHONE NUMBER BETWEEN PERSONAL MOBILE PHONE AND AN IN-VEHICLE EMBEDDED PHONE Ser. No. 10/765,720.

Another feature or embodiment of the present invention provides a method and computer-based device for performing preprocessing on voice transmissions depending upon the intended transmission destination. The device includes a receiving component configured to receive a voice signal from a source over a network. Also included are a processing component configured to determine a destination address associated with the received signal, determine a signal processing algorithm from a plurality of signal processing algorithms based on the destination address, and process the voice signal according to the specified algorithm. The device further includes a delivery component configured to send the processed signal to the associated address.

In accordance with other aspects of this embodiment of the invention, the device also includes memory configured to store addresses with an associated signal processing algorithm, wherein the processing component finds in memory a signal processing algorithm that is associated with the determined destination address.

In accordance with yet other aspects of this embodiment of the invention, the device includes an alert component configured to alert the recipient that the voice signal is from a computer-based system, if the source is a computer-based system.

In accordance with still another aspect of this embodiment of the invention, the computer-based device includes four additional components used to facilitate the present invention: a first component configured to select an address for a voice transmission; a second component configured to receive a phonation inputted for the voice transmission; a third component configured to process the received phonation according to an algorithm associated with a speech recognition device (if the selected address is associated with a speech recognition device) and send the processed phonation to the selected destination; and a fourth component configured to send the received phonation to the selected destination according to a delivery method associated with human recipients (if the selected address is not associated with a speech recognition device).

In accordance with still further aspects of this embodiment of the invention, a computer-based device includes four additional components used to facilitate the present invention: a first component configured to process a phonation at a source for reception by a human recipient; a second component configured to send the processed phonation to a destination according to an address associated with the phonation; a third component configured to receive a change signal from the destination; and a fourth component configured to process a next phonation for reception by a speech recognition server according to a received change signal, and send the newly processed phonation to the destination.

As will be readily appreciated from the foregoing summary, this embodiment of the invention provides a method and device for improving voice transmissions by performing some preprocessing on voice transmissions depending upon the intended destination, and for providing recipients with caller identification information if the transmission is computer generated. See METHOD AND DEVICE TO DISTINGUISH BETWEEN VOICE CONVERSATION AND AUTOMATED SPEECH RECOGNITION Ser. No. 09/884,902.

Another feature or embodiment of the present invention provides a system and method for performing vehicle parking transactions. The system includes a vehicle having a location determining component and a communication component, and a server having a communication component, a vehicle location identifying component, and a transaction completing component. The location determining component determines the location of the vehicle, and the vehicle communication component sends the determined vehicle location information to the server. The server communication component receives the determined vehicle location information from the vehicle. The vehicle location identifying component determines if the sent vehicle location locates the vehicle in a pay location, and the transaction completing component completes a payment transaction, if the vehicle location identifying component determines that the vehicle is located at a pay location.

In accordance with further aspects of this embodiment of the invention, the communication components are configured to communicate over a wireless data channel via a network.

In accordance with other aspects of this embodiment of the invention, the pay location is a parking location and the transaction completing component includes a paying component. The paying component pays an owner associated with the parking location where the vehicle is located from an account associated with the owner of the vehicle.

In accordance with still further aspects of this embodiment of the invention, the transaction completing component notifies an attendant at the parking location that is associated with the vehicle location that payment has been completed.

In accordance with yet other aspects of this embodiment of the invention, the communication component of the vehicle sends the determined vehicle location after a first vehicle trigger event occurs. The first vehicle trigger event includes one of shutting off the engine, removing the vehicle key from the ignition switch, opening or closing the vehicle door, or locking the vehicle. The server begins a clock after the determined vehicle location is received and stops the clock after a second trigger event. The second vehicle trigger event includes one of unlocking the door, inserting the key in the ignition switch, opening or closing the vehicle door, starting the vehicle, or moving the vehicle a threshold distance from the vehicle's previous location.

As will be readily appreciated from the foregoing, this embodiment of the invention provides a method and system for billing a vehicle owner when the owner's vehicle is in a pay location, such as a traditional parking lot or other on- or off-street parking location, a toll bridge, or toll road. See VEHICLE PARKING VALIDATION SYSTEM AND METHOD Ser. No. 09/955,476.

Another feature or embodiment of the present invention of the present invention provides a voice communication system and method for improving voice recognition processing at a server system that receives voice input from a remotely located user system. The user system includes a microphone configured to receive user voice input, a processor configured to perform front-end voice recognition processing of the received user voice input, and a communication component configured to send the front-end processed user voice input to a destination over a network. The server system includes a communication component configured to receive the sent front-end processed user voice input, and a processor configured to complete voice recognition processing of the sent front-end processed user voice input.

In accordance with further aspects of this embodiment of the invention, the communication component of the user system communicates wirelessly.

In accordance with still further aspects of this embodiment of the invention, the processor of the user system includes a sampling component configured to sample the received user voice input. The processor of the user system further includes at least one of a noise cancellation component, an echo-cancellation component or an end-pointing component.

In accordance with yet other aspects of this embodiment of the invention, the processor of the server includes a component configured to perform a function based on the completed voice recognition processing.

In accordance with still another aspect of this embodiment of the invention, the user system includes removable modules. The modules include a processing module that includes a sampling component configured to sample the received user voice input. Also, the processing module includes a noise cancellation component, an echo-cancellation component or an end-pointing component.

In accordance with still further aspects of this embodiment of the invention, the modules include at least one of a positioning module, a phone adapter module, or a wireless network communication module.

As will be readily appreciated from the foregoing summary, this embodiment of the invention provides an improved system and method for performing voice recognition processing where the processing is performed remote from the person inputting the voice. See SYSTEM AND METHOD FOR TRANSMITTING VOICE INPUT FROM A REMOTE LOCATION OVER A WIRELESS DATA CHANNEL Ser. No. 10/059,905.

Another feature or embodiment of the present invention provides a system and method for reducing the amount of repetitive data sent by a server to a client for vehicle navigation. The system includes a computer-based vehicle unit located in a vehicle, a gateway configured to wirelessly send and receive trip information to and from the vehicle unit, and a computer-based server in communication with the gateway over a network. The vehicle unit wirelessly receives signals from a computer-based server that include the desired navigation information. The vehicle unit includes a user interface component that presents the received navigation information and record user requests. The server processes the requests, generates a trip plan according to the navigation information, and sends the generated trip plan back to the vehicle unit via a gateway when a request is completed.

The server includes a receiving component that receives information from the vehicle unit via the gateway, a trip plan generator that generates a plan according to navigation information, vehicle coordinates, and trip navigation instructions. The trip plan generated includes a table of locations for the trip plan associated with the navigation instructions. Along with the receiving component, the server includes a first sending component that sends the generated trip plan table to the vehicle unit via the gateway. The server also includes a transaction component that completes a transaction based upon the navigation instructions and the trip plan generated. The vehicle unit chooses navigation prompts included in the trip plan based on a comparison of the present vehicle coordinates and the trip plan. The chosen navigation prompts are dependent upon whether the vehicle coordinates are within a reasonable threshold value from the location associated with the navigation prompts.

In accordance with further aspects of this embodiment of the invention, the user requests include voice instructions.

In accordance with still further aspects of this embodiment of the invention, the user interface includes a microphone for recording voice instructions and a speaker for presenting received voice prompts audibly.

In accordance with yet other aspects of this embodiment of the invention, the transaction component includes a voice recognition processor configured to perform voice recognition processing of the recorded requests.

In accordance with other aspects of this embodiment of the invention, the navigation prompts include voice prompts.

In accordance with further aspects of this embodiment of the invention, if the vehicle coordinates are not within a reasonable threshold value from the location associated with the navigation prompts the vehicle unit contacts the server and requests a new trip plan using the current vehicle coordinates.

As will be readily appreciated from the foregoing summary, this embodiment of the invention provides a system and method for reducing the amount of repetitive data sent by a server to a client for vehicle navigation, as well as reduce the airtime required for such computation. See SYSTEM AND METHOD FOR REDUCING THE AMOUNT OF REPETITIVE DATA SENT BY A SERVER TO A CLIENT FOR VEHICLE NAVIGATION Ser. No. 10/689,504

Another feature or embodiment of the present invention provides a system and method for providing services to users in vehicles based on radio broadcasts received by a radio receiver in the vehicle. The system includes a computer-based vehicle unit located in a vehicle, a gateway configured to wirelessly send and receive information to and from the vehicle unit, and a computer-based server in communication with the gateway over a network. The vehicle unit wirelessly receives a radio broadcast from a radio station, transmits vehicle information, communicates radio broadcast information to the server via the gateway, and receives content from the server via the gateway. The vehicle information includes vehicle location and the broadcast frequency or station identification to which the radio receiver is tuned. The content is associated with the radio broadcast. The vehicle unit includes a user interface component that presents the received content and radio broadcast and records user requests. The server processes the requests and sends confirmation messages back to the unit via the gateway when a request has been completed or other information needs to be sent to the unit.

The server includes a receiving component that receives information from the vehicle via the gateway, a content generator that generates content based on prestored radio broadcast information and associated vehicle information, and a first sending component that sends the generated content to the vehicle unit via the gateway. The server also includes a transaction component that completes a transaction based on the request and pre-stored user information, a confirmation component that generates a confirmation message based on the completed transaction, and a second sending component that sends the generated confirmation message to the vehicle via the network and the gateway.

In accordance with still further aspects of this embodiment of the invention, the user interface includes a microphone for recording requests and a speaker for presenting received content audibly.

In accordance with yet other aspects of this embodiment of the invention, the user interface includes a display for displaying one or more images or textual information associated with at least a portion of the content or the message.

In accordance with still another aspect of this embodiment of the invention, the transaction component includes a voice recognition processor configured to perform voice recognition processing of the recorded request.

In accordance with still further aspects of this embodiment of the invention, the transaction component includes a monetary transfer component configured to perform a monetary transfer with a bank system over a network connection based on user information and the user request.

In accordance with yet another aspect of this embodiment of the invention, the transaction component includes a business information component configured to retrieve information from a business system over a network connection based on the user request, wherein the confirmation information includes at least a portion of the information retrieved from the business system.

In accordance with further aspects of this embodiment of the invention, the recorded user request is a request to purchase an item offered for purchase in one or more of the received radio broadcast or the sent content.

As will be readily appreciated from the foregoing summary, this embodiment of the invention provides a system and method for improving services to users in vehicles based on radio broadcasts received by a radio receiver in the vehicle. See A SYSTEM AND METHOD TO ASSOCIATE BROADCAST RADIO CONTENT WITH A TRANSACTION VIA AN INTERNET SERVER Ser. No. 09/884,854.

Another feature or embodiment of the present invention includes a system and method for wirelessly connecting a computer device to a server. The system includes a computer device and a phone number look-up device. The computer device includes a location generator, memory, a processor, and a communication device. The location generator generates data related to the location of the computer device. The memory stores server phone numbers based on location. The processor retrieves a server phone number from the memory based on the generated location data, and generates a request that includes the generated location data if no server phone number corresponds to the generated location data. The communication device wirelessly connects the computer device to a server using the retrieved server phone number, and wirelessly sends the generated request to a default phone number. The phone number look-up device associated with the default phone number includes memory, a communication device, and a processor. The memory of the phone number look-up device stores server phone numbers based on location. The communication device receives the request from the computer device and sends it to the processor. The processor retrieves a server phone number from the memory based on the received request. The communication device sends the retrieved server phone number to the computer device, and the communication device of the computer device wirelessly connects to a server based on the sent server phone number.

In accordance with further aspects of this embodiment of the invention, the computer device is a telematics control unit, a laptop computer, or a personal data assistant.

In accordance with other aspects of this embodiment of the invention, the location generator is an active speech recognition device that records location information as spoken by a user, and generates location data by performing active speech recognition of the recorded location information. Location information can also be received from a GPS receiver.

As will be readily appreciated from the foregoing summary, this embodiment of the invention provides a system and method for providing the most economical wireless connection between a mobile device and a stationary server. See LOCAL PHONE NUMBER LOOKUP AND CACHE Ser. No. 10/059,893.

Embodiments of the present invention provide an "as needed" extension of wireless network geographic coverage, service access/fulfillment or service level (e.g., available bandwidth) dynamically in response to a request received from a wireless device. As part of this request, the wireless device provides information identifying its location and/or a set of signals describing the basis of the request for additional communication services.

More specifically, according to an embodiment of the present invention, a remote station is associated with a first communicator configured to communicate over a first communication network and a second communicator configured to communicate over a second communication network. A communication controller associated with the remote station and coupled with the first communicator and the second communicator is operable to transmit a first set of signals using the first communicator and a second set of signals using the second communicator. A mobile network access point is directable to within a communication range of the second communicator of the remote station when the remote station is outside of an existing communication range of the second communication network and the first set of signals includes a resource request for the second communication network.

In accordance with further aspects of the present invention, the system includes a communication controller configured to be coupled with at least one of the first communicator and the second communicator for receiving inputs concerning a status of the remote station and reporting that status using at least one of the first communicator and the second communicator. The communication controller is configured to be coupled with sensing equipment for gathering information about the status of the remote station. The sensing equipment includes at least one of a telephone interface configured to provide audio communication with a remote station operator, a global positioning system for determining a geographical position of the remote station, a monitoring device for generating telemetry reflecting conditions at the remote station, and an alert key for signaling an emergency situation at the remote station. According to an embodiment of the present invention, the first set of signals includes at least one of a location of the remote station, a request for communication with a second communication network, and an event code signifying a condition at the remote station for which transmitting the second set of signals is desired. The second set of signals includes the telemetry reflecting the conditions at the remote station. See SYSTEM AND METHOD FOR DYNAMICALLY CONFIGURING WIRELESS NETWORK GEOGRAPHIC COVERAGE OR SERVICE LEVELS Ser. No. 10/440,023.

Another feature or embodiment of the present invention is a system and method for reviewing inputted voice instructions in a vehicle-based telematics control unit. The system includes a microphone, a speech recognition processor, and an output device. The microphone receives voice instructions from a user. Coupled to the microphone is the speech recognition processor that generates a voice signal by performing speech recognition processing of the received voice instructions. The output device outputs the generated voice signal to the user. The system also includes a user interface for allowing the user to approve the outputted voice signal, and a communication component for wirelessly sending the generated voice signal to a server over a wireless network upon approval by the user.

In accordance with further aspects of this embodiment of the invention, a first component generates a digest including the generated voice signal, and a second component sends the digest to a human operator system.

In accordance with other aspects of this embodiment of the invention, a text generator generates text from the generated voice signal, and the output device includes a display that presents the generated text.

In accordance with still further aspects of this embodiment of the invention, a voice synthesizer generates speech based on the generated voice signal, and the output device includes at least one speaker for presenting the generated voice.

As will be readily appreciated from the foregoing summary, this embodiment of the invention provides a feedback system for ensuring accuracy when providing voice instructions. See REAL-TIME DISPLAY OF SYSTEM INSTRUCTIONS Ser. No. 10/076,874.

The present invention comprises a system, method and computer program product for performing noise reduction. The system receives a sound signal determined to include speech, then estimates a noise value of the received sound signal. Next, the system subtracts the estimated noise value from the received signal, generates a prediction signal of the result of the subtraction, and sends the generated prediction signal to a speech recognition engine.

In accordance with further aspects of the invention, the system generates a prediction signal based on a linear prediction algorithm. In accordance with other aspects of the invention, first, the system generates a prediction signal of the received signal, then subtracts the estimated noise value from the generated prediction signal, and sends the result of the subtraction to a speech recognition engine. As will be readily appreciated from the foregoing summary, the invention provides improved noise reduction processing of speech signals being sent to a speech recognition engine. See our application entitled NOISE REDUCTION SYSTEM AND METHOD, U.S. patent application Ser. No. 10/024,446 filed Dec. 17, 2001.

BRIEF DESCRIPTION OF THE DRAWINGS

The preferred and alternative embodiments of the present invention are described in detail below with reference to the following drawings.

Drawings relating to the SYSTEM AND METHOD FOR ADAPTABLE MOBILE USER INTERFACE embodiment of the invention Ser. No. 10/454,390.

Drawings relating to the SHARING ACCOUNT INFORMATION AND A PHONE NUMBER BETWEEN PERSONAL MOBILE PHONE AND AN IN-VEHICLE EMBEDDED PHONE embodiment of the invention Ser. No. 10/765,720.

Figure 21:
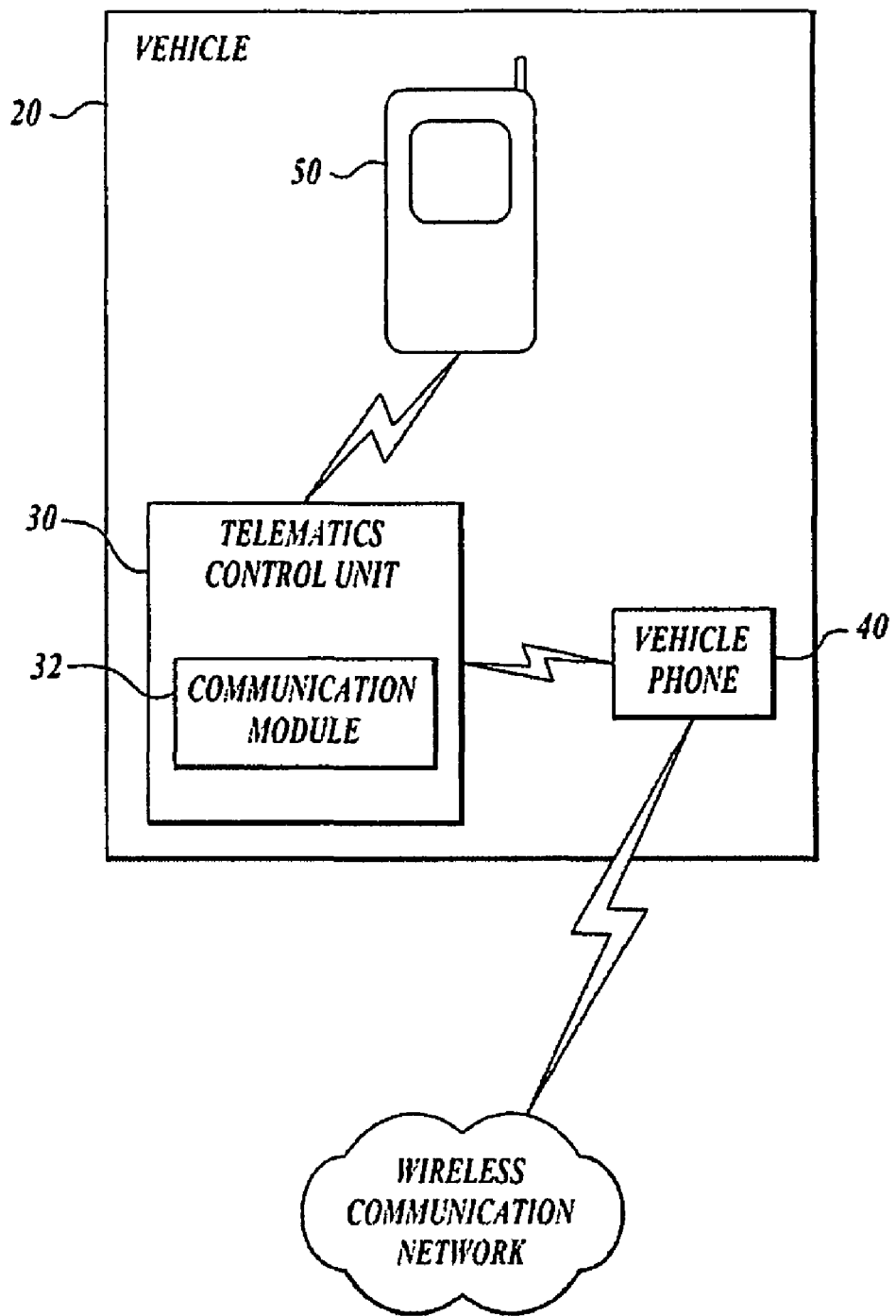
Figure 22:
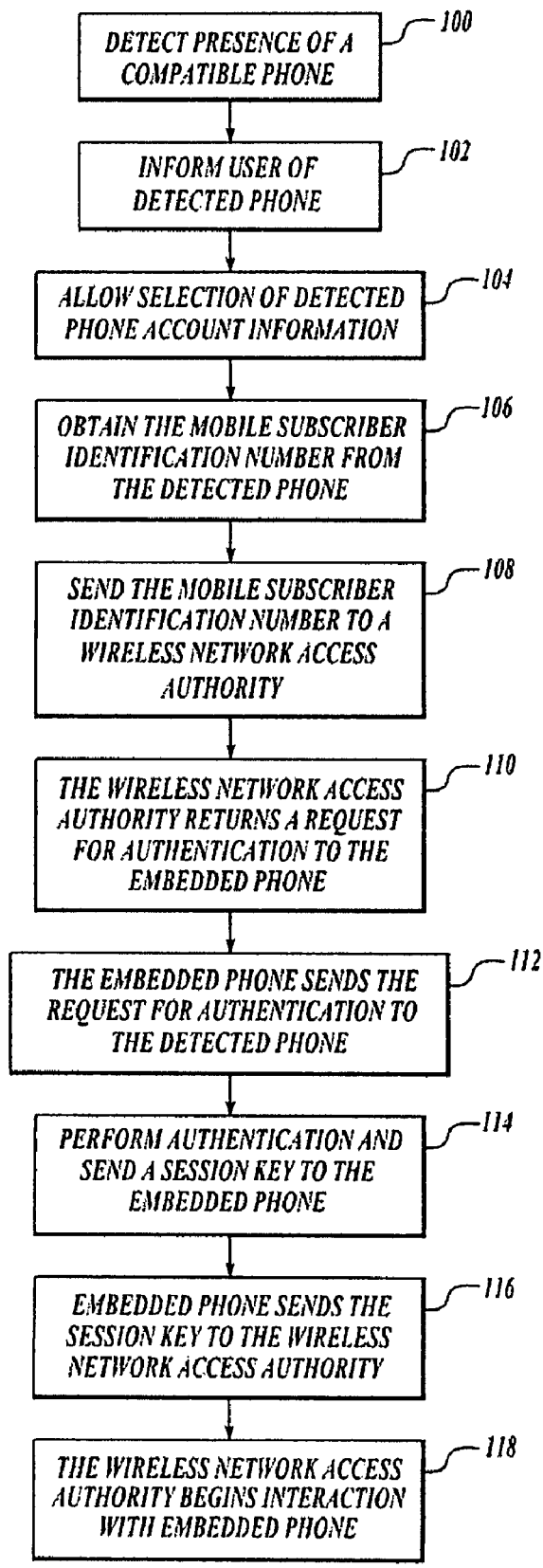

FIG. 21 is a block diagram of an example of this feature or embodiment of the present invention; and FIG. 22 is a flow diagram illustrating a preferred process performed by the system shown in FIG. 21.

Drawings relating to the METHOD AND DEVICE TO DISTINGUISH BETWEEN VOICE CONVERSATION AND AUTOMATED SPEECH RECOGNITION embodiment of the invention Ser. No. 09/884,902.

Figure 31:
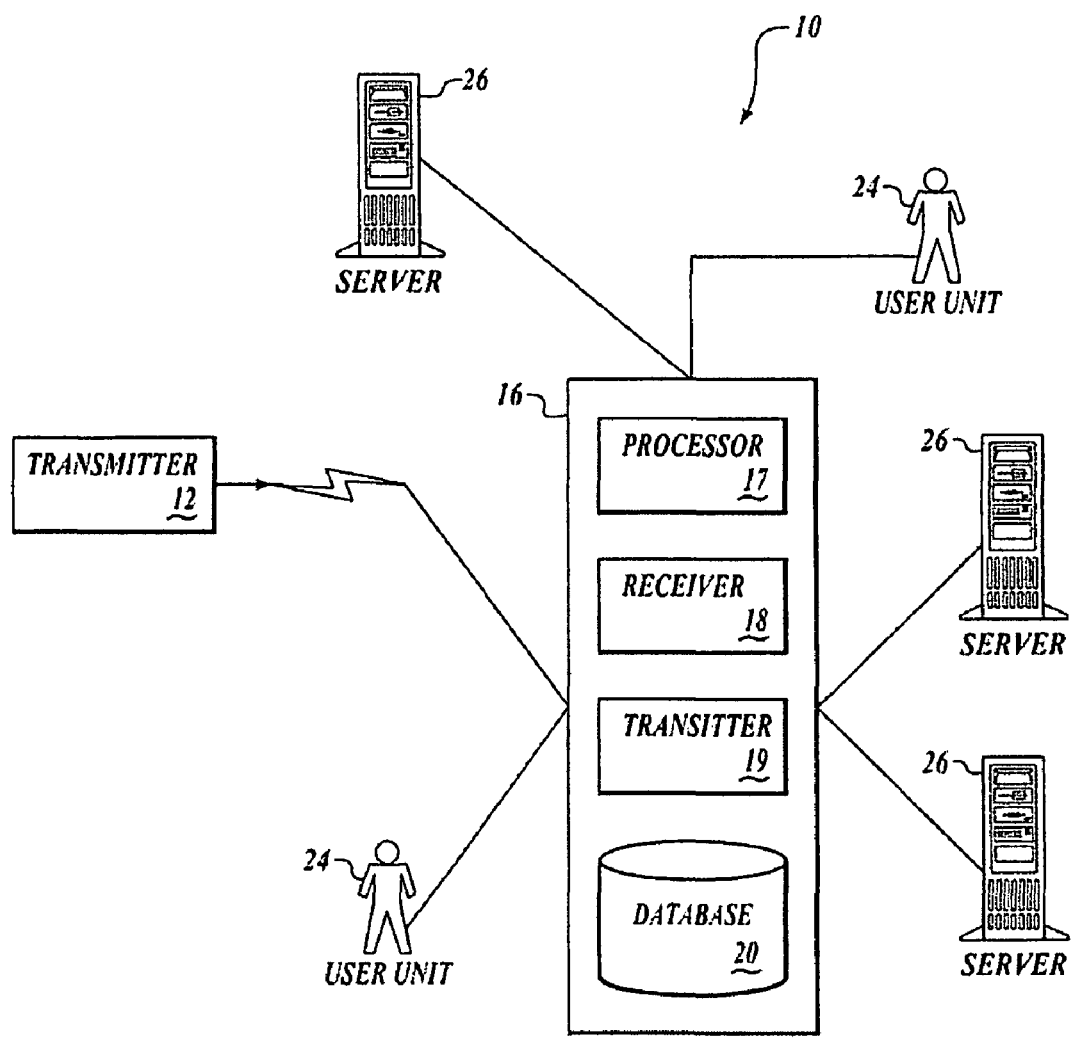
Figure 32:
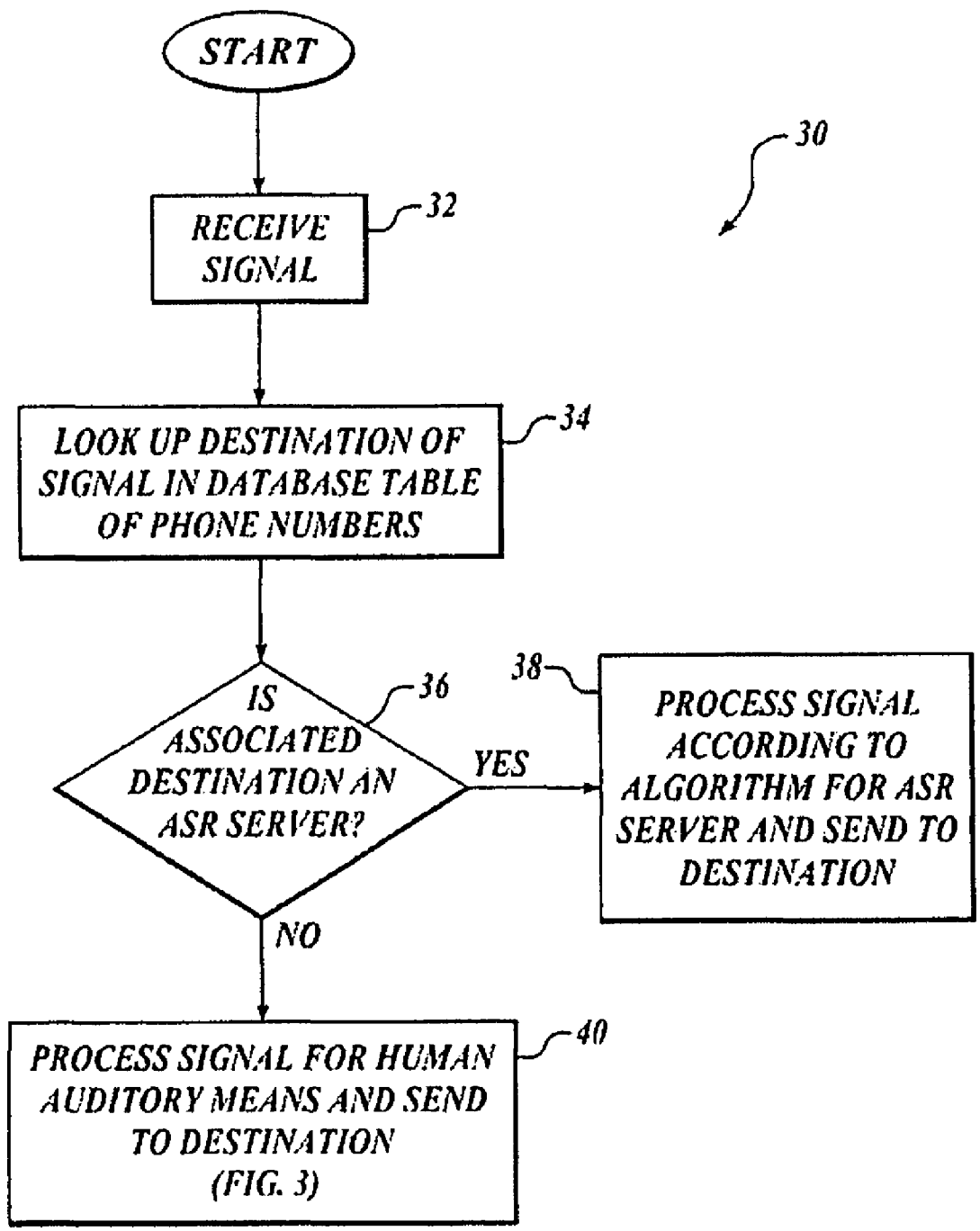
Figure 33:
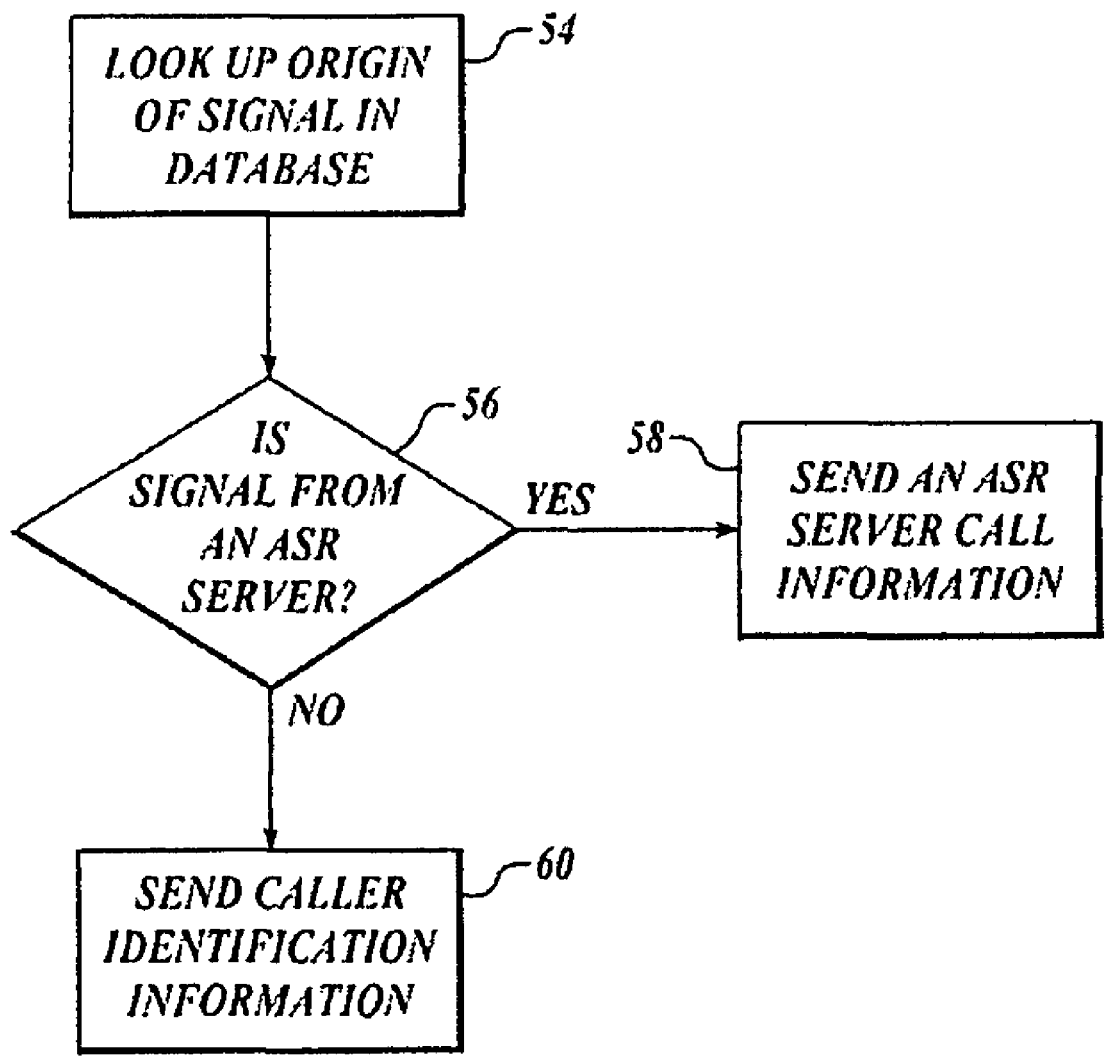
Figure 34:
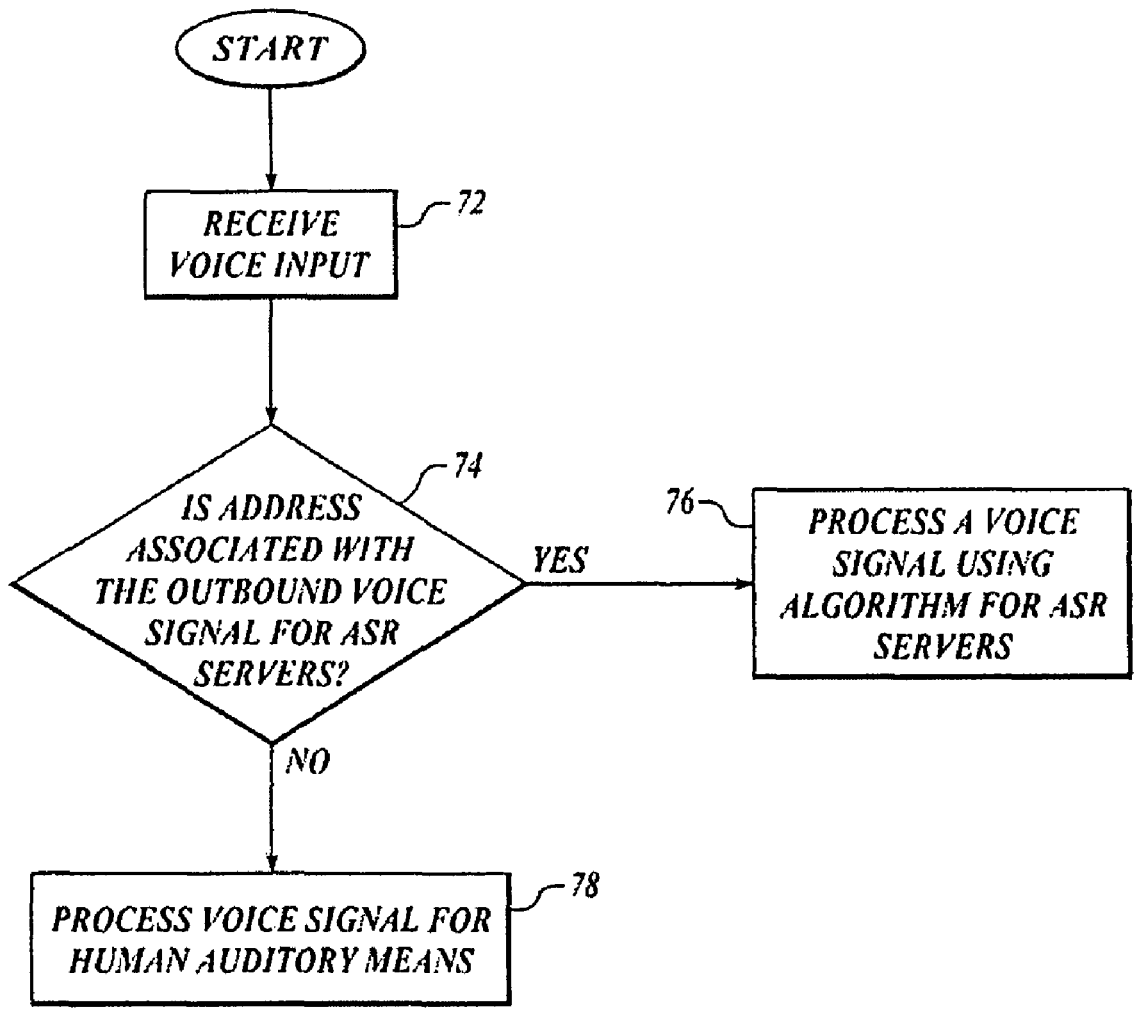
Figure 35:
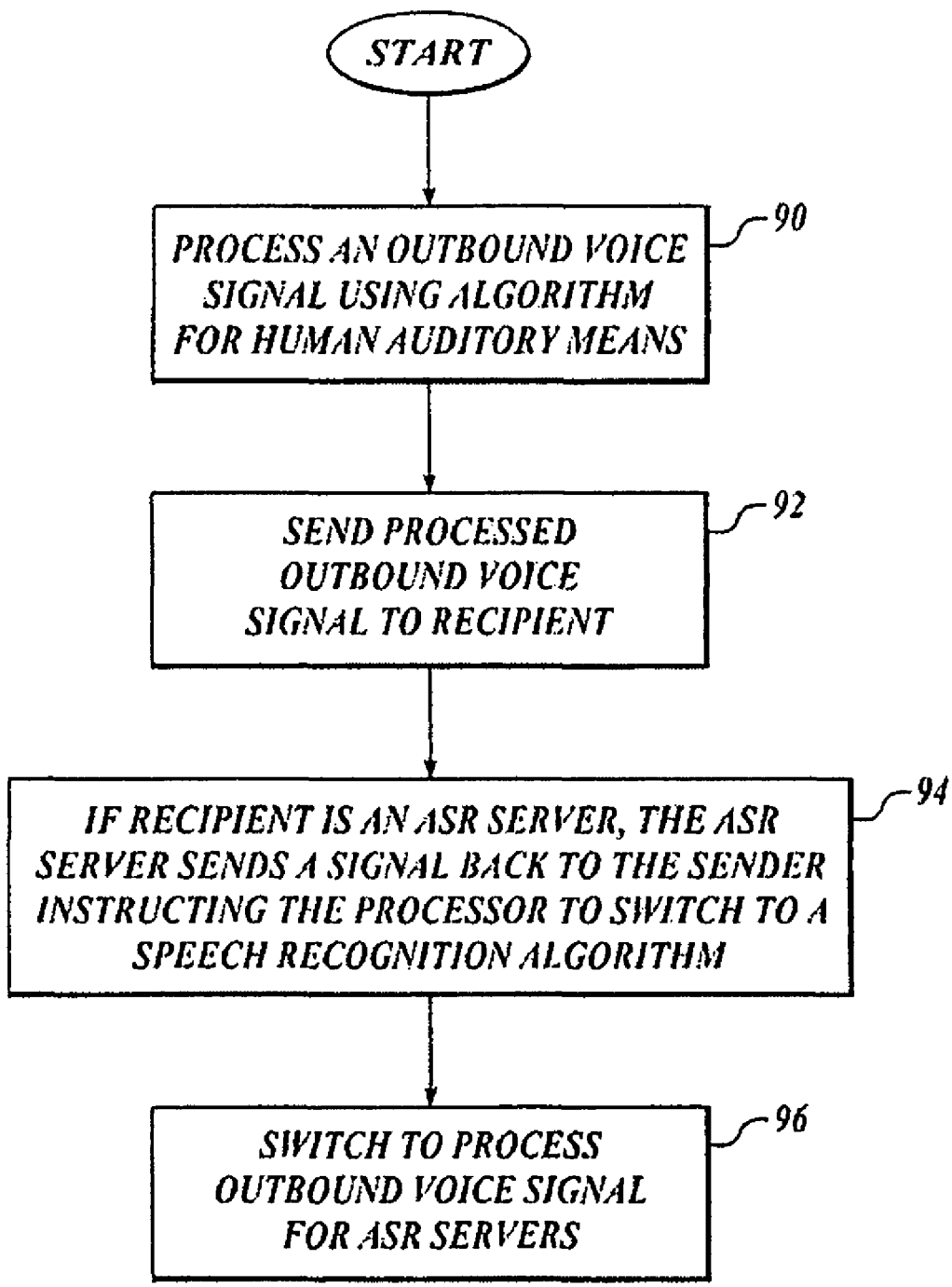

FIG. 31 is a diagram illustrating an exemplary system for receiving and processing voice transmission signals over a wireless network in accordance with this feature or embodiment of the present invention;

FIG. 32 is a flow chart illustrating operation of this feature or embodiment of the present invention;

FIG. 33 is a flow chart illustrating an alternate aspect of this feature or embodiment of the present invention; and FIGS. 34-35 are flow charts illustrating alternative aspects of this feature or embodiment of the present invention.

Drawings relating to the VEHICLE PARKING VALIDATION SYSTEM AND METHOD embodiment of the invention Ser. No. 09/955,476.

Figure 41:
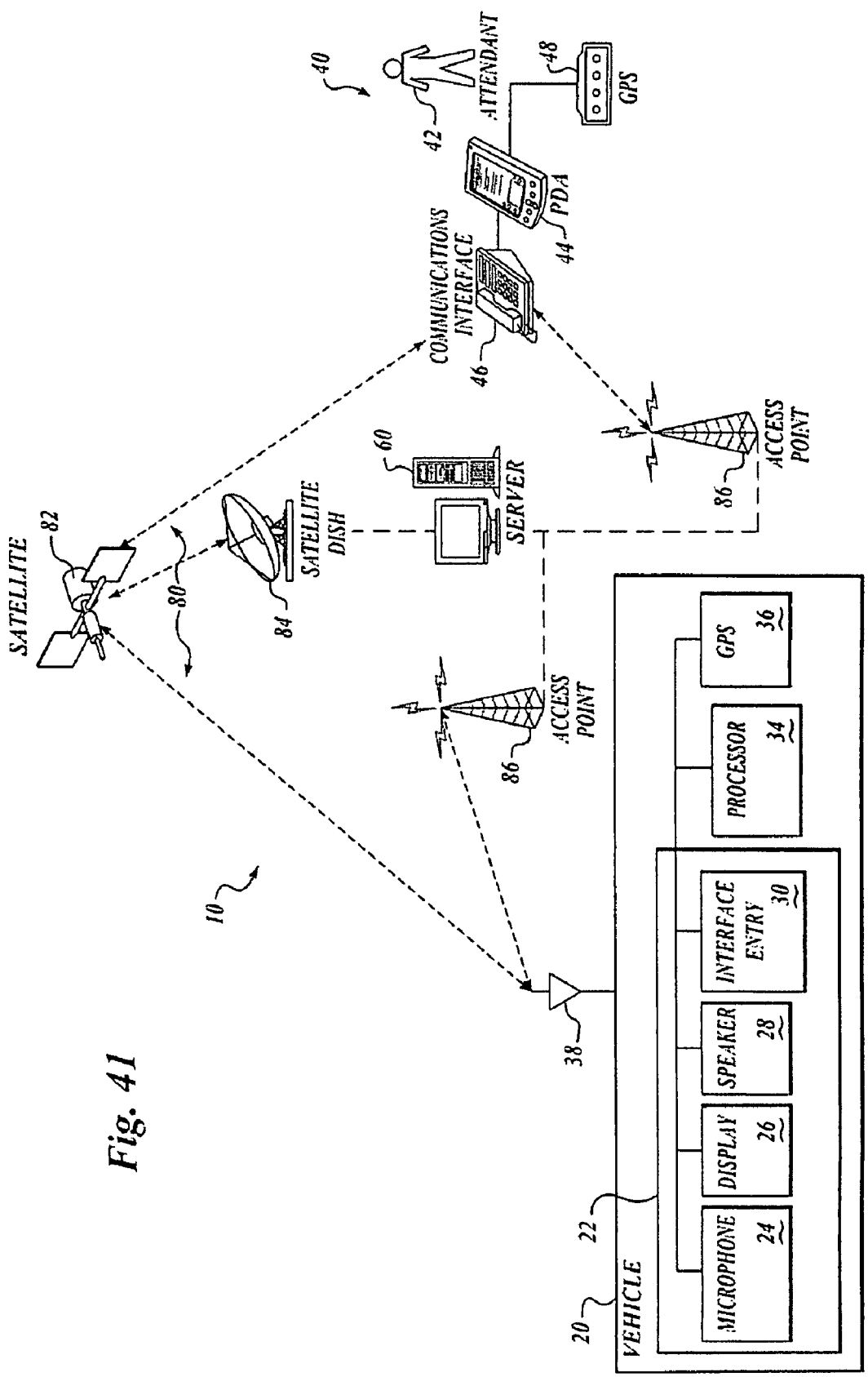
Figure 42:
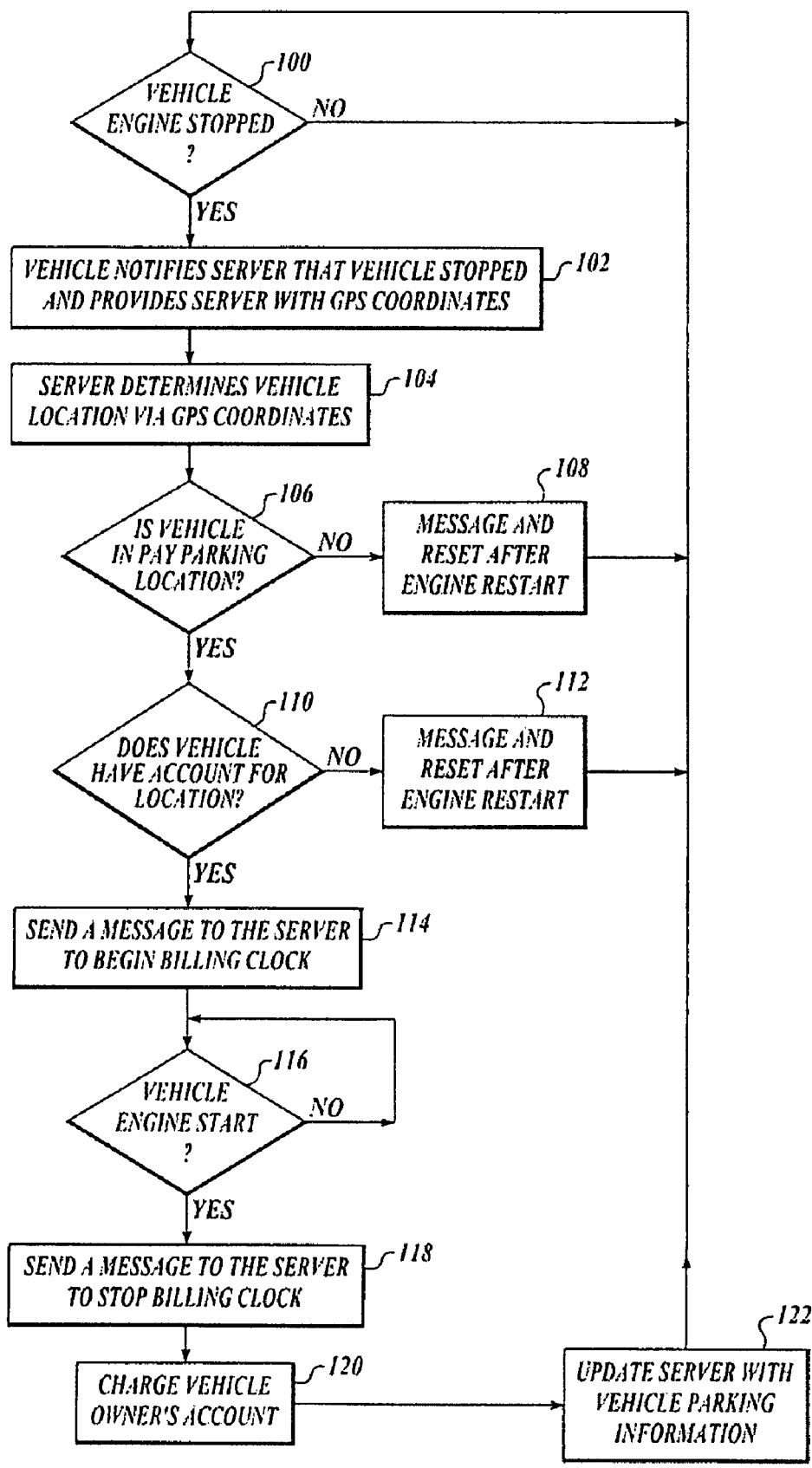
Figure 43:
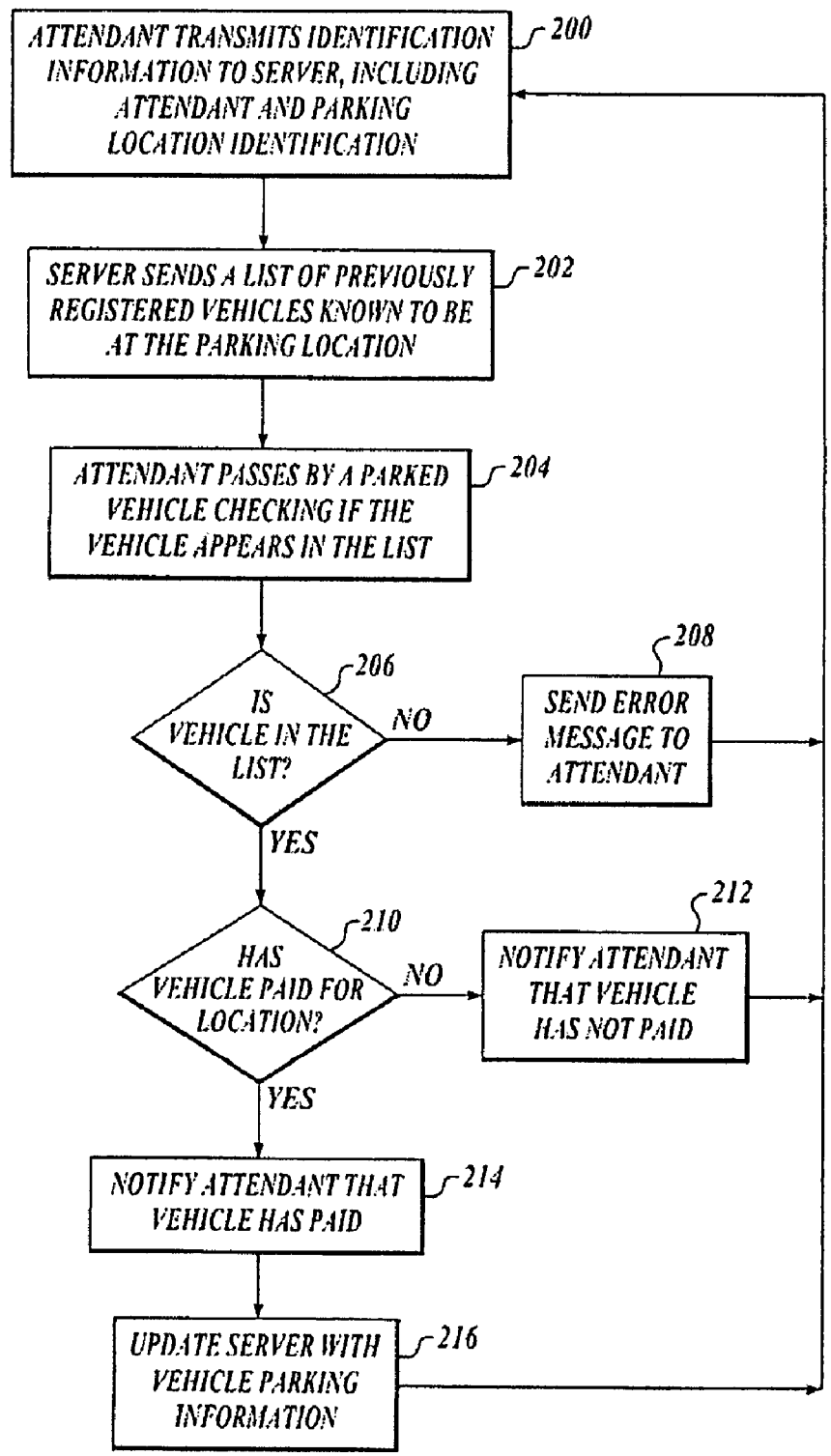

FIG. 41 is a block diagram illustrating the general architecture of a vehicle parking validation system that operates in accordance with this feature or embodiment of the present invention;

FIG. 42 is a flow chart illustrating the operation of one embodiment of this feature or embodiment of the present invention wherein the parking fee is automatically calculated and assessed; and FIG. 43 is a flow chart illustrating the operation of one embodiment of this feature or embodiment of the present invention wherein a parking attendant is involved in validating parking.

Drawings relating to the SYSTEM AND METHOD FOR TRANSMITTING VOICE INPUT FROM A REMOTE LOCATION OVER A WIRELESS DATA CHANNEL embodiment of the invention Ser. No. 10/059,905.

Figure 52:
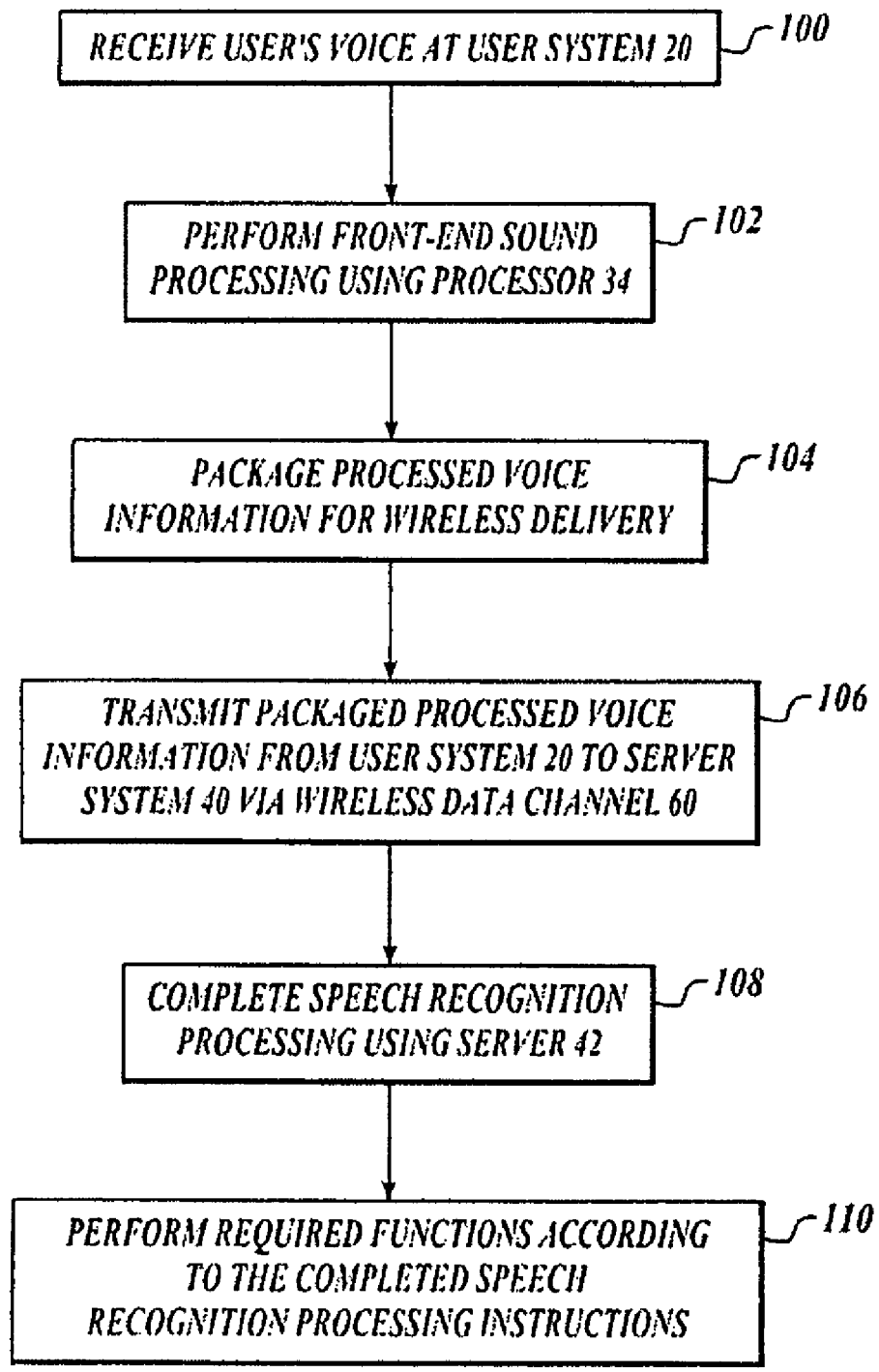
Figure 53:
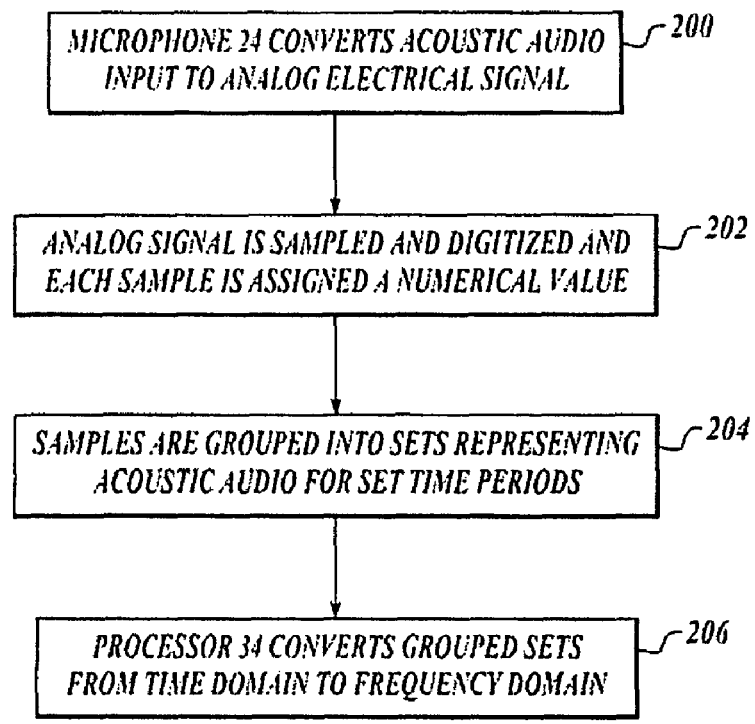
Figure 54A:
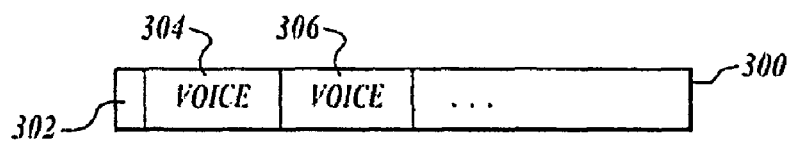
Figure 54B:
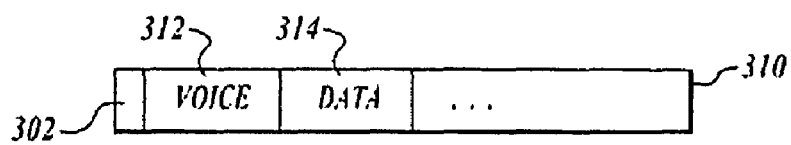
Figure 54C:
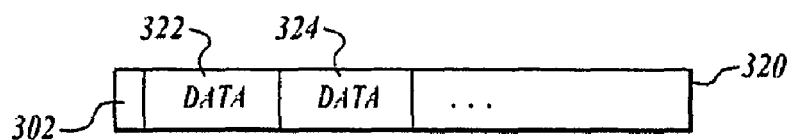
Figure 55:
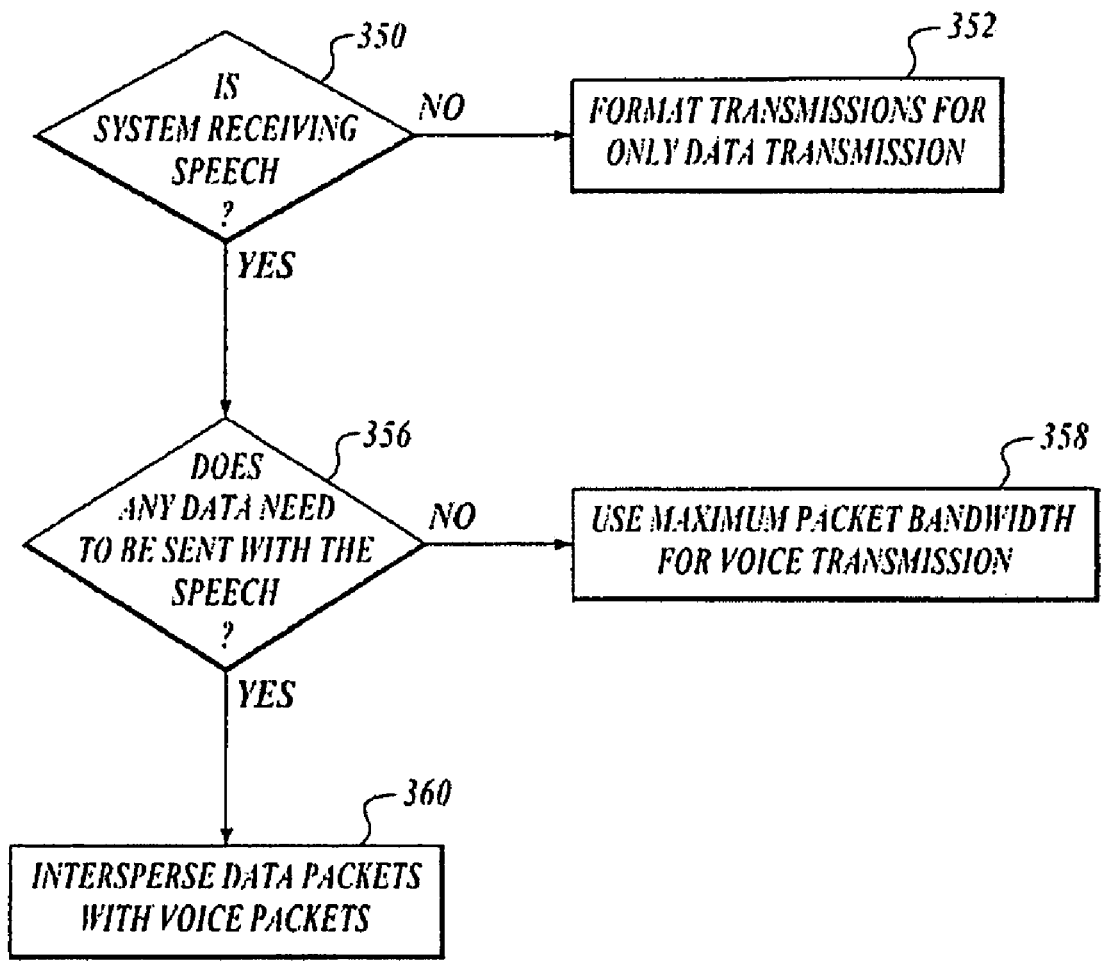

FIG. 51 is a diagram illustrating the general architecture of a mobile speech recognition system that operates in accordance with this feature or embodiment of the present invention;

FIG. 52 is a flow chart illustrating the operation of this feature or embodiment of the present invention;

FIG. 53 is a flow chart illustrating the operation of one embodiment of the front-end sound processing aspect of this feature or embodiment of the present invention; and FIGS. 54A-C are block diagrams of data and voice package streams generated by an alternate embodiment of this feature or embodiment of the present invention; and FIG. 55 is a flow diagram.

Drawings relating to the SYSTEM AND METHOD FOR REDUCING THE AMOUNT OF REPETITIVE DATA SENT BY A SERVER TO A CLIENT FOR VEHICLE NAVIGATION embodiment of the invention Ser. No. 10/689,504.

Figure 61:
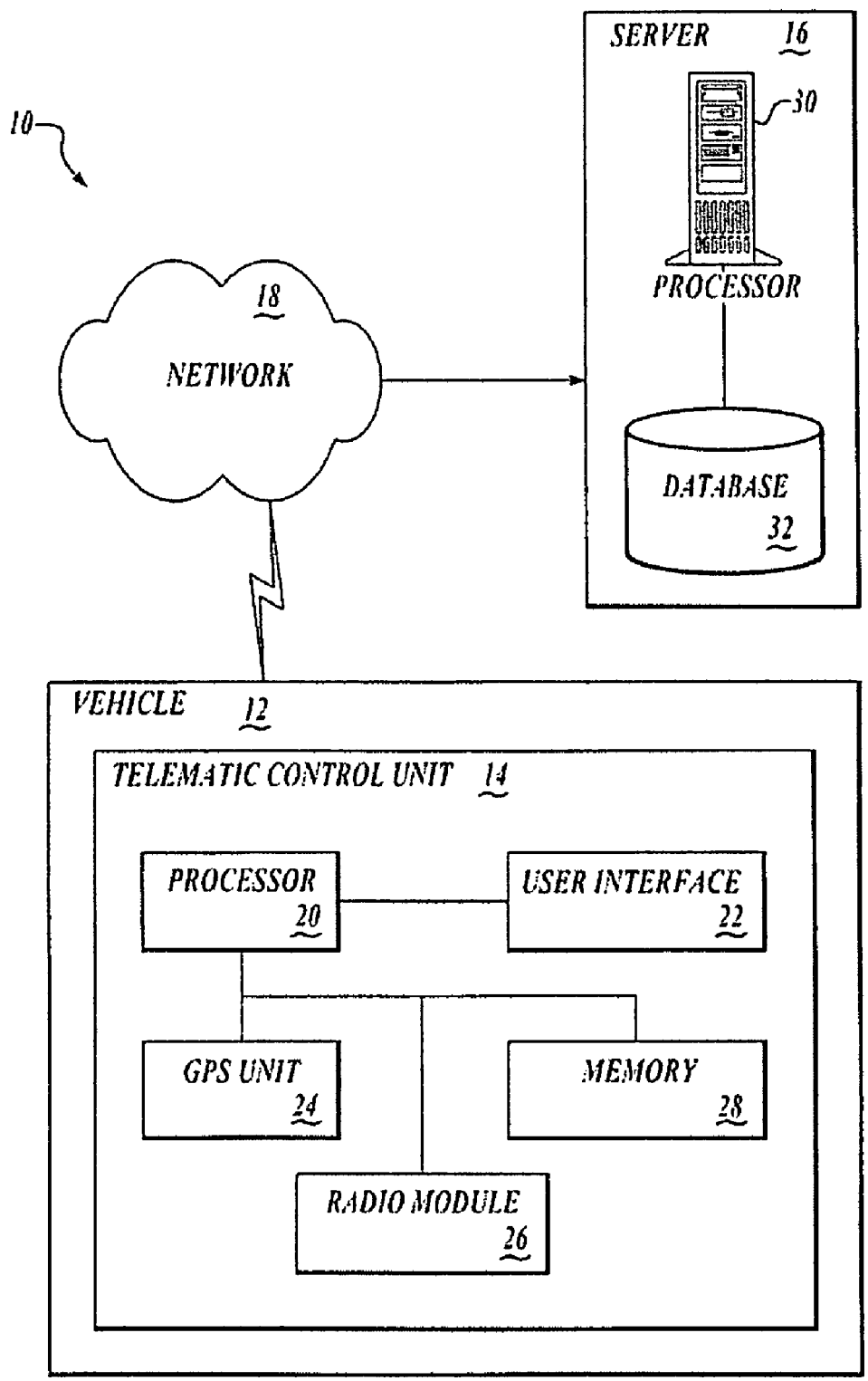
Figure 62:
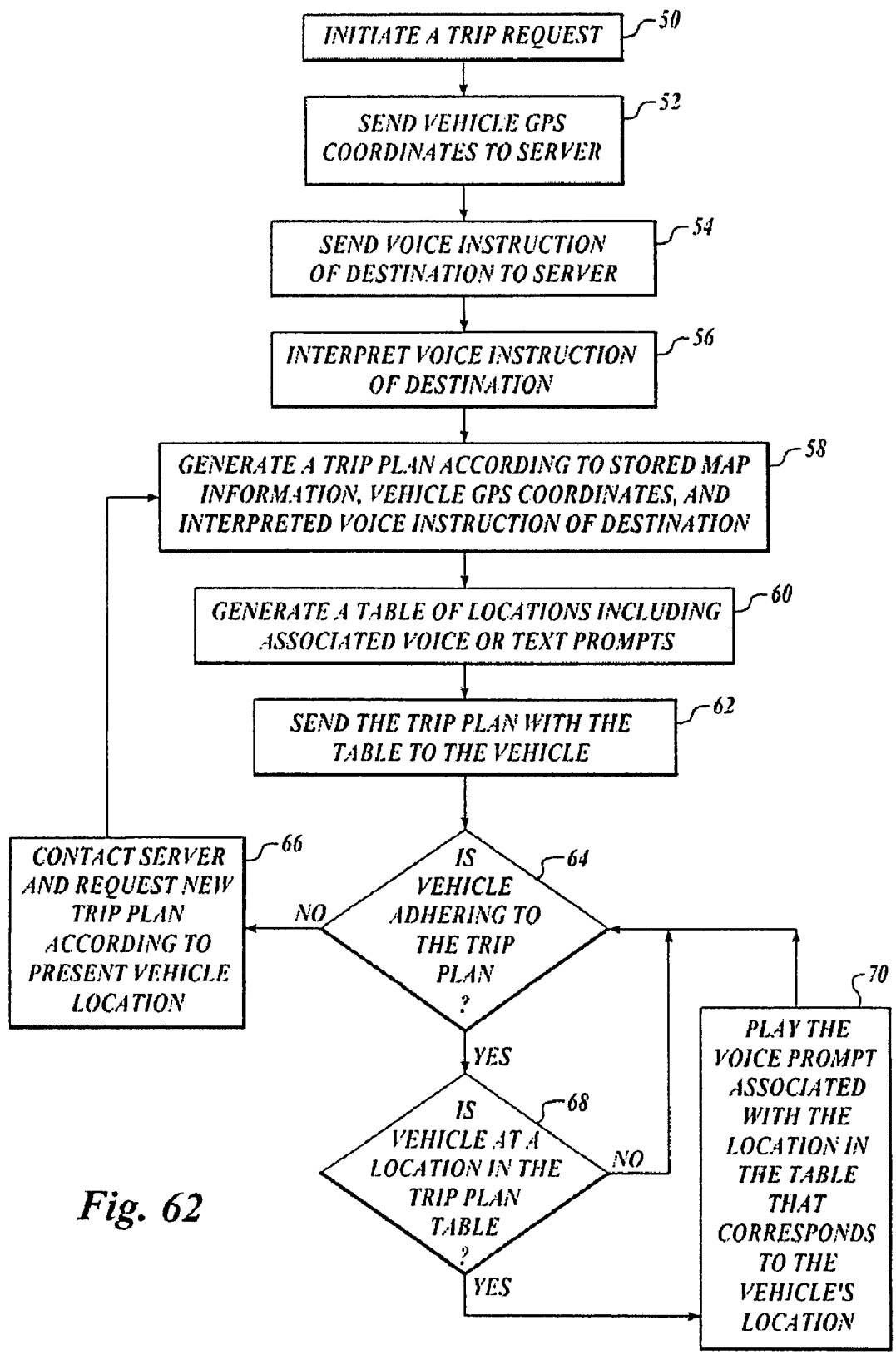
Figure 63:
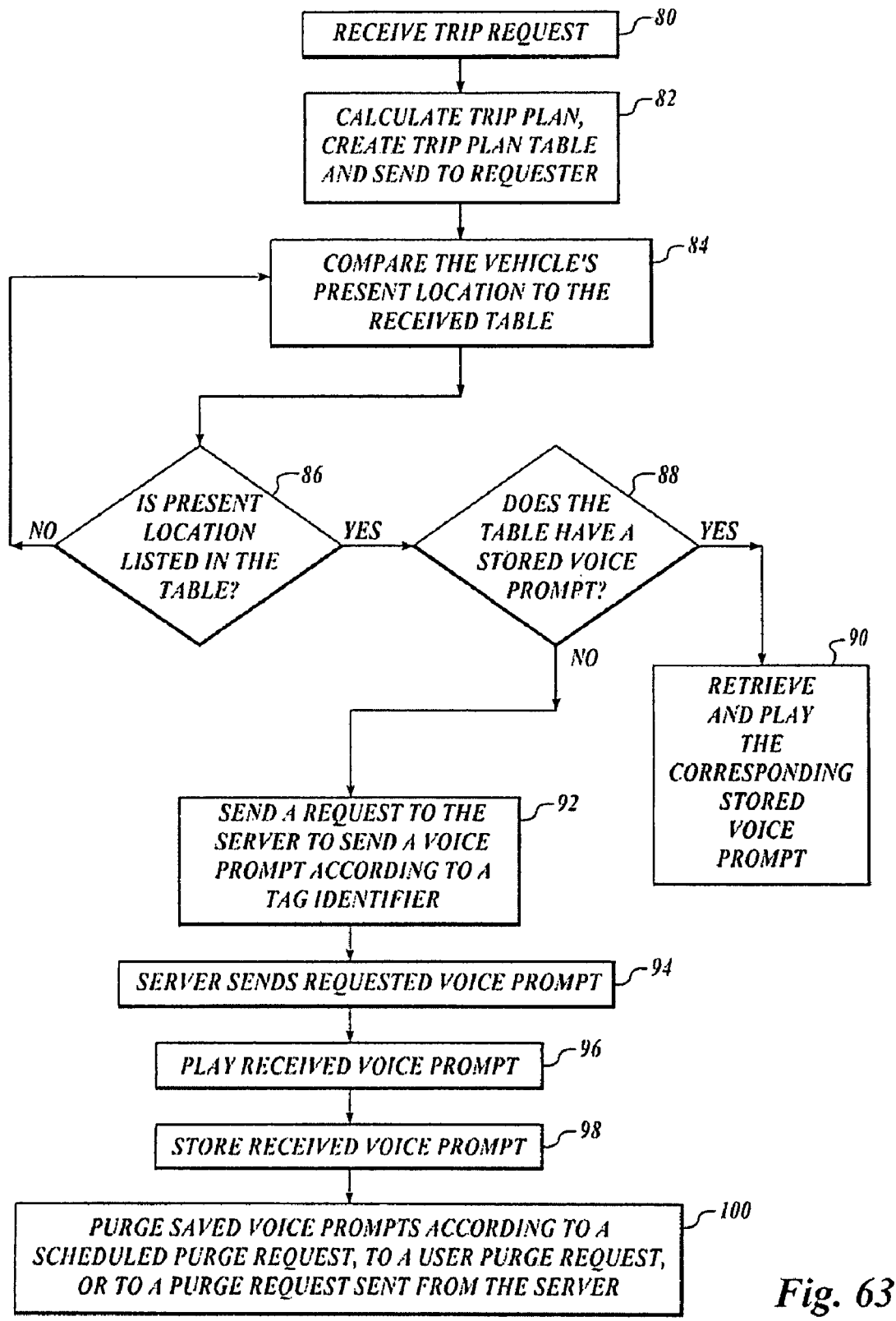

FIG. 61 is a diagram illustrating the general architecture of a system that operates in accordance with this feature or embodiment of the present invention; and FIGS. 62 and 63 are flow charts illustrating various embodiments performed by the system shown in FIG. 61.

Drawings relating to the A SYSTEM AND METHOD TO ASSOCIATE BROADCAST RADIO CONTENT WITH A TRANSACTION VIA AN INTERNET SERVER embodiment of the invention Ser. No. 09/884,854.

Figure 71:
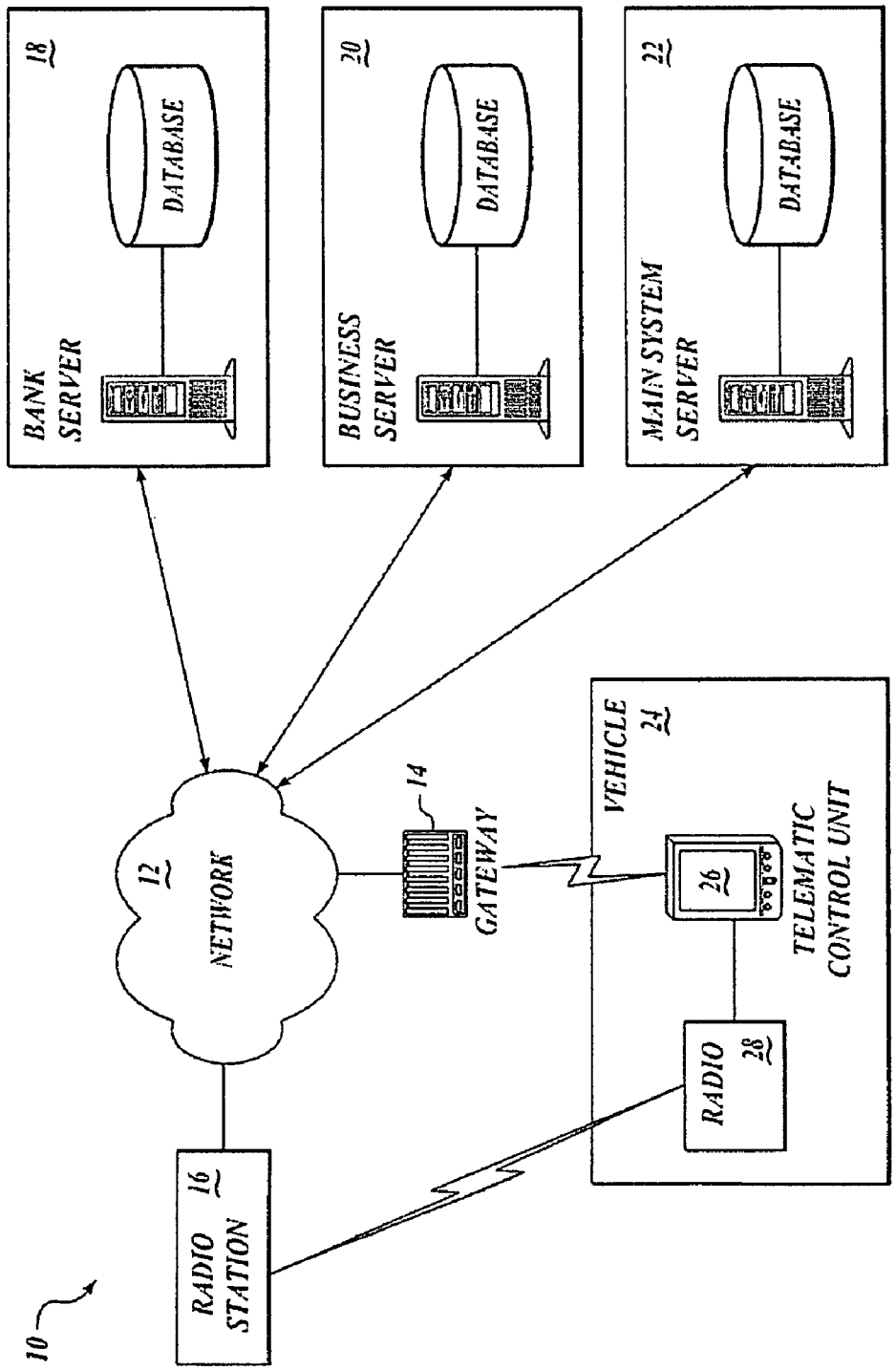
Figure 72:
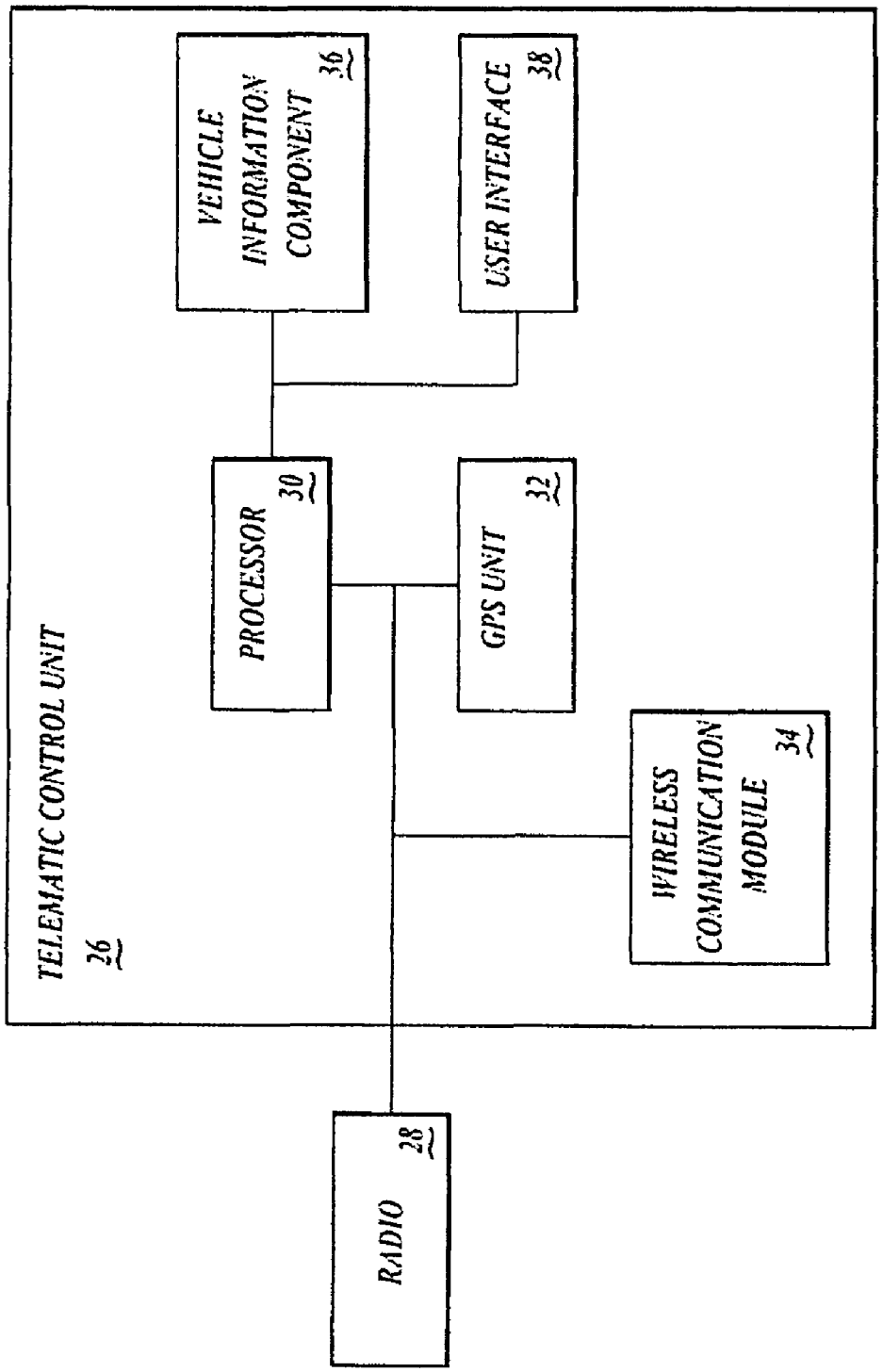
Figure 73:
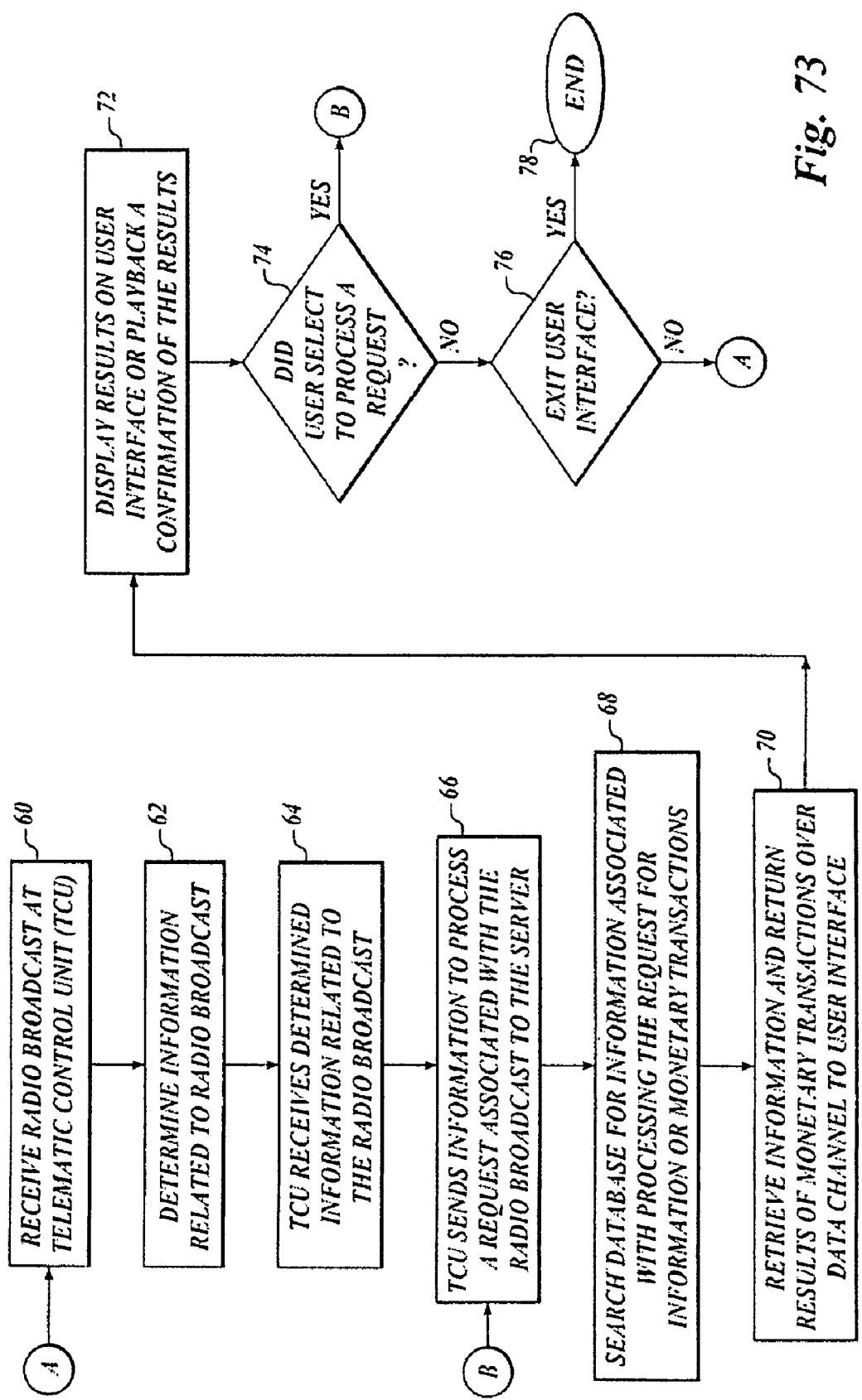

FIG. 71 is a diagram illustrating an exemplary system for performing functions of this feature or embodiment of the present invention;

FIG. 72 is a diagram illustrating the contents of a vehicle interface unit of this feature or embodiment of the present invention; and FIG. 73 is a flow chart illustrating operation of this feature or embodiment of the present invention.

Drawings relating to the LOCAL PHONE NUMBER LOOKUP AND CACHE embodiment of the invention Ser. No. 10/059,893.

Figure 81:
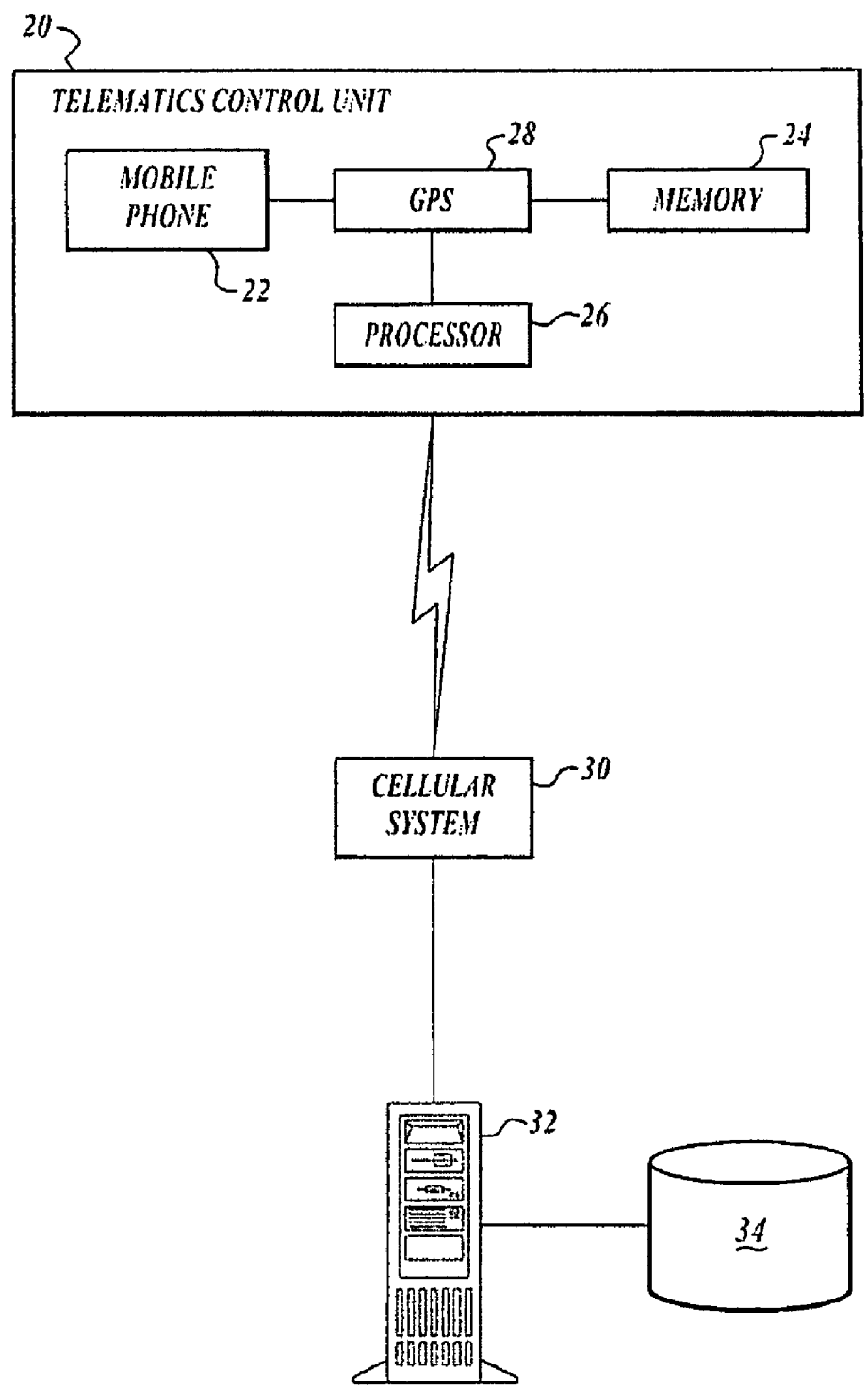
Figure 82:
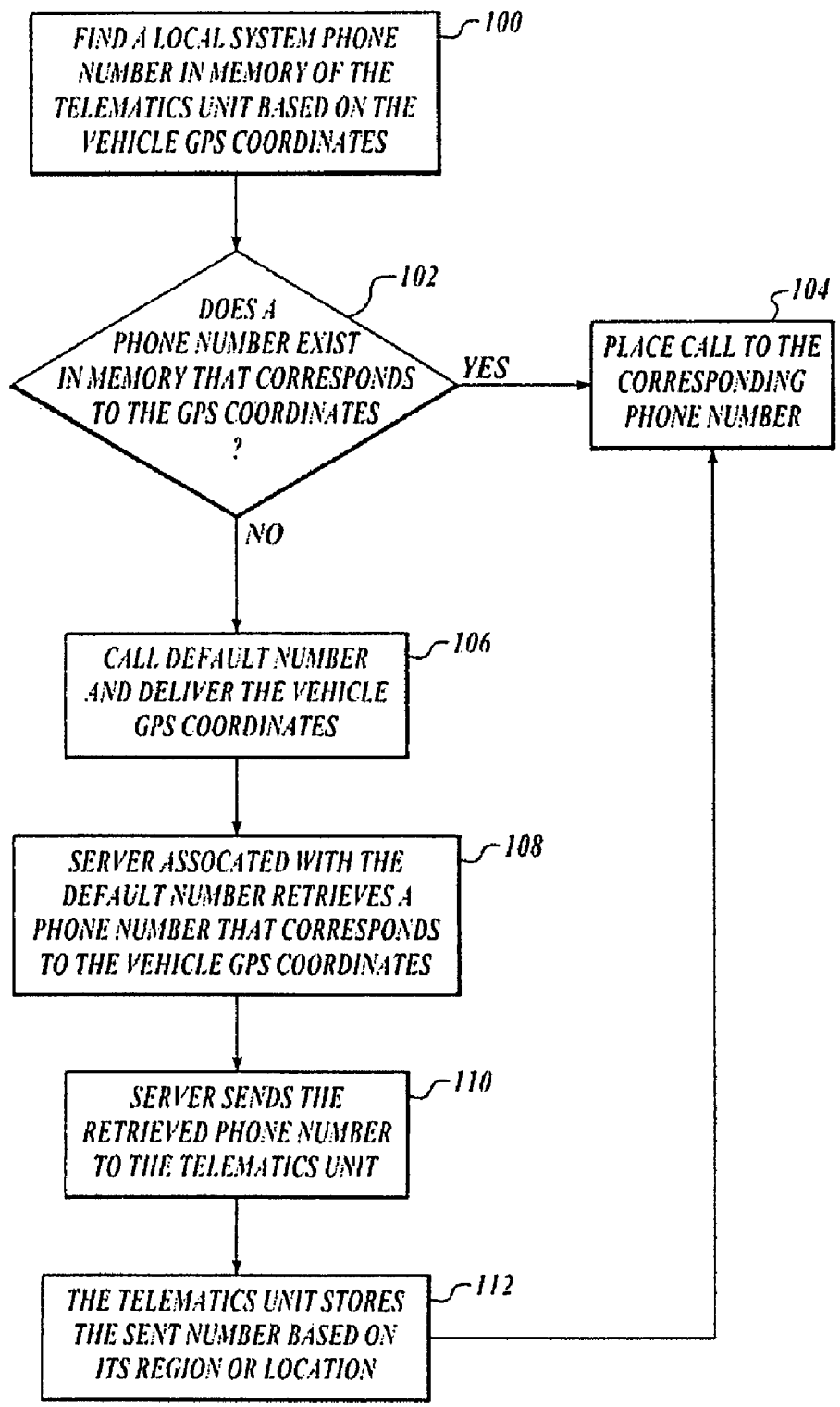

FIG. 81 is a block diagram of an example system formed in accordance with this feature or embodiment of the present invention; and, FIG. 82 is a flow chart illustrating operation of this feature or embodiment of the present invention.

Drawings relating to the SYSTEM AND METHOD FOR DYNAMICALLY CONFIGURING WIRELESS NETWORK GEOGRAPHIC COVERAGE OR SERVICE LEVELS embodiment of the invention Ser. No. 10/440,023.

Figure 92:
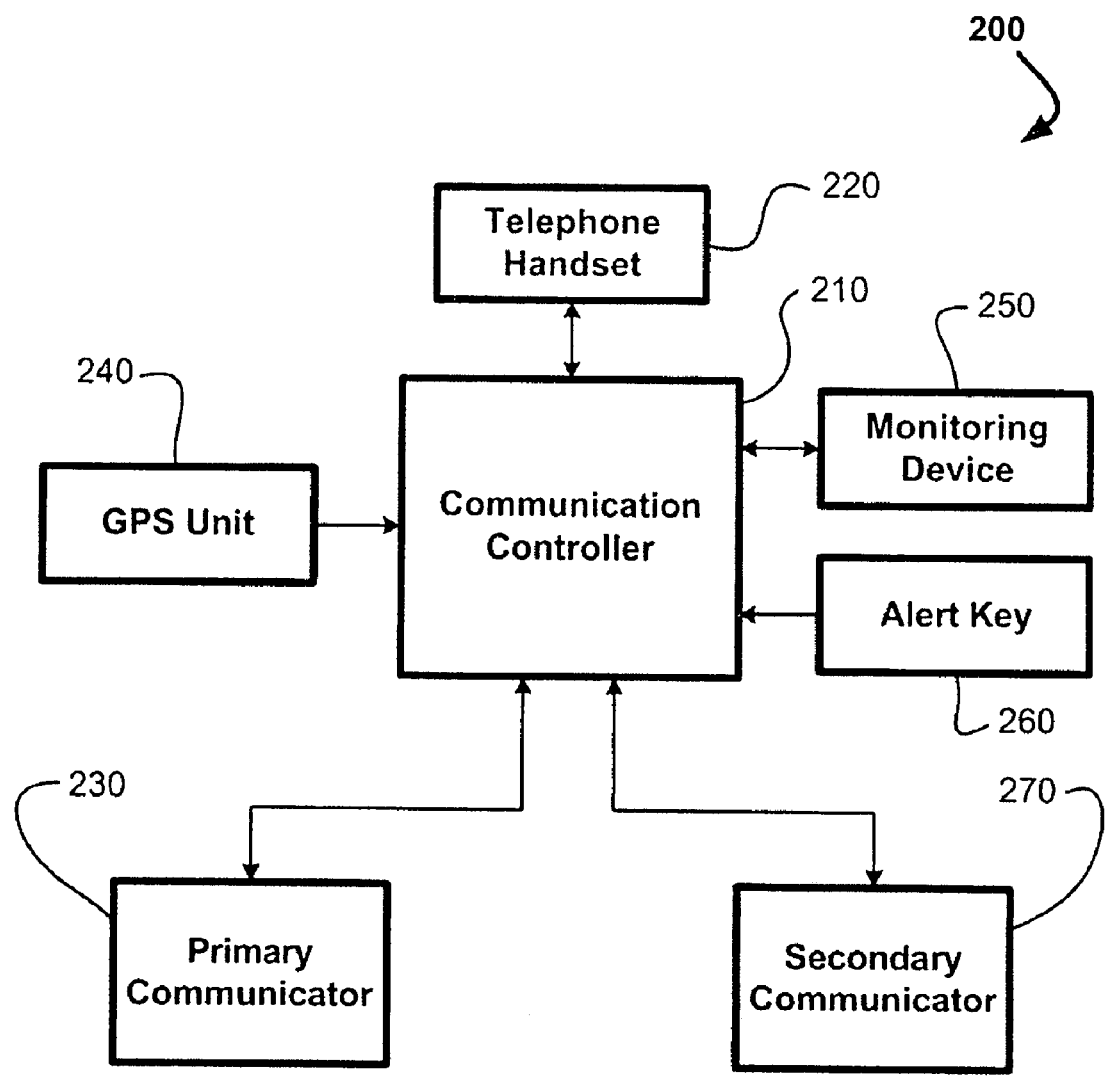
Figure 93:
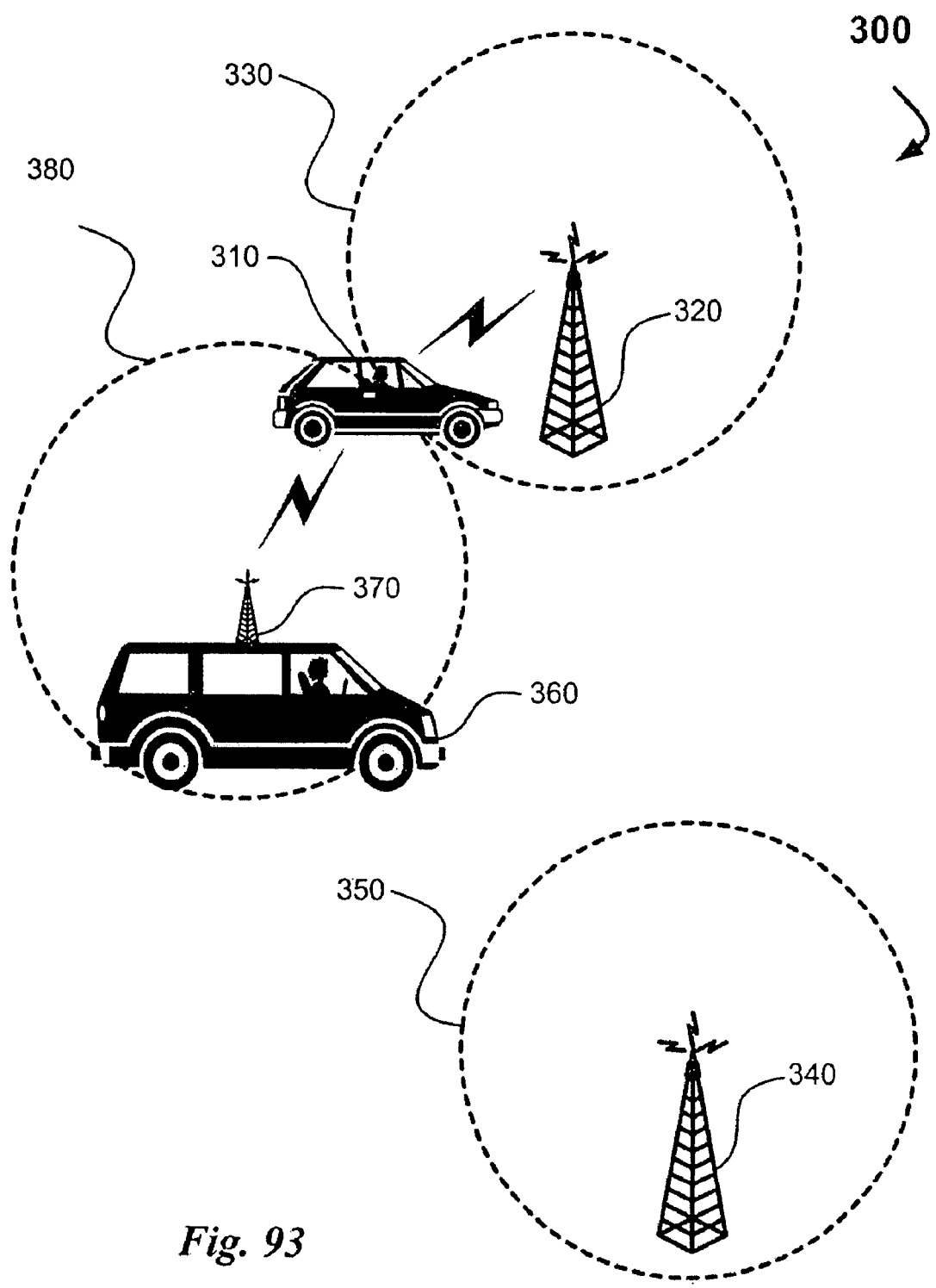
Figure 94:
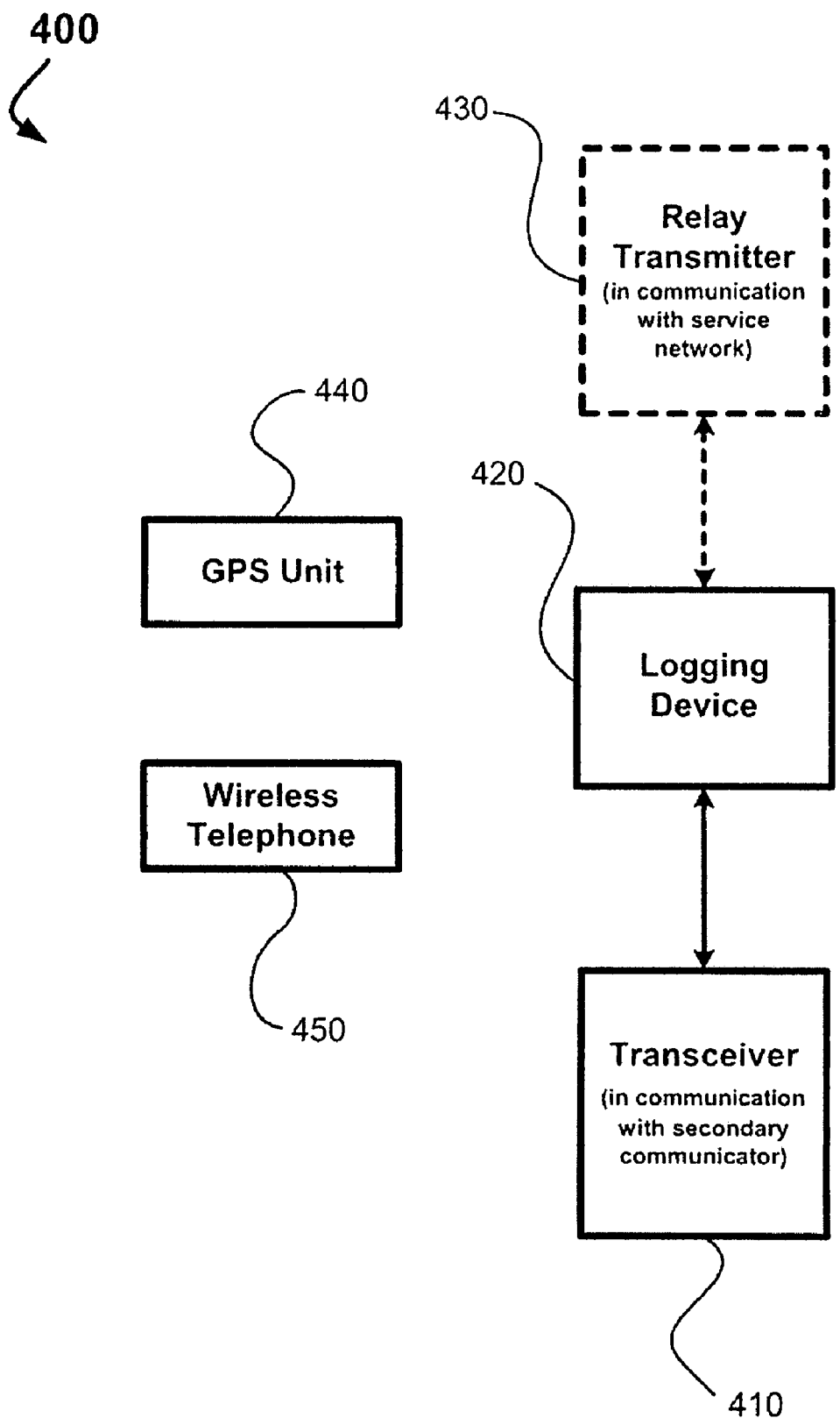
Figure 95:
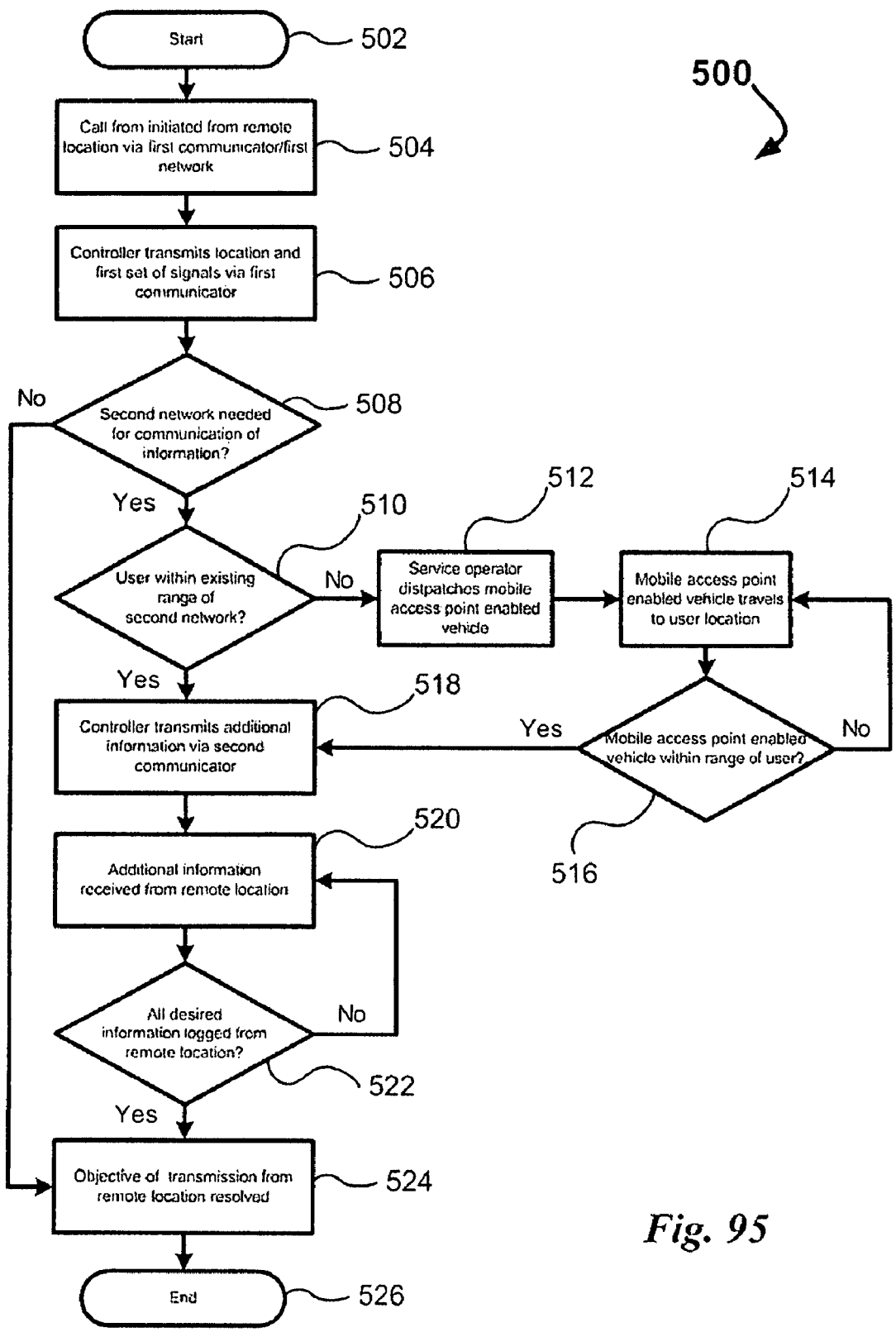

FIG. 91 is a prior art depiction of a remote station in communication with a first communication network but out of range and unable to communicate with a second communication network;

FIG. 92 is a block diagram of a communication system used by a remote station according to an embodiment of this feature or embodiment of the present invention;

FIG. 93 is a remote station in communication with a first communication network and a mobile access point enabling communication with a second communication network;

FIG. 94 is a block diagram of communication systems used by a mobile access point according to an embodiment of this feature or embodiment of the present invention; and FIG. 95 is a flowchart of a method using an embodiment of this feature or embodiment of the present invention.

Drawings relating to the REAL-TIME DISPLAY OF SYSTEM INSTRUCTIONS embodiment of the invention Ser. No. 10/076,874.

Figure 101:
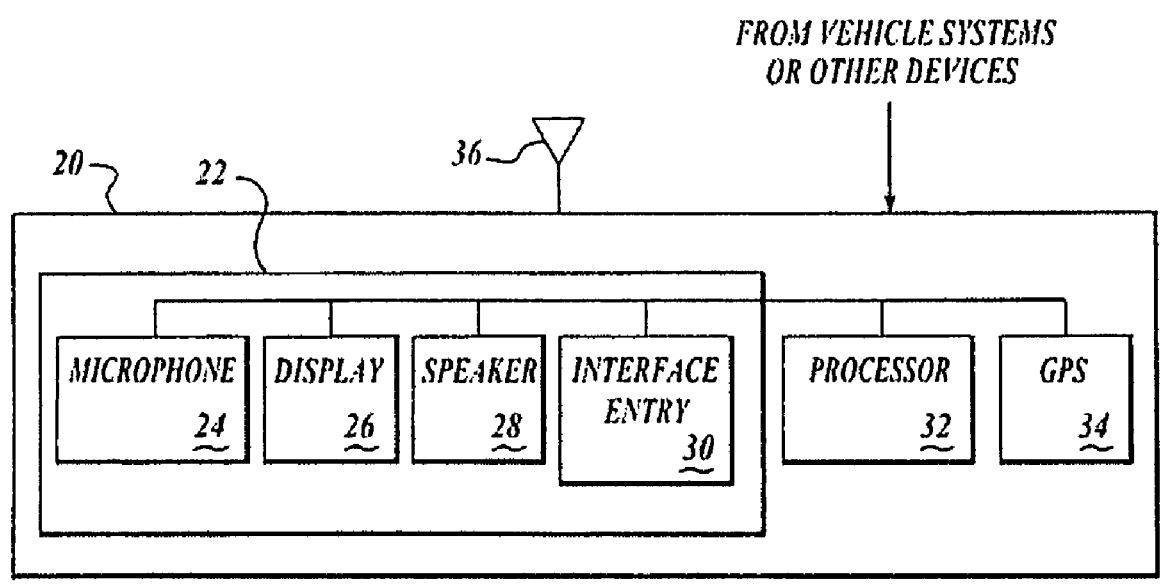
Figure 102:
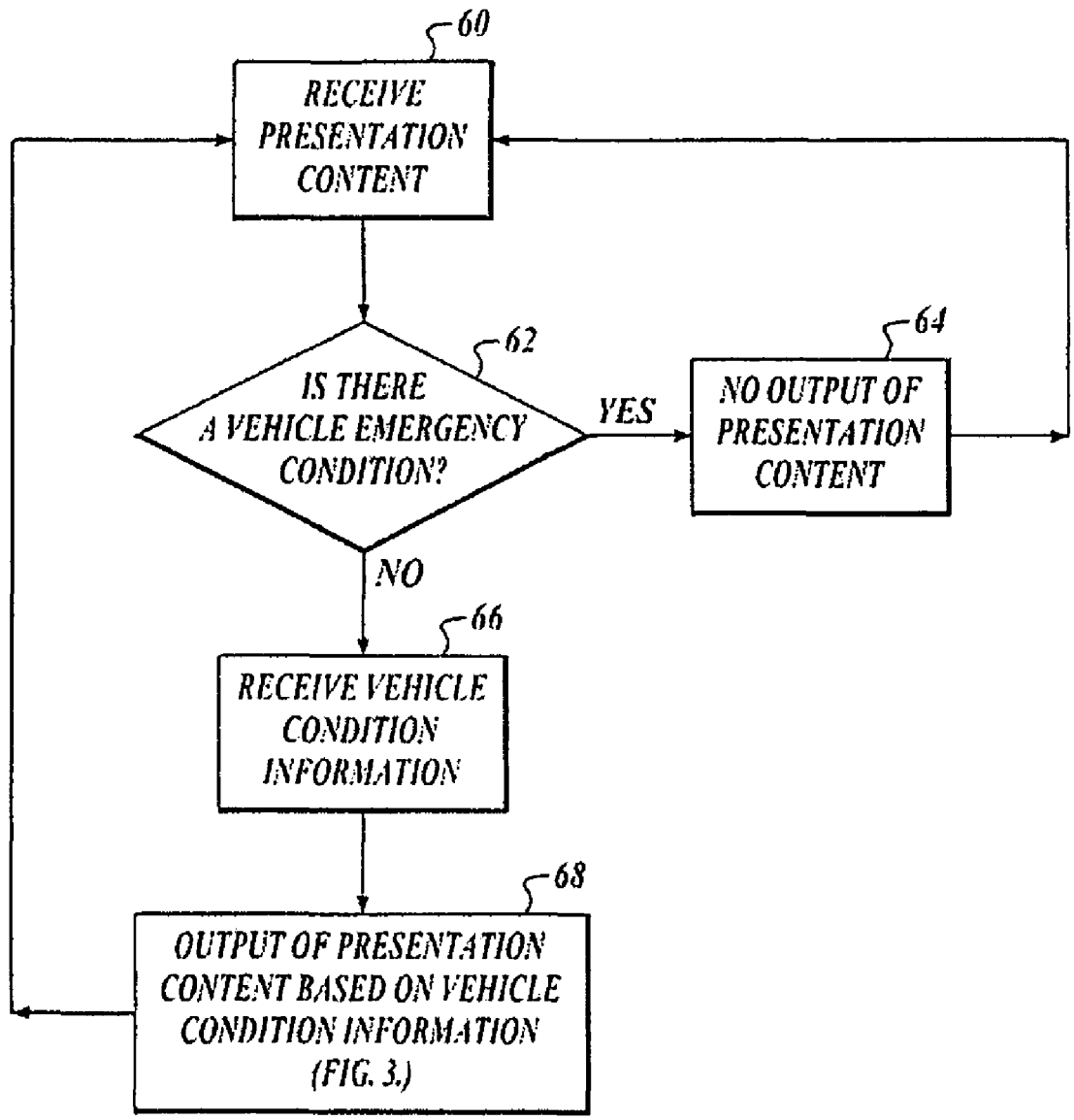
Figure 103:
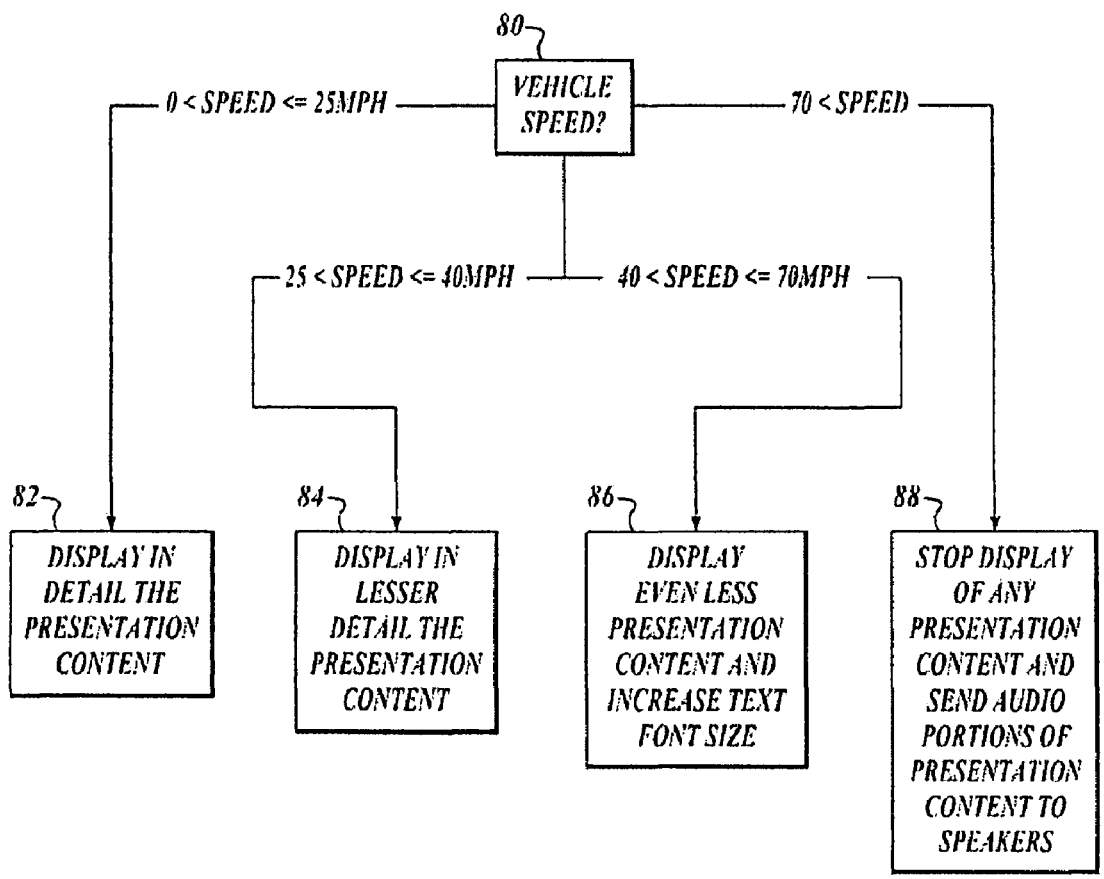
Figure 104:
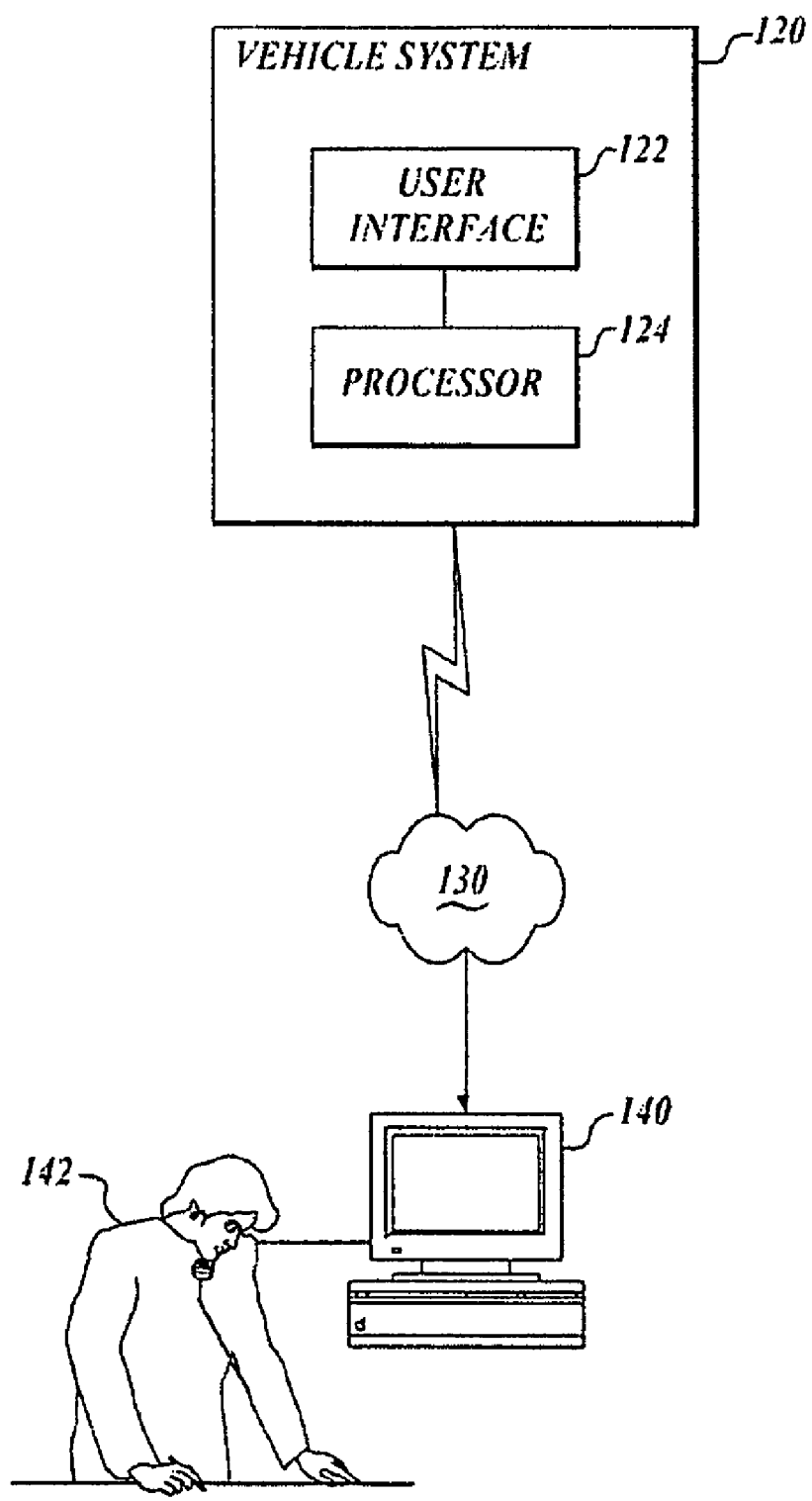
Figure 105:
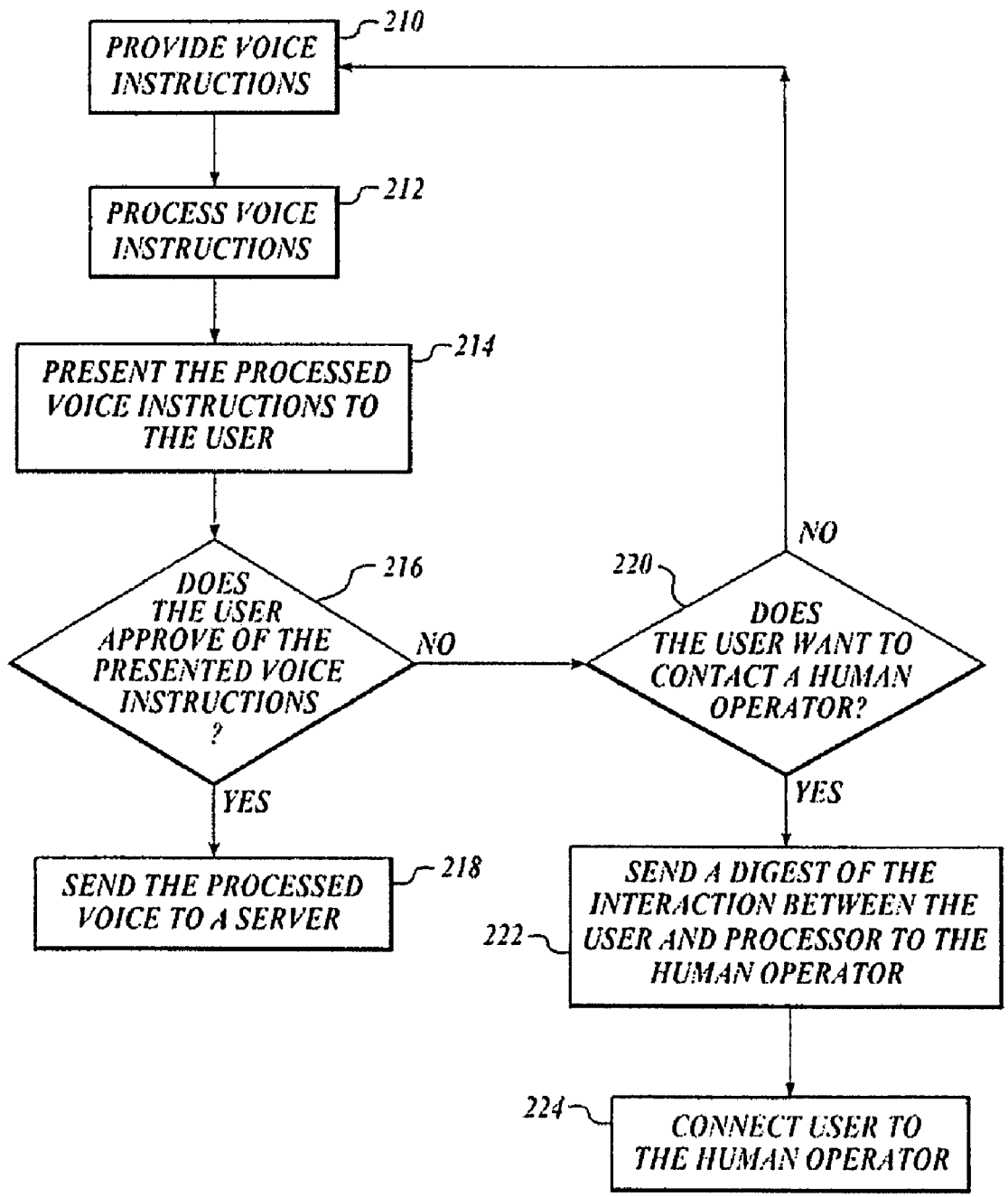

FIG. 101 is a block diagram illustrating the components of this feature or embodiment of the present invention;

FIG. 102 is a flow chart illustrating this feature or embodiment of the present invention performed by the device shown in FIG. 101;

FIG. 103 is a flow chart illustrating the operation of a specific example of this feature or embodiment of the present invention;

FIG. 104 is a block diagram illustrating the components of an alternate embodiment of this feature or embodiment of the present invention; and FIG. 105 is a flow chart illustrating this feature or embodiment of the present invention performed by the device shown in FIG. 104.

Drawings relating to the NOISE REDUCTION SYSTEM AND METHOD embodiment of the invention Ser. No. 10/024,446.

Figure 121:
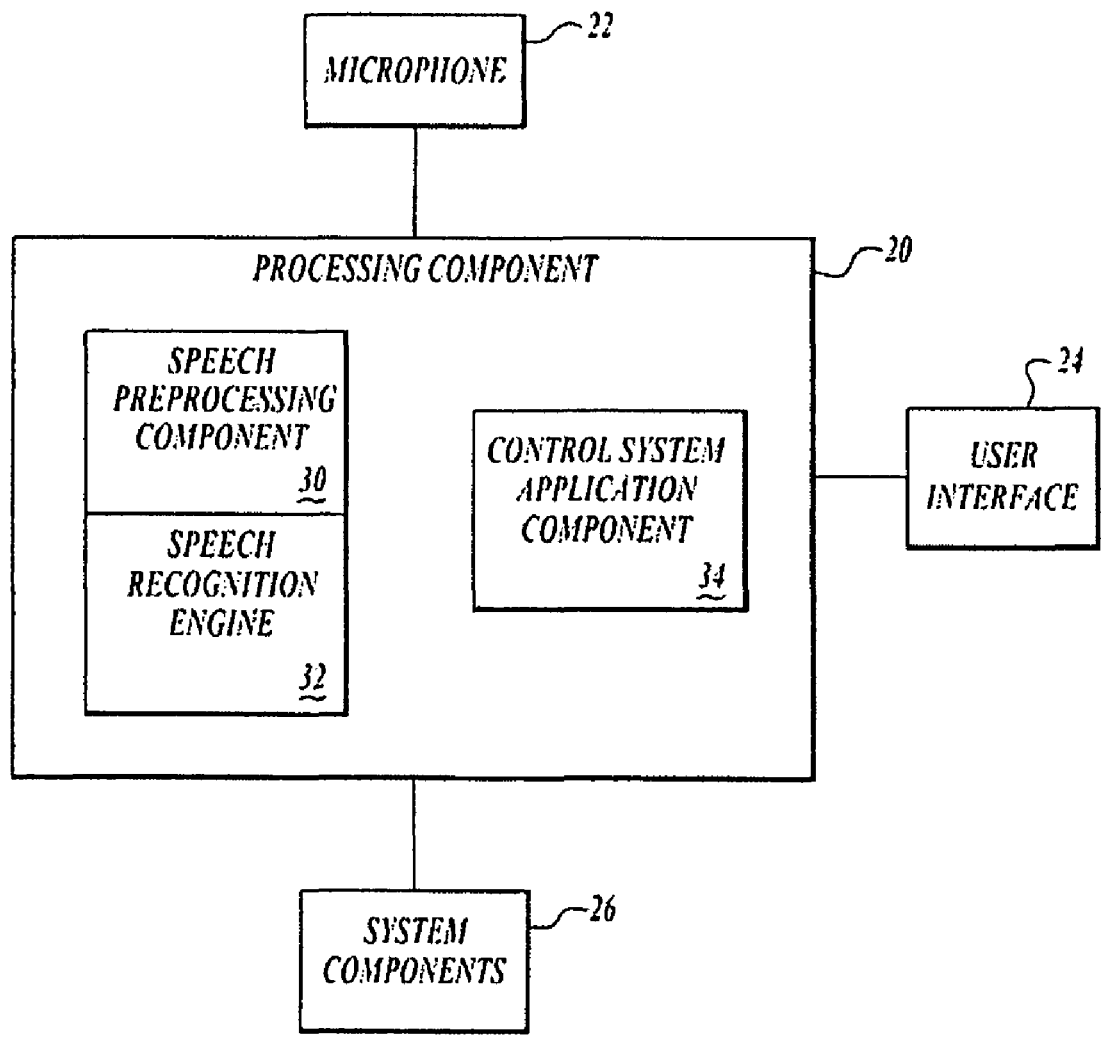
Figure 122:
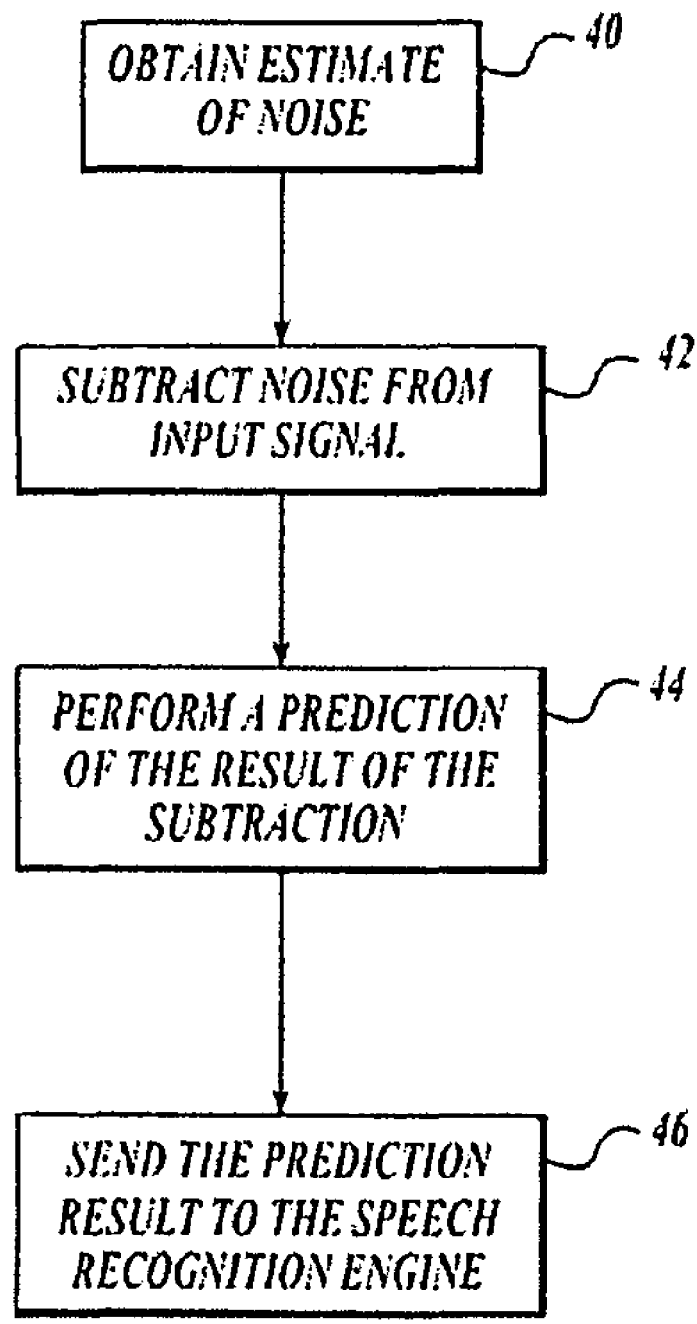
Figure 123:
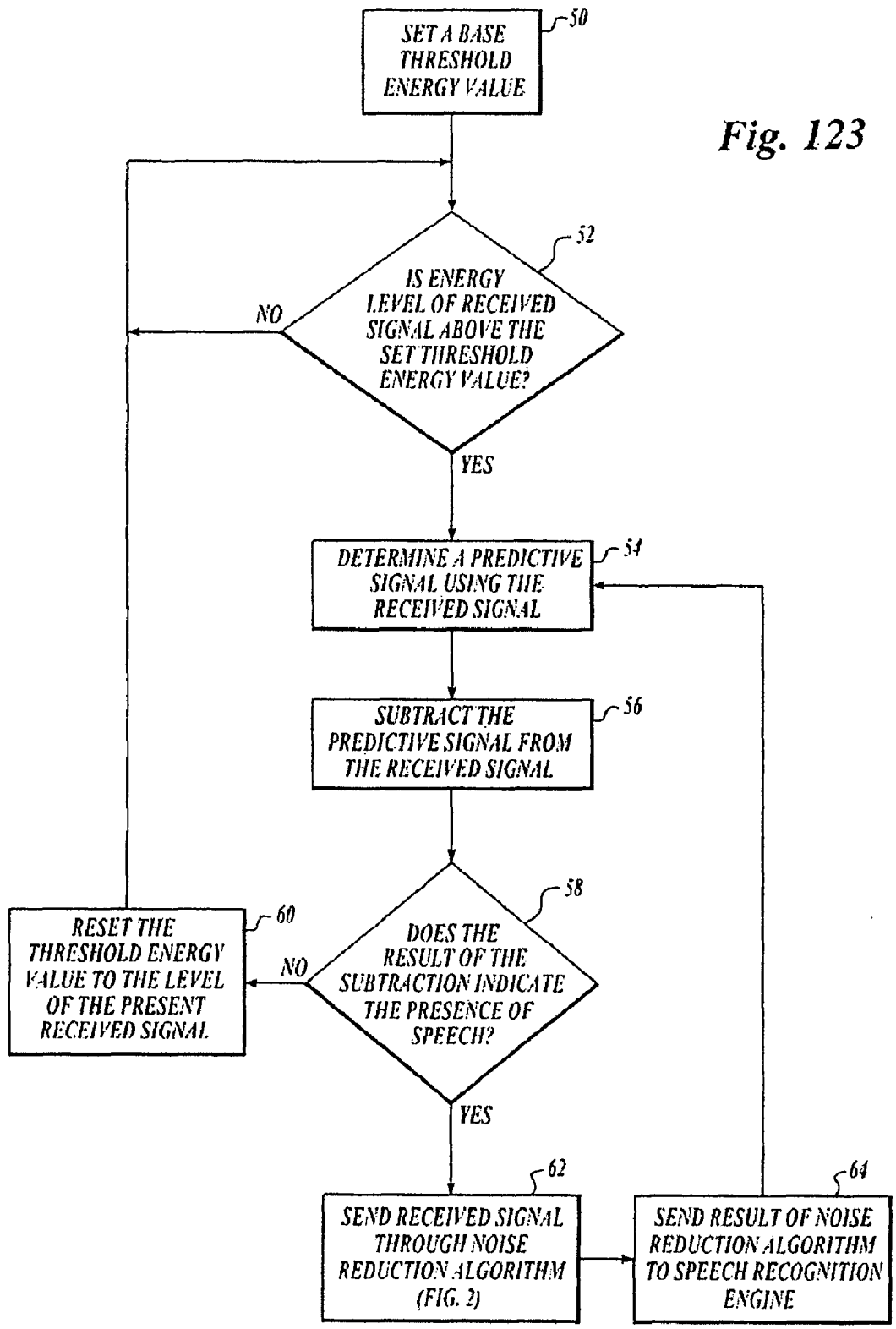

FIG. 121 is an example system formed in accordance with the present invention;

FIGS. 122 and 123 are flow diagrams of the present invention; and

Figure 124:
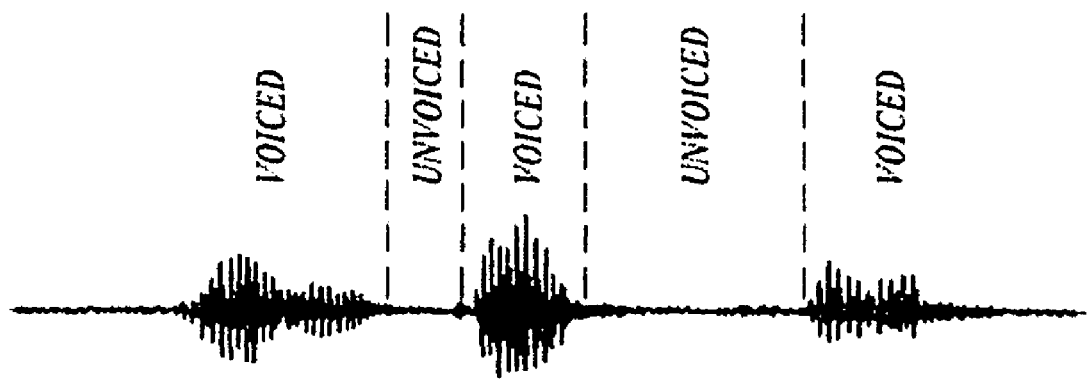

FIG. 124 is a time domain representation of spoken words.

DETAILED DESCRIPTION OF THE PREFERRED EMBODIMENT

A preferred embodiment of the present invention provides a system, method, and computer program product for modulating output over output devices (e.g., display, speakers) based on present vehicle conditions (e.g., speed, rate of change in speed or direction, emergencies). When the system determines that the vehicle requires a more attentive operator, the method of A preferred embodiment of the present invention manipulates the format of information and content presented to the vehicle operator via the output devices.

Figure 1:
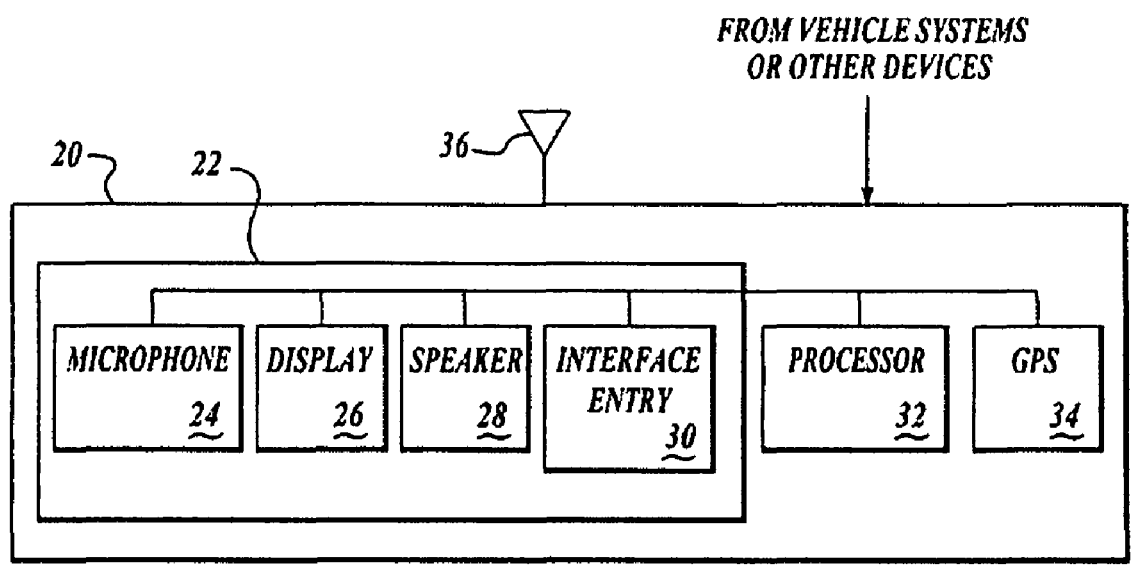
FIG. 1 is a block diagram illustrating the components of this feature or embodiment of the present invention.

FIG. 1 shows a system 20 within a vehicle for performing A preferred embodiment of the present invention. System 20 includes a user interface 22 having a microphone 24 for capturing the user's voice; a display 26; speakers 28; and an interface entry 30 for allowing the user to perform various interactive functions. System 20 also includes a processor 32; a global positioning system (GPS) 34 for determining precise vehicle locations; and a communications device 36, such as a cellular modem, for transmitting and receiving wireless information. System 20 is also coupled to receive information from other vehicle systems (not shown), such as a speedometer, an engine, or a braking system.

Figure 2:
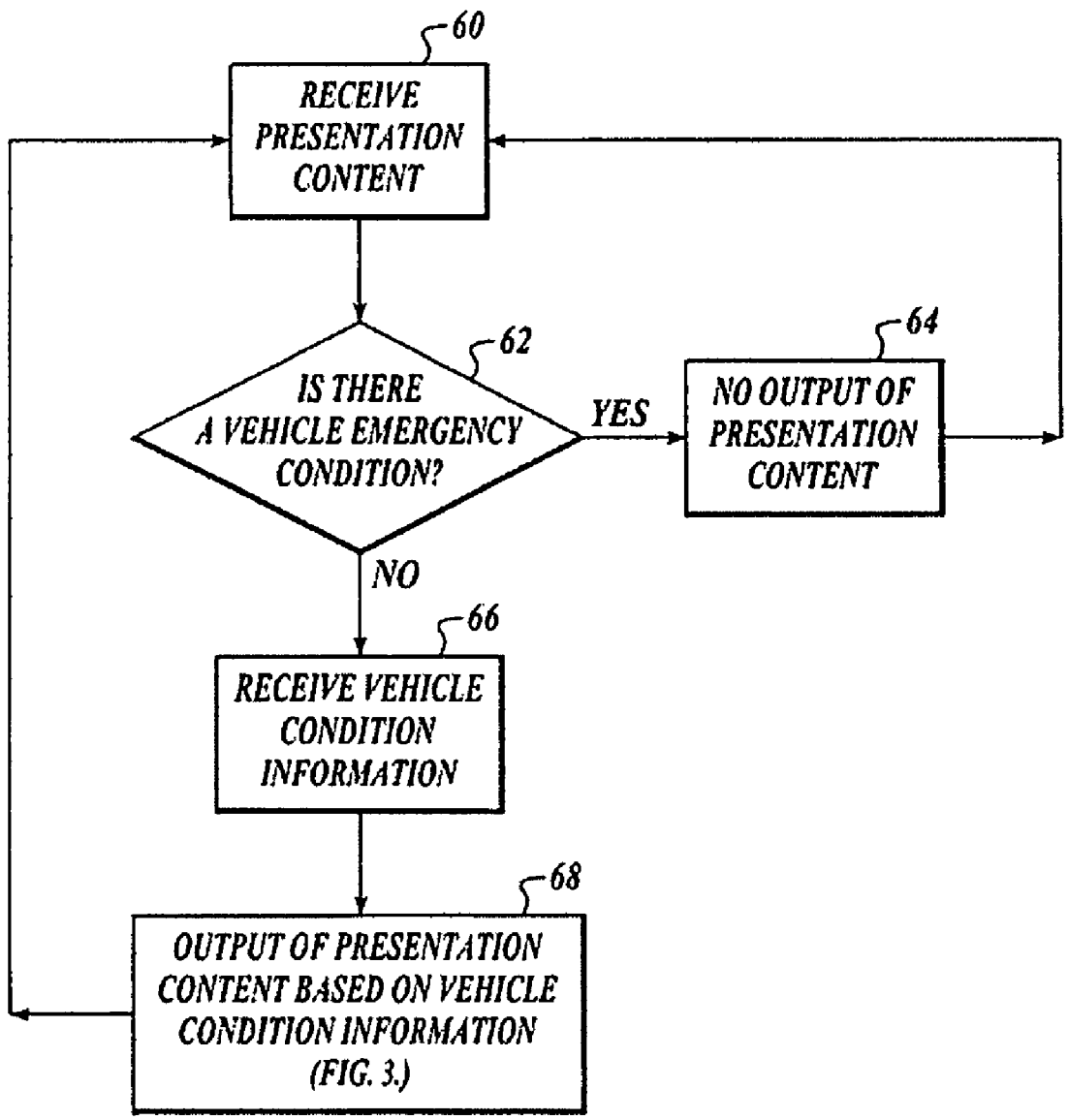
FIG. 2 is a flow chart illustrating this feature or embodiment of the present invention performed by the device shown in FIG. 1.

FIG. 2 illustrates a preferred process performed by system 20 illustrated in FIG. 1. At block 60, system 20 and, more specifically, processor 32, receives presentation content. The presentation content is preferably received at communications device 36 from a server transmitted over a network (not shown). At decision block 62, processor 32 determines if any vehicle emergency condition exists based on information received from the other vehicle systems. If processor 32 determines that a vehicle emergency condition exists, processor 32 stops all output of received presentation content to any one of the components of user interface 22 (block 64). Examples of a vehicle emergency condition that may cause the processor to stop output presentation content to user interface 22 are signals received from the engine that indicate engine overheating or a signal that indicates the operator has applied brakes to the point where an anti-braking system is activated.

Figure 3:
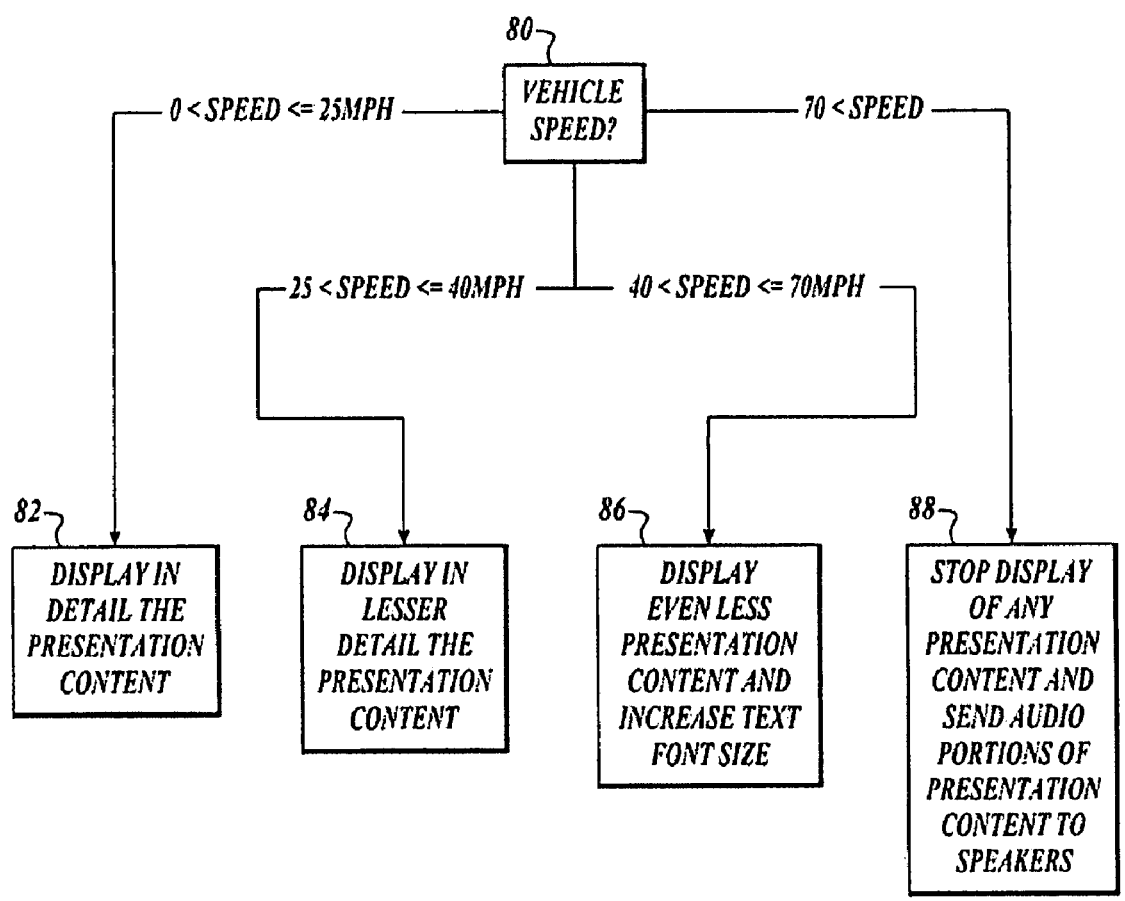
FIG. 3 is a flow chart illustrating the operation of a specific example of this feature or embodiment of the present invention.

If, at decision block 62, processor 32 determines that there is not a vehicle emergency condition, processor 32 receives vehicle condition information (block 66). The vehicle condition information comes from a number of sources that generate signals, such as GPS 34 or a speedometer. At block 68, processor 32 outputs presentation content through user interface 22 based on the vehicle condition information. This step involves determining the substance and format of the presentation content to display on display 26 or broadcast on speakers 28 of user interface 22. For example, when the vehicle is parked, processor 32 presents all or nearly all of the received presentation content. As the vehicle condition changes, for example, the vehicle picks up speed, processor 32 changes the presentation content information that is shown on display 26. The change in presentation content may also involve shifting presentation of information from visual display to audio broadcast as output through speakers 28. In one example, the presented content is a full detailed map of the vehicle's location that includes directions to a previously requested destination. Based on the vehicle speed, or the rate of change in vehicle speed or direction, the detail shown on the map will be altered. As the vehicle speed increases, the detail shown on the map is reduced, for example, to include only the vehicle's present location in relation to nearby streets or intersections. Some or all of the presentation content, or map directions, may be translated to audio format and broadcast to the vehicle operator via speakers 28. In other examples, change in vehicle condition may result in alteration of the font or size of text, icons and graphics presented on the display, as well as increased or decreased audio broadcast. FIG. 3 illustrates an example, based on vehicle speed, of how processor 32 changes the output that is presented over user interface 22.

After blocks 64 and 68, processor 32 returns to block 60 to continue receiving more presentation content. In this embodiment, presentation content is processed in real-time from the time of reception from the server over the network to the output of presentation content to a vehicle operator through user interface 22. In an alternate embodiment, the presentation content can be received all at one time and stored by processor 32 before any determination is made of how to present the output. In another alternate embodiment, if another person other than the vehicle operator wishes to view the presentation content, presented output is set to whatever level of detail is desired.

FIG. 3 illustrates an example of the process performed at block 68 of FIG. 2. At block 80, vehicle speed information is determined, for example by reference to the vehicle speedometer. If the vehicle's speed is less than or equal to 25 mph, processor 32 generates a detailed display to present on display 26 of user interface 22 (block 82). As the speed of the vehicle increases, the amount of detailed visual information generated for display is reduced. Thus, if the vehicle speed is greater than 25 mph but less than or equal to 40 mph, processor 32 generates a display with less visual information than was generated for vehicle speeds of less than or equal to 25 mph (block 84). When the speed is greater than 40 mph but less than or equal to 70 mph, processor 32 reduces not only the amount of detail to be displayed on display 26, but also increases the font size of any text included in the displayed presentation content and changes the color to make it easier for an operator to view (block 86). When the speed is greater than 70 mph, processor 32 stops generating display information for presentation on display 26 and switches to a pure audio presentation for output over the speakers 28 (block 88). The specific speed ranges described are exemplary only. The exact trigger speeds may vary according to various factors, such as road conditions, vehicle specification, vehicle operator skill, etc., as well as user preference. Likewise, the output format of the presentation content may be varied according to user interface hardware or software constraints as well as user preference.

In addition to the example described above with reference to overall vehicle speed, presentation content can be automatically adjusted based upon one or more vehicle conditions related to rate of change in vehicle speed, rate of change in vehicle direction, cellular phone or headphone activation, radar detector activation, noise level decibels above a certain value, radio/CD player in use, TV/DVD console in use, turn signal, etc. The vehicle conditions are determined by vehicle systems, such as the vehicle speedometer, steering, engine, and braking and acceleration systems. Vehicle systems may also include additional components, such as temperature, humidity, wind speed and precipitation gauges, a compass, clock, etc. These additional vehicle system components may be integrated with or separate from system 20, so long as they are capable of being monitored by system 20. The method of A preferred embodiment of the present invention automatically adjusts the output of presentation content based upon a monitor of these vehicle conditions, or a combination of these vehicle conditions. For example, system 20 monitors vehicle braking and acceleration systems with reference to an internal clock to determine the rate of change of vehicle speed. If vehicle speed is increasing or decreasing rapidly, system 20 automatically reduces the amount of detail provided in visual presentation content, and may transfer some or all of the content to audio presentation. In another example, system 20 monitors movement of the steering wheel and vehicle direction with reference to a compass and a clock to determine rate of change of vehicle direction. If vehicle direction is changing rapidly, system 20 would again automatically reduce the amount of detail provided in visual presentation content, as well as transfer some or all of the content to audio presentation.

See SYSTEM AND METHOD FOR ADAPTABLE MOBILE USER INTERFACE Ser. No. 10/454,390

A preferred embodiment of the present invention is a system and method for enabling an in-vehicle embedded phone to use the account, calling plan and phone number of a personal mobile phone. In FIG. 21, a vehicle 20 is equipped with a Telematics Control Unit (TCU) 30 and an embedded vehicle phone 40. Embedded vehicle phone 40 may be independent from or integral with TCU 30. TCU 30 includes a wireless communication module 32 capable of short range wireless communication with other compatible devices, such as a personal mobile phone 50. TCU 30 includes hands-free components (not shown) directly linked to embedded phone 40. Hands-free components can also be included in embedded vehicle phone 40. The hands-free components may include a microphone, speakers, and speech recognition and synthesizing software. TCU 30 retrieves information from compatible mobile wireless phone 50 for allowing embedded phone 40 to provide access to the wireless communication network using the retrieved information.

FIG. 22 illustrates an embodiment of A preferred embodiment of the present invention. First, at block 100, communication module 32 detects the presence of a compatible phone, such as personal mobile phone 50. Detection can be performed a number of ways, for example, personal mobile phone 50 transmits a short range identification signal or communication module 32 transmits a short range signal that requests a response from any compatible phone within a proximity. When a compatible personal mobile phone 50 is detected, the user (a driver or passenger in the vehicle) is informed about the detected phone (block 102). At block 104, TCU 30 asks the driver if they wish to use the service associated with the detected phone in embedded vehicle phone 40. Asking the driver can be performed by presenting a query on a display or outputting a voice query over a speaker. If the driver approves of using the detected phone's account information, mobile subscriber identification number from the detected phone is sent to vehicle phone 40 via the communication module 32 (block 106). At block 108, embedded vehicle phone 40 sends the mobile subscriber identification number to a wireless network access authority. At block 110, the wireless network access authority returns a request for authentication to the embedded vehicle phone. Embedded vehicle phone 40 sends the request for authentication to the detected phone (block 112). The detected phone performs authentication in response to the request and sends an authentication response to embedded vehicle phone 40 (block 114). At block 116, the embedded vehicle phone sends the session key to the wireless network access authority. After the wireless network access authority receives the session key, the access authority opens a session with embedded vehicle phone 40 (block 118).

Once a session is opened or interaction is begun with embedded vehicle phone 40, the embedded vehicle phone operates as if it were the detected phone. Because embedded vehicle phone 40 includes hands-free components within vehicle 20, or is coupled to hands-free components of TCU 30, the driver vocalizes all instructions for operating the embedded phone. The hands-free components may include a voice recognition processor for converting voice into operating commands.

Once the link is established, the vehicle user bypasses the personal phone and directly uses the vehicle phone-albeit with the account information from the personal phone. In alternative embodiments, the account link between personal mobile phone 50 and embedded vehicle phone 40 may be terminated based on certain trigger events associated with the vehicle or driver, such as when the engine is turned off or the vehicle is locked. Triggers may also include safety related events, such as sudden stops or reaching excessive speeds.

In an alternative embodiment, personal mobile phone 50 may electrically connect to TCU 30, either mounted in a cradle or connected via a short cable. TCU 30 detects the personal mobile phone's presence when the phone is placed into the cradle or connected via a cable. In another embodiment, personal mobile phone 50 communicates with TCU 30 over an Infrared wireless (IR) link, or an 802.11 Wireless LAN to establish communication between TCU 30 and personal mobile phone 50.

From time to time the network may request re-authentication. TCU 30 forwards all requests in the above-described manner to personal mobile phone 50. If that operation fails, TCU 30 optionally notifies the driver and then reverts to using its own account. In the absence of such an account, TCU 30 notifies the driver of its inability to make the call, save for emergency calls (e.g., in the United States, 911 calls and all other phone numbers defined as 'emergency numbers'), which may be made even in the absence of a TCU account.

While a preferred embodiment of the invention has been illustrated and described, as noted above, many changes can be made without departing from the spirit and scope of the invention. For example, various alternate embodiments of A preferred embodiment of the present invention may be implemented using a variety of telecommunication protocols, such as GSM, TDMA, CDMA, iDEN, etc. Accordingly, the scope of the invention is not limited by the disclosure of a preferred embodiment. See SHARING ACCOUNT INFORMATION AND A PHONE NUMBER BETWEEN PERSONAL MOBILE PHONE AND AN IN-VEHICLE EMBEDDED PHONE Ser. No. 10/765,720.

A preferred embodiment of the present invention provides a method and device to determine the destination of a voice transmission signal and apply an appropriate data signal processing algorithm based on the determined destination. The same system also provides a method to distinguish between incoming calls sent from a server or from a human in order to notify the person receiving the call that an unsolicited call is being sent. By way of overview and with reference to FIG. 31, A preferred embodiment of the present invention includes a system 10 that includes a transmitter 12 and a distribution gateway 16. Transmitter 12 includes a cellular or landline telephone, network phone, other communication device or a voice generation computer that generates a voice sound signal for transmission to end units (users 24 or voice recognition servers 26) over a network, such as a wireless network or a primarily non-wireless network (e.g., Internet). Distribution gateway 16 includes a processor 17, a receiver 18, a transmitter 19, and a database 20. Receiver 18 in distribution gateway 16 is preferably a wireless communication module capable of receiving voice and data via a wireless communication link. Transmitter 19 in distribution gateway 16 is preferably a wireless communication module capable of sending voice and data via a wireless communication link. Distribution gateway 16 is in communication with one or more user end units 24 and one or more automated speech recognition (ASR) servers 26, either directly or over a network (not shown).

Processor 17 compares an address included in the voice transmission signal from transmitter 12, such as an Internet Protocol (IP) address, a telephone number, or other method of identifying an incoming call, to a lookup table stored in database 20. The processor applies one of a number of signal processing algorithms depending upon the results of the comparison. Because there is a fundamental difference between the way humans process auditory input and the way ASR servers process voice input, different algorithms are applied to the voice transmission signal to optimize the benefit for the determined destination. For example, if the destination is an ASR server 26, the algorithm converts the transmission to digital form (if not already in digital form) and performs other digital signal processing that benefit the process the ASR server will perform.

Referring now to FIG. 32, an illustrative routine 30 for operation of A preferred embodiment of the present invention will be described. At block 32, distribution gateway 16 receives a voice transmission signal. Typically, the voice transmission signal includes a human voice or voice generated by a computer. At block 34, processor 17 looks up information in database 20 corresponding to a destination address or phone number included in the voice transmission signal. The database includes a table of phone numbers or a table of IP addresses of destinations (user end units 24 and servers 26) that are associated with each algorithm. An IP address is specified by the Internet Protocol and uniquely identifies a computer on the Internet. Processor 17 determines which algorithm (identified as the associated algorithm) to use for optimization depending upon the destination IP address of the voice transmission received. Therefore, when a call is placed to one of the numbers associated with an ASR server, the processor chooses the algorithm optimized for an ASR server. Otherwise, the processor chooses the algorithm for voice conversation at an end user unit 24.

At decision block 36, processor 17 determines whether the associated destination number is an ASR server 26. If, at block 36, the processor determines that the associated destination number is an ASR server 26, then, at block 38, the processor processes the voice transmission according to the optimization algorithm for an ASR server and sends the processed voice transmission signal to the determined destination. If, at block 36, the processor determines that the associated destination number is not an ASR server 26, the processor processes the voice transmission signal for human auditory means according to an optimization algorithm used for producing a result best suited for a human recipient. At block 40, the processor sends the processed voice transmission signal to the determined destination.

FIG. 33 is a flowchart illustrating an operation of sending a signal to a human recipient at block 40 of FIG. 32. In this situation, at block 54, processor 17 looks up caller identification information related to the origin of the signal (transmitter 12 in database 20). At decision block 56, the processor determines the origin of the voice transmission signal by comparing the sending address included in the voice transmission signal to a table of stored IP addresses or phone numbers in database 20. Thus, the processor distinguishes between incoming calls from an ASR server or other calls. If, at block

56, the processor determines that the voice transmission signal originated from an ASR server, the logic proceeds to block 58, where the user unit is informed that the incoming call is an ASR server generated voice transmission signal (i.e. a solicitation). If, at block 56, the processor determines the origin is not from the ASR server, then the logic proceeds to block 60, where caller identification information is presented to the user.

In an alternate embodiment, the functions performed by distribution gateway 16 are performed at a user origination unit or transmitter 12 or at user end unit 24. The user origination unit or transmitter 12 is preferably a mobile device that is implemented in a vehicle. The user origination unit can be a device similar to user end unit 24. FIGS. 34 and 35 illustrate flowcharts that present two embodiments for performing some signal processing at the user origination unit or transmitter 12.

In a first embodiment (FIG. 34) where distribution gateway functions are performed at user origination unit or transmitter 12, a processor at the user origination unit or transmitter 12 is defaulted to process an outbound voice signal with an algorithm optimized for delivery to an ASR server. At block 72, the processor at the user origination unit or transmitter 12 receives voice input from the user and an address associated with the voice input. The associated address can be entered by the user or automatically generated by the processor at the user origination unit or transmitter 12. At decision block 74, the processor at the user origination unit or transmitter 12 compares the address associated with the inputted voice signal to addresses (phone numbers, IP addresses or other types of addresses) associated with ASR servers that are stored within a database at the user unit. When the processor determines that the associated address corresponds to a stored address, the inputted voice is processed according to the default algorithm (automated speech recognition algorithm) at block 76. Otherwise, the logic proceeds to block 78, where the processor processes the inputted voice using a voice communication algorithm for human recipients.

In a second embodiment (FIG. 35) where server functions are performed at the user origination unit or transmitter 12, the processor at the user origination unit or transmitter 12 is defaulted to process an outbound voice signal with an algorithm optimized for voice conversation (human recipient) (block 90). At block 92, the processed voice signal is sent to the addressee associated with the voice signal. At block 94, if the outbound voice signal goes to an ASR server, the ASR server sends a signal back to the user origination unit instructing the processor of the user origination unit to switch to an algorithm optimized for an ASR server. When the user origination unit receives a signal to switch, the unit processes the entered voice signals using an algorithm for an ASR server (block 96). The signal sent by the ASR server is preferably sent in Dual Tone Multiple Frequency also known as Touch Tone, but can also be sent in other formats.

When the voice signal is processed at the user origination unit or transmitter 12, there may be times when the destination switches from an ASR server to a human recipient or from a human recipient to an ASR server. An operator system (human recipient) or ASR server informs the user origination unit when a switch has occurred. Once the user origination unit has been informed of the switch, the unit begins processing according to the new recipient. See METHOD AND DEVICE TO DISTINGUISH BETWEEN VOICE CONVERSATION AND AUTOMATED SPEECH RECOGNITION Ser. No. 09/884,902.

A preferred embodiment of the present invention provides a system and method for validating vehicle parking that uses a global positioning system (GPS) to confirm the location of a vehicle with respect to a pay parking location. FIG. 41 shows one embodiment of a vehicle validation system 10 of A preferred embodiment of the present invention wherein a parking attendant is involved in validating parking. The vehicle validation system includes a vehicle 20 and an attendant system 40 in wireless data communication with a server 60 via a wireless data channel 80. Both vehicle 20 and attendant system 40 are used to wirelessly locate and authorize payment for vehicle parking at a specified parking location.

More specifically, FIG. 41 illustrates the particular components of the embodiment of system 10. In a preferred embodiment, vehicle 20, typically controlled by a human operator, includes a user interface 22 having a microphone 24 for capturing the user's voice; a display 26; speakers 28; and an interface entry 30 for allowing the user to perform various interactive functions. The vehicle further includes a voice processor 34 for performing sound processing of the user's voice; a GPS 36 for determining precise vehicle location; and a wireless communications device 38, such as a cellular modem, for transmitting and receiving wireless information.

Attendant system 40 includes an attendant 42, which may be an automated attendant but in a preferred embodiment is a human operator; an attendant operation device 44, in a preferred embodiment a portable, hand-held unit; a communications interface 46, in a preferred embodiment integral with operation device 44, for transmitting and receiving wireless information; and a GPS 48 for determining precise attendant system location.

Both vehicle 20 and attendant system 40 are in communication with server 60. The server houses vehicle and attendant system information. Vehicle information may include, for example, the identity and credit authorization information on the vehicle user, as well as technical information on the vehicle, such as make, model and license. The server may also maintain historical and current location information for the vehicle. Attendant system information may include, for example, the identity, location and parking capacity of the parking location associated with the attendant system. The server also processes and responds to requests for information from the vehicle and attendant system; such requests may include location verification and vehicle parking payment confirmation. In an alternative embodiment, the server may communicate information obtained from information sources (not shown) to either the vehicle or attendant system. The information sources store information subject to requests from the vehicle. These information sources may be integral with or independent from server 60. If independent from server 60, the server communicates with information sources via direct access (e.g., hard-wired or point-to-point connection) as well as over the Internet. In a preferred embodiment, the server includes a processor, a memory, and a database (not shown). Server 60 further includes a means for sending and receiving information to both the vehicle and the attendant system, discussed below.

Wireless data channel 80 facilitates communication of instructions and information among vehicle 20, attendant system 40, and server 60. In a preferred embodiment, the wireless data channel may include a satellite system 82 in combination with a satellite dish 84, along with or in the place of one or more access points 86, the latter as part of a cellular or other wireless transmission network. In operation, instructions are transmitted from vehicle 20 via communication device 38 or attendant system 40 via communications interface 46 to either the satellite system or access point, which in turn communicate the instructions to server 60, in the former case via satellite dish 84. Conversely, information may be communicated from the server to the vehicle along a reverse direction of the same route.

In an alternative embodiment of A preferred embodiment of the present invention, the parking fee is automatically calculated and assessed directly via the vehicle interface. In this embodiment, FIG. 41 would be modified to remove attendant system 40 and its related components.

A first embodiment of the system and method of A preferred embodiment of the present invention is better understood with reference to FIG. 42, which illustrates the operational steps of the vehicle validation system and method. No attendant system is used in this embodiment. Rather, vehicle validation is tied to the vehicle location as determined by the GPS, electronic payment authorization of the vehicle, and known information on pay parking locations. At decision block 100, a determination is made whether the vehicle engine stops. This occurrence constitutes a trigger event that initiates the subsequent operation of A preferred embodiment of the present invention in this embodiment. The trigger events could be any number of occurrences, for example, removing the key from the ignition, opening or closing the vehicle door, the vehicle user engaging a pay parking location initiation indicator, etc. If the trigger condition is not met, the system proceeds in a continuous loop back to block 100. If the trigger condition is met, the logic proceeds to block 102, where the vehicle notifies the server that the trigger condition is met and parking information is requested. Preferably this notice to the server includes the vehicle's GPS coordinates. At block 104, the server determines the vehicle location via the GPS coordinates.

At decision block 106, the determination is made, based on the GPS location information, whether the vehicle is in a pay parking location, or a parking location incorporated into the network of A preferred embodiment of the present invention. This is accomplished by the server accessing database records relative to the identification, location and account information associated with the vehicle. If the vehicle is not in a pay parking location, the logic proceeds to block 108, where the server sends a message to the vehicle, perhaps with a recommendation to a pay parking location. The system then resets, in a preferred embodiment based on the vehicle engine startup, and returns in operational logic to block 100. If the vehicle is in a pay parking location, the logic proceeds to decision block 110, where it is determined whether the vehicle has made payment arrangements for parking in the pay parking location. If no payment arrangements have been made, the logic proceeds to block 112, where the server sends a message to the vehicle notifying the vehicle that it does not have an account for the pay parking location. The notification message may also include information on how to set up an account for the pay parking location, or a recommendation as to a different pay parking location. The system then resets, in a preferred embodiment based on vehicle engine startup, and returns in operational logic to block 100. In an alternative embodiment, the system may allow the vehicle to provide electronic payment authorization information at that stage.

If the vehicle has made payment arrangements for the pay parking location, the logic proceeds to block 114, where the vehicle sends a message to the server to start the billing clock. At decision block 116, the system enters a holding pattern based on a determination whether the vehicle engine is started, which would signify an end to the billing cycle for the particular pay parking location. As noted above, there may be various trigger events that initiate the logic sequence at this point in the invention. If the vehicle engine has not started, the system proceeds in a continuous loop back to block 116. If the vehicle engine starts, the logic proceeds to block 118, where the vehicle sends a message to the server to stop the billing clock. At block 120, the server calculates the amount owed for parking and charges the vehicle owner's account. At block 122, the server is updated with vehicle parking information.

In an alternative embodiment of the above-described operational logic, the server automatically monitors both vehicle location and vehicle engine status. When the server detects that the vehicle engine has stopped, it immediately ascertains the vehicle location, based on GPS coordinates. If the server determines that the vehicle engine stopped in a pay parking location, it automatically starts the billing clock. Once the server determines that the vehicle engine is started again, it stops the billing clock. In this embodiment, as described above, the server determines account information and charges the vehicle owner's account accordingly.

An alternative embodiment of the system and method of A preferred embodiment of the present invention, as used with described attendant system 40, is better understood with reference to FIG. 43. At block 200, the attendant system transmits identification information to server 60, including attendant system and parking location identification information. Alternatively, the server may already have in its database some or all of this information, in which case this step involves refreshing and/or confirming the accuracy and timeliness of the information. At block 202, the server sends a list of previously registered vehicles to the attendant's system. The list includes vehicles known to be parking at the attendant's parking location or within a threshold proximity distance from the attendant (e.g., within 50 feet). At block 204, the attendant passes by a parked vehicle and checks that the vehicle appears on the sent list by reference to vehicle identification, for example, the vehicle license plate or VIN. In an alternative embodiment, the vehicle may also include a location-specific mark, such as a sticker or tag, which identifies the vehicle as being registered with the above-described parking location system.

At decision block 206, the attendant system automatically or the attendant manually makes a determination whether the vehicle is on the list or registered in the system. If the vehicle is not on the list, the vehicle is a legacy vehicle and the logic proceeds to block 208, where the attendant receives a message, perhaps with a recommendation as to course of action. A legacy vehicle is one not registered by the above described parking system and must be dealt with by prior parking procedures. If the vehicle is on the list, the logic proceeds to block 210. At decision block 210, the determination is made whether the vehicle has previously paid for or authorized electronic payment for parking at the pay parking location. The server accesses database records to make this determination. In an alternative embodiment, the attendant makes the payment authorization determination directly. If the vehicle has not made such payment arrangements, the logic proceeds to block 212, where the server notifies the attendant system that the vehicle has not paid. The attendant system may then secure payment from the vehicle by other means. In an alternative embodiment, the server may also request electronic payment for the requested parking, providing it has appropriate authorization for the vehicle account. If the vehicle has made necessary pay arrangements, the logic proceeds to block 214, where the server notifies the attendant system that the vehicle has paid, or made arrangements to pay for parking in the pay parking location. At block 216, the server is updated with vehicle parking information.

While a preferred embodiment of the invention has been illustrated and described, as noted above, many changes can be made without departing from the spirit and scope of the invention. For example, the order in which determinations are made as to whether the vehicle is in a pay parking location and whether the vehicle has made pay arrangements could be changed. In addition, there may exist variations on when the billing clock is started and stopped, what trigger events are used, and how and when the parking charges are calculated and electronically assessed. Accordingly, the scope of the invention is not limited by the disclosure of a preferred embodiment. See VEHICLE PARKING VALIDATION SYSTEM AND METHOD Ser. No. 09/955,476.

A preferred embodiment of the present invention provides a system and method for transmitting data derived from voice input at a remote, mobile location over a wireless data channel. By way of overview and with reference to FIG. 51, the mobile speech recognition system 10 of A preferred embodiment of the present invention includes a user system 20 in wireless data communication with a server system 40 via a wireless data channel 60. The invention performs front-end sound processing in user system 20—short of full speech recognition conversion—and sends the results of the sound processing to server 40 in a digital form via wireless data channel 60.

More specifically, FIG. 51 illustrates the particular components of a preferred embodiment of system 10 for sending preprocessed voice over the wireless data channel. User system 20 includes a user interface 22 having a microphone 24 for capturing the user's voice, a display 26, speakers 28, user interface 30 for allowing the user to perform various interactive functions, and preferably a video capture device 32. The user system further includes a voice processor 34 for performing front-end sound processing of the user's voice, and a communications device 36, such as an antenna or other signal carrier, for transmitting and receiving wireless information. User system 20 is preferably implemented in a mobile environment, such as in a car or other vehicle.

In an alternate embodiment, user system 20 includes a processor with memory coupled to multiple controllers (not shown) for receiving data from various vehicle data buses and module receptacles (not shown). The module receptacles are configured to receive various add-on modules, such as modules for coupling other electronic devices, communication modules, processing modules and other modules, such as a phone adapter module, a CPU/memory module, a Bluetooth, infrared or wireless network communication module, and a global positioning system (GPS) module. In operation, voice capture and front-end sound processing is accomplished in various modules to the user system. Such modules are replaceable, allowing a user to receive up-to-date sound processing software or other more advanced modules without having to replace any hardware components already installed in the vehicle.

User system 20 is in communication with server system 40. The server system includes a server 42 for housing user system information, as well as processing and responding to requests for information from the user system and information sources 44, which may be integral with or independent from server system 40. The information sources store information subject to requests from the user system. In a preferred embodiment, the server includes a processor, a memory, and a database (not shown). Server 42 may be in communication with information sources 44 via direct access (e.g., hardwired or point-to-point connection) as well as over Internet 46. Server system 40 further includes a means for sending and receiving information to user system 20, discussed below.

Wireless data channel 60 facilitates communication of instructions and information between user system 20 and server system 40. In a preferred embodiment, the wireless data channel may include a satellite system 62 in combination with a satellite dish 64 along with or in the place of an access point 66, the latter as part of a cellular or other wireless transmission network. In operation, instructions are transmitted from user system 20 via transmission/reception device 34 to either the satellite system or access point, which in turn communicate the instructions to server 42, in the former case via satellite dish 64. Conversely, information may be communicated from the server to the user system along a reverse direction of the same route.

The system and method of A preferred embodiment of the present invention is better understood with reference to FIG. 52, which illustrates the operational steps of the mobile speech recognition system. At block 100, the system receives the user's voice (acoustical audio input) at user system 20. At block 102, the system performs front-end sound processing on the acoustical audio input using processor 34, including converting the audio input to representative digital data. This front-end sound processing is discussed in more detail below with reference to FIG. 53. Once front-end sound processing is complete, at block 104 the system packages the digital data for wireless delivery. At block 106, the system transmits the packaged digital voice information from user system 20 to server system 40 via wireless data channel 60.

At block 108, server system 40 performs complete speech recognition processing on the digital voice information using server 42. As part of this process, the server attempts to match the digital voice information with corresponding digital data entries in the server database, which in turn are associated with a program instructional language. One of three results follow from this process: (1) a match is found, in which case the corresponding program instructions are executed at block 110; (2) no match is found, in which case no instructions are executed (or partial instructions are executed) at block 110; or (3) multiple matches are found. In the last case, the server employs statistical models to decide which of the several matched entries is most probably the desired entry. This statistical modeling may look at previously matched digital voice information and, alone or in context with associated digital voice information, may combine entries in combination to best form appropriate instructional language (e.g., "the chair is white" is more probable than "the chair his white."). The server may also employ grammar, which is a subset of rules associated with the program instructional language, which includes the structure for valid sentences at certain points in the dialog from which the digital voice information was derived. Once the most probable match is determined, the resulting program instructions are executed at block 110.

The front-end sound processing of A preferred embodiment of the present invention is better understood with reference to FIG. 53. Microphone 24 of user system 20 captures the user's voice as acoustical audio input. At block 200, this acoustical audio input is converted to an analog electrical signal. At block 202, the analog signal is sampled and digitized. In a preferred embodiment, there are thousands of samples per second. Each sample is assigned a numerical value, which is typically between 0-255 so that it fits in a byte. In an effort to improve the accuracy of the resulting sample, processor 34 performs noise-cancellation, echo-cancellation, and end-pointing routines. Noise-cancellation involves an examination of the amount of energy in the analog signal at various frequencies. Processor 34 detects the background noise accompanying the original signal and subtracts it from the sample. Similar to noise-cancellation, echo-cancellation involves an examination of the amount of energy in the analog signal at various frequencies. With echo-cancellation, the goal is to reduce or eliminate from the sampled signal the vocal system prompt or audio component used by the system to elicit the user's original audio input. By comparing sampled signal components to a data stream representing the system prompt, processor 34 is able to subtract the system prompt and thereby separate the data stream representing the system prompt from the data stream representing the user's audio input. Also, undesired radio signals and other signals that processor 34 knows aren't the user's speech are also removed using the above described technique.

After performing noise- and echo-cancellation, processor 34 looks at the remaining amount of energy at the various frequencies and determines whether it contains actual user audio input, or user speech, as opposed to silence or other non-relevant noise. This is accomplished by examining the energy or amplitude of the audio input and the rate of "zero-crossing." Zero-crossing is where the audio signal changes from positive to negative, or vice versa. When the energy and zero-crossings are at certain predetermined levels, there is a likelihood of occurrence of a speech event.

In an alternate embodiment, processor 34 determines the beginning and end of a spoken phrase. This is performed by the technique known as end-pointing (i.e., speech detection). The determined beginning and end of a spoken phrase constitutes preprocessed information that is sent to server 40.

At block 204, resulting samples are grouped into sets representing acoustic audio for specified time periods. For example, in a preferred embodiment, a group contains all samples in a ten millisecond time period. The groups may have some overlap with respect to samples taken in succession, i.e., group N contains samples from time T to T+10 milliseconds; group N+1 contains samples from time T+8 to T+18 milliseconds, etc. In this example, if 20,000 samples are included per second, each group contains 200 samples.

At block 206, processor 34 converts grouped sets from time domain to frequency domain. In a preferred embodiment, this is accomplished using Fast Fourier Transform: the output of the transformation is a set of numbers, each set representing the amount of audio energy in a frequency band. The width of the frequency bands may be linear or nonlinear. For example, a given set of 10 millisecond time periods will have the following frequency domain values: 150 Hz-300 Hz: 75; 350 Hz-400 Hz: 100; . . . 1000 Hz-1200 Hz: 125 . . . 2500 Hz-3000 Hz: 47. In this example, the low frequency bands are 50 Hz each, while the highest frequency band is 500 Hz.

FIGS. 54A-C and 55 illustrate an alternate embodiment of A preferred embodiment of the present invention for metering the deliverable information from user system 20 to server 42. FIGS. 54A-C illustrate packetized data streams 300, 310, 320 that are outputted streams during different modes of operation of user system 20. FIG. 54A illustrates packet stream 300, which includes packets 304, 306 that are filled with voice information. Packet stream 300 also includes an address ID 302 located at the beginning. In this mode of operation, processor 34 has determined that the entire packet stream 300 should be filled with voice information and therefore will populate the packets with only voice information. This mode of operation occurs, for example, when the user is speaking into microphone 24.

FIG. 54B illustrates a second mode of operation for the delivery of information from user system 20 to server 42. In this mode of operation, some packets 312 are filled with voice information and other packets 314 are filled with data, such as GPS or other vehicle information. Processor 34 operates in the mode shown in FIG. 54B in order to deliver user system information along with the sent voice information. Periodically, vehicle information must be sent in order to be processed by the server for various functions. Often times it is desirable that vehicle information be associated with the voice information transmitted at a given time. In one example, a user may verbally request instructions to the nearest gas station, which answer would necessitate knowledge of the vehicle's present location. A preferred embodiment of the present invention may send the voice instruction concurrent with GPS information, ultimately providing server 42 with both pieces of information as part of a nearly simultaneous transmission.

FIG. 54C illustrates a mode of operation that processor 34 executes when no voice is being entered by the user, therefore allowing the entire packet stream 320 to be populated by data as shown in packets 322 and 324.

FIG. 55 illustrates an example decision process performed by processor 34 when deciding how to populate packets sent from user system 20 to server 42. First, at decision block 350, processor 34 determines if user system 20 is receiving speech from the user. If it is determined that no speech is being received, processor 34 formats the transmission to include only data (see block 352), as shown by example in FIG. 54C. If processor 34 determines that user system 20 is receiving speech, the process continues to decision block 356, where the processor determines if any data needs to be sent with the speech. If no data needs to be sent with the speech as determined by processor 34, the processor populates the packets of the transmission with only voice information (see block 358), as shown by example in FIG. 54A. If processor 34 determines that data needs to be sent with the speech, the processor populates some of the data packets with voice and other data packets with data (see block 360), as shown by example in FIG. 54B. When data packets and voice packets are distributed in the transmission, processor 34 populates packets with voice in order to optimize speech recognition at server 42.

While a preferred embodiment of the invention has been illustrated and described, as noted above, many changes can be made without departing from the spirit and scope of the invention. For example, the order of some or all of the front-end sound processing steps may be altered, such as the order in which noise-cancellation and echo-cancellation routines occur. In another example, the sequence used to determine whether input includes speech or data or both may be altered. Accordingly, the scope of the invention is not limited by the disclosure of a preferred embodiment. See SYSTEM AND METHOD FOR TRANSMITTING VOICE INPUT FROM A REMOTE LOCATION OVER A WIRELESS DATA CHANNEL Ser. No. 10/059,905.

A preferred embodiment of the present invention is illustrated in FIG. 61 as a vehicle navigation system 10 that includes a vehicle 12 with an in-vehicle telematic control unit (TCU) 14. TCU 14 is in wireless communication with a server 16 over a network 18. Network 18 preferably includes components for receiving wireless signals from TCU 14 and converting the signals for wire or wireless transmission to server 16. The network is preferably the Internet, but could be any public or private data network. Network 18 includes a gateway (not shown) that can send and receive wireless signals to and from TCU 14, and can communicate through other components (e.g., routers) in the network to server 16. The wireless signals include information that is preferably in packet form, although the information may be in alternative forms. TCU 14 includes a processor 20 coupled to a user interface 22, a global positioning system (GPS) unit 24, a radio module 26 and local storage or memory 28. User interface 22 preferably includes a speaker and a microphone (not shown), and may include a display. The user interface may also include on-or-off screen user interface buttons. Radio module 26 is capable of sending and receiving both voice and data. Server 16 includes a processor 30 and a database 32 that holds vehicle navigation information: maps, road conditions and terrain, lane information and changes, touring instructions, etc.

System 10 of A preferred embodiment of the present invention minimizes the amount of airtime used between TCU 14 and server 16 to send a trip plan. When a user asks the system for directions, the vehicle's local coordinates (as determined by GPS unit 24) are sent from TCU 14 to server 16 over network 18. The user also specifies their destination to the TCU. Entry of the user's navigation instruction request, including the destination information, is preferably done vocally through the microphone, but may be accomplished by other data entry means, such as via user interface buttons. The TCU transmits the vocalized destination to server 16. The server calculates the trip plan and generates a table of locations (expressed as location coordinates, such as GPS coordinates) and the corresponding navigation prompts (e.g. turn left onto Howell St.). These navigation prompts are preferably voice prompts, but may include other forms of user notification, such as textual messages or different audible, visual or other signals. The table with navigation prompts is sent to TCU 14 in vehicle 12. In an alternate embodiment, the navigation prompts are sent as an audio file (assuming voice prompts), such as a WAV file or an MP3 file. In another embodiment, the table includes locations identified in text form that are displayed or converted to audio by a text-to-speech (TTS) component of processor 20. The navigation prompts could also include symbols that indicate common words such as "turn," "left," "onto," "street," and "avenue," combined with the vocal recording of the name of the proper noun "Howell" street. As the vehicle moves according to the trip plan and arrives at a location whose GPS coordinates match those of an entry in the table, the corresponding voice prompt is played through the speakers to the system user. This process is described in more detail in FIG. 62.

FIG. 62 is a flow diagram of a process performed by system 10 shown in FIG. 61. First, at block 50, the user initiates a trip request. Trip request initiation can occur in a number of ways. For example, the user may select a trip request button included in user interface 22, or speak a start trip request command into the microphone that is interpreted by voice recognition software executed by processor 20; either action causes processor 20 to begin a trip request. At blocks 52 and 54, the initiated trip request causes TCU 14 to send the vehicle's GPS coordinates and any user entered instructions of the destination to server 16. At block 56, server 16 interprets the voice instructions to determine the destination. Interpreting includes performing voice recognition processing. Next, at block 58, the server generates a trip plan according to vehicle navigation information such as stored map or other navigation information, the vehicle GPS coordinates, and the interpreted voice instructions of the destination. At block 60, a table of locations is generated for the trip plan. The table includes trip plan information, such as landmarks, turns, road changes or other significant travel-related information. Each location entry in the table includes an associated voice or text prompt. At block 62, the trip plan including the table is sent to the TCU.

At decision block 64, once the vehicle receives the trip plan table, TCU 14 determines if the vehicle is adhering to the trip plan. The TCU periodically checks the vehicle's GPS location and determines if it is on the trip plan or within a threshold value from the trip plan. This threshold value may be a function of the distance from a known location in the trip plan, or location relative to known geographic marks, or some combination of various factors. Within the threshold value, the system can document the present location of the vehicle in relation to the trip plan and chart the navigational path to return to the trip plan or a modified trip plan. If the vehicle is not adhering to the trip plan, the TCU contacts server 16 and requests a new trip plan according to the present vehicle location (block 66). If the TCU determines the vehicle is adhering to the trip plan, the TCU determines whether the vehicle is at an identified location within the trip plan table (decision block 68). If the vehicle is not at a location identified in the trip plan table, the process continues checking locations according to decision blocks 64 and 68. If the vehicle is at a location in the trip plan table or within a threshold value from a location in the table, TCU 14 plays the voice prompt associated with the location in the table that corresponds to the vehicle's location (block 70). In another embodiment, voice recordings associated with pre-stored symbols are played in series with a proper-noun street identifier. Then, the process continues checking vehicle location according to decision blocks 64 and 68.

In an alternate embodiment, the system may cache parts of a voice prompt that are later combined by processor 20 to create a navigation instruction. For example, TCU 14 receives the following voice prompts from server 16:

(a) "turn left onto Howell Street";
(b) "turn left onto 4th Avenue".

A caching component performed by processor 20 caches 3 sub-prompts:

17 "turn left"
18 "Howell Street"
19 "4th Avenue".

The tag identifiers for the (a) and (b) voice prompts include tag identifiers for the sub-prompts (i.e. a=#17 #18; b=#17 #19). So in effect, in this alternate embodiment, each tag is a series of sub-tags. Server 16 may send just the tag identifiers for the sub-prompts. Processor 20 combines the sub-prompts according to the order the tag identifiers were received and presents the combination to the user.

FIG. 63 is a flow diagram of an alternative process performed by system 10 shown in FIG. 61. First, at block 80, the user sends a trip request to server 16 (see blocks 50-56 of FIG. 62). At block 82, the server calculates a trip plan, creates a trip plan table according to the calculated trip plan, and sends the trip plan table to the user's TCU 14. The trip plan table includes locations and associated navigation (preferably voice) prompts. At block 84, as the user is traveling according to their trip plan, TCU 14 compares the vehicle's present location (GPS generated) to the received table. At decision block 86, if the vehicle's present location is not in the trip plan table, the process returns to block 84, where it continues comparing the vehicle's present location to the entries in the trip plan table. If there is a corresponding location entry in the trip plan table, the logic proceeds to decision block 88. At decision block 88, if the table has a corresponding stored voice prompt, TCU 14 retrieves and plays the corresponding stored voice prompt (block 90). If, at decision block 88, TCU 14 determines that a corresponding voice prompt does not exist in the table or elsewhere in memory 28, the TCU sends a request to the server to send a voice prompt according to a tag identifier that indicates the missing voice prompt (block 92). At block 94, server 16 sends the requested voice prompt. At block 96, the TCU plays the received voice prompt. At block 98, the TCU stores the received voice prompt for possible later use. At block 100, the TCU purges saved voice prompts according to a scheduled purge request, to a user purge request, or to a purge request sent from the server 16.

In an alternate embodiment, the steps performed at blocks 82-84 are performed at server 16, and the server does not send the table to the requester, but compares the vehicle's present location (GPS generated) to the server-generated table. If an associated voice prompt is present, the server sends a tag identifier associated with the voice prompt to TCU 14. The TCU compares the sent tag identifier to previously received voice prompts that are stored in memory 28 according to assigned tag identifiers. If an appropriate voice prompt is in memory 28, processor 20 retrieves it and presents it to the user via user interface 22. If a voice prompt is not found, TCU 14 sends a request to server 16 for the actual voice prompt, which is presented to the user when received from the server.

While a preferred embodiment of the invention has been illustrated and described, as noted above, many changes can be made without departing from the spirit and scope of the invention. For example, the types of communication between the vehicle and the server may be all wireless, the components of the server may be distributed over the network, and the location identifier may be a non-satellite system that determines vehicle location based on ground-based transmitters. Also, the order of the steps performed in the described embodiments may be altered without departing from the scope of the invention. Accordingly, the scope of the invention is not limited by the disclosure of a preferred embodiment. Instead, the invention should be determined entirely by reference to the claims that follow. See SYSTEM AND METHOD FOR REDUCING THE AMOUNT OF REPETITIVE DATA SENT BY A SERVER TO A CLIENT FOR VEHICLE NAVIGATION Ser. No. 10/689,504.

A preferred embodiment of the present invention provides a system and method for using broadcast radio content and wireless network communication to enhance user interaction with a business from the user's vehicle. By way of overview and with reference to FIG. 71, A preferred embodiment of the present invention is a system 10 that includes a network 12 (such as the Internet), a wireless gateway 14, a radio station 16, at least one financial services system 18, business system 20, and main system 22, all of which include a server and a database. Financial services system 18, business system 20, and main system 22 are coupled to network 12. A user's vehicle 24 includes a telematic control unit 26 and a radio 28.

As shown in FIG. 72, the telematic control unit 26 includes a processor 30, a built-in global positioning system (GPS) unit 32, a wireless communication module 34, a vehicle information component 36, and a user interface 38. Vehicle information component 36 extracts information related to the vehicle's sensory status, such as engine specification, door lock/unlock status, and airbag deployment requirements from vehicle 24. User interface 38 includes one or more of a microphone, a speaker, a display, such as a touch sensitive screen, and user interface buttons.

Main system 22 generates interactive content for use by the user at the vehicle. The interactive content can include a wide variety of information including, for example, product information. The main system previously receives the interactive content from associated business server 20. Telematic control unit 26 sends the interactive content via gateway 14. Wireless communication module 34 wirelessly receives the interactive content from gateway 14. Processor 30 presents the received interactive content to the motorist via user interface 38. The content is presented visually, audibly, or using a combination of both. Using telematic control unit 26, the user can select from the offered content (products or services) directly related to the broadcasted radio content.

The interactive content is related to broadcasted radio content and the specific circumstances of the user. Main system 22 obtains information related to the broadcasted radio content, such as broadcast time schedule, from the business system. The main system determines what interactive content to send based on the radio station the motorist is listening to, and where to send the interactive content based on the vehicle's location. This information is obtained from the vehicle's telematic control unit. Likewise, main system 22 obtains financial account information from the user, which in turn is used to authorize purchases. The resulting system provides the user with a variety of options with respect to making purchases based on the interactive content presented over the radio. For example, if a user hears a song on the radio and requests to purchase that CD, the user can request to purchase one and have the cost charged to his/her account number and delivered to an address on file. Alternatively, the user could authorize purchase of the CD but, desiring to pick it up as soon as possible, could have the transaction completed at the nearest music store, so that the purchased product is waiting for pickup. In still another embodiment, the user drives vehicle 24 to a fast download site. The download site (i.e., hot spot) is a location that has enhanced data channel communication to vehicle 24, thereby allowing for a greater amount of data to be downloaded in a shorter period of time. The hot spot includes a wireless communications component capable of communicating wireless data transmission content at a much greater capacity to a vehicle in close proximity.

The telematic control unit's wireless communication module 34 is capable of sending and receiving both voice and data wirelessly to gateway 14. The wireless gateway is in direct communication with network 12. When a motorist or passenger makes a selection related to the presented interactive content, wireless communication module 34 sends a request in the form of a message to process a transaction to wireless gateway 14, such as a request to purchase an item. The wireless gateway directs the request to main system 22 for processing. The wireless gateway facilitates communication between a wireless network (e.g., cellular telephone network) and other networks. Bridges, routers, and switches are components of others systems that may be used to connect different networks. Main system 22 determines if the user message is associated with a bank transaction, a business transaction, or both. The main system communicates with bank server 18 for completing a bank transaction, such as verifying a user's credit card, account information and address. Once the transaction is completed, main system 22 sends confirmation back to vehicle 24 via wireless gateway 14.

In one example, if the user selects to purchase an item (e.g., a sub sandwich) that is included in a commercial advertisement radio broadcast, the GPS receiver sends the user's current vehicle location and trajectory information to main system 22 via network 12. The vehicle location is checked against the business transaction server to locate the nearest establishment associated with the broadcasted content. Furthermore, a timestamp is used in determining the estimated time of arrival (ETA) with respect to that establishment. A confirmation of the transaction and the location of the establishment are sent back to the user interface.

Referring now to FIG. 73, an illustrative routine for the operation of telematic control unit 26 utilizing main system 22 to send and retrieve information relating to monetary transactions and radio broadcast content via the Internet is described. First, at block 60, the telematic control unit 26 receives the radio broadcast signal. Typically, the radio broadcast signal originates from a radio tower in analog form and is transmitted to a radio receiver in vehicle 24. At block 62, information related to the radio broadcast is determined. In this step, the main system determines the radio broadcast channel information associated with the vehicle. This may be accomplished by sending radio broadcast channel information from the telematic control unit to the main system. The main system uses radio broadcast channel information to determine what information is related to the radio broadcast of interest to the vehicle user. At block 64, the main system 22 sends information content related to the radio broadcast to telematic control unit 26 via gateway 14. The information content is a function of what the radio station is broadcasting and the businesses that are participating in the system. Next, at block 66, if the user makes a selection pertaining to any of the information content presented by telematic control unit 26, the telematic control unit sends information related to the user's selection as well as vehicle information to main system 22 via a wireless communication link. The information sent from the telematic control unit to the main system can include vehicle location and trajectory, a request to perform a transaction, or a request for more information concerning broadcast content. The wireless communication link may include a cellular station, a satellite dish, or other wireless communication system, which provides access to network 12.

At block 68, main system 22 searches a database to process the request for more information related to the broadcasted content, or to process the request to perform a monetary transaction. In an alternative embodiment, main system 22 can send information about content to be broadcast in the near future, for example, the title of songs that will be broadcast in the next 15 minutes. This information is sent to the telematic control unit's cache memory to be displayed in a timely fashion. The telematic control unit discards the cache information in the event the user switches radio stations or frequencies.

At block 70, main system 22 retrieves textual or audio information related to the processed request and returns the results to telematic control unit 26. At block 72, the telematic control unit presents the received results, which includes a digest of information about the broadcast requested, confirmation results of any monetary transaction, and directions to a requested site or any other information generated by main system 22. The digest of information can be displayed on the telematic control unit's display, or the vehicle radio's display. The telematic control unit can also present results aurally.

In one example, a user in a vehicle listening to music wishes to request more information about the music, or wishes to purchase a CD of the playing music. For instance, the song "Candy" is playing on the radio. The display on telematic control unit 26 shows "Candy Everybody . . . " after related information is received from main system 22 via the network and the gateway. The user can request more information, by either pressing a button or uttering a keyword or phrase. For example, the user says "song information." The microphone receives these words, after which telematic control unit 26 digitizes the received words and delivers them to main system 22 for voice processing. Alternatively, the content may have already been downloaded and is simply played to the user. The telematic control unit either responds aurally and/or displays the textual information: "Candy Everybody Wants by 10,000 Maniacs, CD $7.00, in stock" that is received from main system 22. The user can further request to purchase the CD by either pressing a button or uttering a keyword. Once the user says "Purchase," the telematic control unit sends a request to the server via the network. The server processes the request to purchase the CD by contacting the CD production company using the user's financial service company to complete the transaction. The telematic control unit verbally responds or displays a confirmation, for example: "Your confirmation code is CM1234. The CD will be sent to your address on file."

In another example, a user listens to an advertisement for a sandwich restaurant, the user can purchase a sub from the sandwich restaurant by either pressing a button or uttering a keyword, for example: "Buy jumbo club." The request is sent to the server via the Internet, and telematic control unit 26 responds or displays: "The nearest subway location is about 0.7 miles off exit 167 and has a drive-through. Would you like to buy your club sandwich at that location for $1.99?" The user can then purchase the sandwich, by either pressing a button or uttering "Purchase." Once the user selects to purchase the sandwich, a request is sent to the server via network 12, which processes the request and returns an order number. The telematic control unit displays or responds: "Your order number is 57."

Continuing with FIG. 73, at block 72, telematic control unit 26 displays results of a request or a confirmation of a monetary transaction. At block 74, main system 22 determines if the user selected a request for more information or a monetary transaction. As previously described, a user can request for more information or a monetary transaction related to the broadcast by either pressing a button or uttering a keyword or phrase. If it is determined that a user selected a request for a transaction (whether monetary or for more information) at block 74, the request is sent over a wireless communication link to main system 22 for processing. If, at block 74, it is determined the user did not select to process any requests, then the logic continues to decision block 76 to determine if the user has turned off the telematic control unit. If it is determined that the user wishes to continue receiving radio broadcast signals, then the logic returns to the beginning, where another radio broadcast signal is received and processed accordingly. If, at block 76, it is determined the user has turned off the telematic control unit, the process ends at block 78.

In an alternate embodiment, the vehicle is equipped with a TV receiver and the broadcast content is television. In this embodiment, the vehicle user or passenger can interact with the system in a similar manner as outlined above.

In still another embodiment, the processor in the vehicle performs voice recognition processing of the voice request to generate textual representation of the recorded request. The processor in the vehicle then sends the textual representation of the recorded request to the server. See A SYSTEM AND METHOD TO ASSOCIATE BROADCAST RADIO CONTENT WITH A TRANSACTION VIA AN INTERNET SERVER Ser. No. 09/884,854.

A preferred embodiment of the present invention provides a system and method for automatically looking up and storing a telematics server phone number that is proximate to the telematics control unit. As shown in FIG. 81, a telematics control unit (TCU) 20 is shown in wireless communication with a telematics server 32 over a cellular or mobile system 30. TCU 20 includes a mobile phone 22, local storage or memory 24, a processor 26, and a global positioning system (GPS) 28. A phone number database 34 is coupled to telematics server 32.

When TCU 20 is activated or requires connection to telematics server 32, processor 26 retrieves a telematics server phone number from memory 24 based on GPS information received from GPS 28. The processor 26 retrieves a number that allows TCU 20 to establish a local connection. However, if processor 26 determines that no phone number in memory 24 corresponds to the GPS information, the processor places a call over mobile phone 22 to a default server phone number, thereby connecting TCU 20 to telematics server 32 via cell system 30. Upon connection with telematics server 32, processor 26 generates a request that is sent to the telematics server requesting that the telematics server provide a local phone number based on GPS information that the processor sends along with the request. The telematics server then retrieves a phone number from phone number database 34 based on the request and the GPS information associated with the request that are sent from TCU 20. Telematics server 32 then transmits the retrieved phone number to TCU 20. TCU 20 then cancels the present call that is placed and places a second call to the phone number that was received from telematics server 32. The phone number that is received from telematics server 32 is also stored in local memory 24 by processor 26.

FIG. 82 illustrates a flow diagram performed by the system illustrated in FIG. 81. First, at block 100, processor 26 finds a local phone number in telematics unit memory 24 based on the vehicle's present GPS coordinates as generated by GPS 28. At decision block 102, the process determines if processor 26 found a phone number that corresponds to the GPS coordinates. If processor 26 found a phone number that corresponds to the GPS coordinates, TCU 20 places a call using the corresponding number (see block 104), and TCU/server communication begins. If no phone number was found in memory 24 that corresponds to the GPS coordinates, processor 26 calls a default number and delivers the vehicle GPS coordinates and a request for a local number to a device associated with the default number (see block 106). The device associated with the default number is most likely a telematics server 32 that is not local to the vehicle. Next, at block 108, device or server 22 associated with the default number retrieves a phone number associated with a server that corresponds to the delivered vehicle GPS coordinates. At block 110, server 32 sends the retrieved phone number to telematics unit 20. Then, at block 112, the telematics unit stores the sent number based on a region or location. And, finally, processor 26 places a call to the phone number sent from server 32.

In an alternate embodiment, the process described above is used to find a local Internet Service Provider number for a mobile computer or personal data assistant. In this embodiment, the server either uses caller-identification information or information entered by the user to determine the user's location.

In another embodiment, a user calls an Automatic Speech Recognition (ASR) system and speaks their location (city and state or zip code). The ASR system converts the spoken location information into location data and sends the location data to a telematics server. The telematics server retrieves a local phone number based on the location and returns the local phone number to the ASR. The ASR converts the local number into spoken word that is sent to the user.

In still another embodiment, multiple phone numbers are retrieved simultaneously from the telematics server 32. The multiple phone numbers might be those numbers that correspond to a known route that the user frequently travels, a planned route, or for a given region (i.e., geographic, area code, or prefix). These factors for retrieving multiple phone numbers are determined by interpreting GPS information or performing speech recognition processing of recorded speech information and comparing the determined location to stored information pertaining to the user, such as stored frequent trip information, or stored planned route information.

Some or all of the functions performed by server 32 and database 34 can be distributed across a public or private data network.

While a preferred embodiment of the invention has been illustrated and described, as noted above, many changes can be made without departing from the spirit and scope of the invention. For example, while a preferred embodiment has been described specifically with reference to a system and method for wirelessly connecting a telematics control unit to a server, the invention contemplates application using any computing device, presently known or unknown, including but not limited to mobile computers (such as laptop computers or wearable computers), personal data assistants, and smart telephones. Accordingly, the scope of the invention is not limited by the disclosure of a preferred embodiment. See LOCAL PHONE NUMBER LOOKUP AND CACHE Ser. No. 10/059,893.

By way of overview of embodiments of A preferred embodiment of the present invention, a remote station is associated with a first communicator configured to communicate over a first communication network and a second communicator configured to communicate over a second communication network. A communication controller is associated with the remote station and coupled with the first communicator and the second communicator. The communication controller is operable to transmit a first set of signals using the first communicator a second set of signals using the second communicator. A mobile network access point is directable to within a communication range of the second communicator of the remote station when the remote station is outside of an existing communication range of the second communication network and the first set of signals includes a resource request for the second communication network, as illustrated in FIG. 91.

FIG. 92 is a block diagram of a communication system 200 used by a remote station according to an embodiment of A preferred embodiment of the present invention. At a core of the communication system 200 is a communication controller 210 which controls the receipt and transmission of information as will be further described below. Coupled with the communication controller 210 is a telephone interface 220, such as a telephone handset, which provides a user of the remote station with verbal communication capabilities. The telephone interface 220 accesses a primary communicator 230 through the communication controller 210. The communication system 200, through the configuration shown in FIG. 92, provides for the possibility of typical wireless cellular telephone communication between a user at the remote station and individuals or services with telephone access.

Unlike a typical wireless telephone system, however, the communication controller 210 is also in communication with other devices. The communication controller 210 receives input from a global positioning system unit (GPS) 240. The GPS unit 240, using known technology, is operable to determine the geographic position of the remote station and provide that information to the communication controller 210. The GPS unit 240 can be configured to determine and provide such information continually, at regular intervals, or upon demand based on a command received from the communication controller.

The communication controller 210 also receives information from a monitoring device 250. The monitoring device 250 can be in one of any number of forms depending on the nature of the remote station. For example, if the remote station is an automobile, the monitoring device 250 may be an automobile monitoring computer. The automobile monitoring computer can be configured to monitor the operation of the automobile's systems. If the automobile monitoring system detects that a fault is about to occur or has occurred, the automobile monitoring computer can relay that information to the communication controller 210. Alternatively, if the remote station is an individual wearing or carrying the communication system 200, the monitoring device 250 can be a physiological monitoring device, such as a heart monitor, blood pressure monitor, respiration monitor, blood glucose monitor, another monitoring device or some combination of such devices. These physiological monitoring devices can provide the individual with continual, regular, or as-requested updates as to his or her physical condition, and the communication system 200 can relay that update to medical personnel. Similarly, if the physiological monitoring devices should detect an unusual or alarming situation, the physiological monitoring devices can alert the individual to that situation, or can alert medical personnel to that situation using the communication system 200.

The communication controller 210 is also coupled with an alert key 260. The alert key 260 may be in the nature of a "panic button" familiar to users of home burglar/fire alarms, automobile alarms, and emergency medical alert devices. Pressing the alert key 260 can direct the communication controller 210 to transmit an emergency signal to relevant emergency personnel. For example, if the communication system 200 is deployed in an automobile, pressing of the alert key 260 can connect the user with a service operator from whom specific assistance can be requested. For another example, if the communication system 200 is worn or carried by an individual, pressing the alert key may open a direct line to an emergency medical operator to send emergency medical assistance to the individual.

The communication controller 210 effects remote communication using the primary communicator 230 and a secondary communicator 270. Both the primary communicator 230 and the secondary communicator 270 preferably are transceivers capable of two-way communication. To provide conventional wireless telephone service as previously described, at least one of the primary communicator 230 and the secondary communicator 270 must provide bidirectional communication. In one presently preferred embodiment, the primary communicator 230 is used to support conventional wireless communication, while the secondary communicator 270 is used for other communication. In the presently preferred embodiment, the secondary communicator 270 is a transceiver capable of bidirectional communication, although the secondary communicator 270 could be solely a transmitter to transmit telemetry over a second network.

FIG. 93 illustrates a situation 300 showing how the communication system 200 (FIG. 92) can be used to facilitate greater communication with a remote station. In many respects, the situation 300 is similar to that of the conventional situation 100 (FIG. 91). As shown in FIG. 93, the remote station is associated with an automobile 310. Again, for purposes of this illustration, it is presumed that the automobile 310 has suffered mechanical failure. The automobile 310 is equipped with a communication system 200 having both a primary communicator 230 and a secondary communicator 270. The primary communicator is configured to communicate with a first communication network 320. The automobile 310 is within communication range 330 of the first communication network 230. Thus, an operator of the automobile 310 is able to call for assistance via the primary communicator 230 and the first communication network 320. Because of bandwidth limitations or protocol incompatibilities, the automobile 310 cannot communicate additional information over the first network 320. Also unfortunately, as in the conventional situation 100, the automobile 310 is outside of communication range 350 of the second network 340. It will be appreciated that, although the communication ranges 330 and 350 are depicted in FIG. 93 as being associated with the first communication network 320 and the second communication network 340, the communication range could be depicted as being associated with the automobile 310 relative to the first communication network 320 and the second communication network 340.

However, unlike the first situation 100 (FIG. 91), in the situation 300 using an embodiment of A preferred embodiment of the present invention the second communication network can be extended to facilitate communication with the automobile 310. When a service request is made from the automobile 310 via the primary communicator 230 over the first network 320, GPS data generated by the GPS unit 240 and basic fault information received from the monitoring device 250 is included in the transmission. In this case, the monitoring device 250 can be presumed to be an automobile monitoring computer. Having received the basic fault information from the call placed using the first communicator 230, the service network determines whether additional communication with the second communicator 270 will assist in the resolving the problem. If additional telemetry from the second communicator will aid in resolution of the problem, the service network dispatches a service vehicle 360 equipped with a mobile access point 370 toward the automobile 310 to effect communication with the secondary communicator 270 (FIG. 92). Once the mobile access point 370 of the service vehicle 360 is in communication range 380 with the automobile 310, additional data and/or telemetry can be received from the communication system 200 associated with the automobile 310. Receiving this telemetry at a distance from the automobile 310 can allow for further diagnostics to be performed on the automobile. Alternatively or additionally, if the automobile 310 is still drivable, travel instructions directing how the automobile 310 can travel to within the communication range 350 of the second communication network 340 or the communication range 380 of the mobile access point 370 can be transmitted via the first communicator 230 to facilitate establishing communication between the automobile 310 via the second communication network 340 or the mobile access point 370.

Having communication with the automobile 310 provides a number of possible advantages. To name one possible advantage, if the problem can be corrected with a software adjustment, the software adjustment can be effected by transmission from the mobile access point 370 while neither the driver of the automobile 310 nor the driver of the service vehicle 360 loses time while waiting for the service vehicle 360 to physically reach the automobile. Also, additional diagnostics made possible by the telemetry permitted through advanced communication between the automobile 310 and the service vehicle 360 may indicate that parts or services are needed to rectify the situation that are not available from the service vehicle. In such a case, the appropriate parts are services can be sought and/or dispatched before the service vehicle 360 reaches the automobile. At a minimum, time can be saved if the telemetry allows the problem to be diagnosed without having to wait for the service vehicle 360 to actually reach the automobile to commence the diagnostic process.

Advantages of a system permitting for flexible deployment and/or extension of such a communication network extend to many contexts. To name one example, when the remote station is worn or carried by an individual and the monitoring device 250 (FIG. 92) is a heart monitor, lives can be saved. If medical technicians or supervisory medical technicians can receive additional information about a patient who has suffered a cardiac episode before arriving on the scene, how the patient might be treated can be planned in advance and specialized services can be dispatched as desired. Also, if the remote station is a news crew desiring more bandwidth to relay information about a breaking story, a wireless access point 370 dispatched to within communication range of the remote station can allow for the information to be broadcast over a media outlet or, at least, be broadcast sooner.

Similar applications can aid rescue workers on land and at sea, law enforcement officers, military personnel, and others who can benefit from an on-demand/as needed geographical extension of a network. For example, a primary communicator 230 (FIG. 92) might be a satellite telephone incapable of providing sufficient bandwidth for appropriate telemetry. Dispatch of a mobile access point 370 can provide the desired coverage in that area. Likewise, a bandwidth increase within an area where insufficient bandwidth is currently available can be useful. For example, in the event of a natural disaster, relief workers might need more wireless bandwidth than is supported by the infrastructure of the affected area. Dispatch of a mobile access point 370 can provide the bandwidth desired in the affected area. Applications such as these and others can benefit from expandable wireless networking.

FIG. 94 is a block diagram of a mobile access point 400 according to an embodiment of A preferred embodiment of the present invention that might be associated with a service vehicle 360 (FIG. 93) or other movable carrier. The wireless access point 400 includes a transceiver 410 with which the mobile access point 400 can communicate with a remote station 310 (FIG. 93) upon reaching communication range of the second communicator 270 (FIG. 92). The transceiver 410 and the second communicator 270 could provide communications over an alternative cellular telephone band. Alternatively, the transceiver 410 could be a wireless 802.011 network protocol transceiver, or another form of wireless transceiver configured to wirelessly communicate with the second communicator 270.

Coupled with the wireless transceiver 410 is a suitable logging device 420 for recording the telemetry or other communication received via the wireless transceiver 410 from a remote station. The logging device 420 can then rebroadcast data received from the wireless transceiver 410 to a support network using a relay transmitter 430. The relay transmitter 430 suitably is a proprietary band transmitter or another device to permit relay communication to a network. It will be appreciated that, instead of rebroadcasting communication received from the wireless transceiver 410, communication received might be diagnosed by a suitably equipped logging device 420. In either case, whether data that can benefit the remote station is received via the relay transmitter 430 or generated locally, data that can assist the remote station is transmitted to the remote station via the wireless transceiver 410.

In addition, the mobile access point 400 preferably is equipped with a GPS unit 440 for determining a present position of the mobile access point 400 to aid in locating the remote station that is sought. Similarly, the mobile access point 400 is equipped with a wireless telephone 450 for communicating with a dispatcher, the remote station, or others who can assist with resolving issues arising at the remote station. Because the GPS unit 440 and wireless telephone 450 are not involved in transmitting location information, service requests, or other data as transmitted by the remote station, the GPS unit 440 and the wireless telephone 450 can be separate from the transceiver 410, logging device 420, and relay station.

FIG. 95 is a flowchart of a routine 500 according to an embodiment of A preferred embodiment of the present invention. The routine 500 begins at a block 502. At a block 504, a call is initiated concerning a situation at the remote station via the first communicator/first network. At a block 506, the communication controller 210 (FIG. 92) causes a first set of signals including location information and other information regarding the situation at the remote station to be transmitted via the first communicator 230 (FIG. 92) over the first network 320 (FIG. 93). At a decision block 508, it is determined if use of the second network is desired to facilitate transmission of additional information from the remote station. If not, the routine 500 skips ahead to a block 524 for resolution of the objective of the original transmission initiated at the block 504. On the other hand, if it is determined at the decision block 508 that the second network should be used to facilitate further communication from the remote station, at a decision block 510 it is determined if the remote station is within existing communication range of the second network. If so, the routine 500 continues at the block 518 with the communication controller causing additional information to be transmitted from the remote station over the second network. If not, the routine 500 continues at a block 512 with a service provider dispatching a mobile access point to or toward the location of the remote station. At a block 514, the mobile access point travels toward the location of the remote station. At a decision block 516 it is determined if the mobile access point is in communication range of the remote station. If not, the routine 500 loops to the block 514 and the wireless access point continues traveling to the remote station location. If so, at the block 518 the communication controller causes additional information to be transmitted between the remote station over the second network.

At a block 520, additional information is received from the remote station. At a decision block 522, it is determined if all information desired from the remote station has been received. If not, the routine 500 loops to the block 520 for additional information to be received from the remote station. If so, the routine 500 continues at the block 524 where the objective of the original transmission initiated at the block 504 is resolved. Resolution can occur with the transmission of corrective data or the dispatch and arrival of appropriate assistance. Alternatively, resolution may occur solely from added coverage and/or bandwidth of the second network being implemented to facilitate additional communication. The routine 500 ends at a block 526. It will be appreciated that the routine 500 repeats as often as desired upon events arising at a remote station that may make extension of the second network desirable through deployment of the wireless access point.

Using a preferred embodiment of the present invention, resources can be sought from the second network directly without making a determination as to the need for requesting such resources. Seeking resources from the second communication network could be made automatically or as a default upon the remote station having to make a transmission or having to make a transmission of a certain nature. See SYSTEM AND METHOD FOR DYNAMICALLY CONFIGURING WIRELESS NETWORK GEOGRAPHIC COVERAGE OR SERVICE LEVELS Ser. No. 10/440,023.

A preferred embodiment of the present invention provides a system, method, and computer program product for modulating output over output devices (e.g., display, speakers) based on present vehicle conditions (e.g., speed, rate of change in speed or direction, emergencies). When the system determines that the vehicle requires a more attentive operator, the method of A preferred embodiment of the present invention manipulates the format of information and content presented to the vehicle operator via the output devices.

FIG. 101 shows a system 20, a telematics control unit, within a vehicle that performs A preferred embodiment of the present invention. System 20 includes a user interface 22 having a microphone 24 for capturing the user's voice; a display 26; speakers 28; and an interface entry 30 for allowing the user to perform various interactive functions. System 20 also includes a processor 32; a global positioning system (GPS) 34 for determining precise vehicle locations; and a communications device 36, such as a cellular modem, for transmitting and receiving wireless information. System 20 is also coupled to receive information from other vehicle systems (not shown), such as a speedometer, an engine, or a braking system.

FIG. 102 illustrates a preferred process performed by system 20. At block 60, system 20 and, more specifically, processor 32, receives presentation content. The presentation content is preferably received at communications device 36 from a server transmitted over a network (not shown). At decision block 62, processor 32 determines if any vehicle emergency condition exists based on information received from the other vehicle systems. If processor 32 determines that a vehicle emergency condition exists, processor 32 stops all output of received presentation content to any one of the components of user interface 22 (block 64). Examples of a vehicle emergency condition that may cause the processor to stop output presentation content to user interface 22 are signals received from the engine that indicate engine overheating or a signal that indicates the operator has applied brakes to the point where an anti-braking system is activated.

If, at decision block 62, processor 32 determines that there is not a vehicle emergency condition, processor 32 receives vehicle condition information (block 66). The vehicle condition information comes from a number of sources that generate signals, such as GPS 34 or a speedometer. At block 68, processor 32 outputs presentation content through user interface 22 based on the vehicle condition information. This step involves determining the substance and format of the presentation content to display on display 26 or broadcast on speakers 28 of user interface 22. For example, when the vehicle is parked, processor 32 presents all or nearly all of the received presentation content. As the vehicle condition changes, for example, the vehicle picks up speed, processor 32 changes the presentation content information that is shown on display 26. The change in presentation content may also involve shifting presentation of information from visual display to audio broadcast as output through speakers 28. In one example, the presented content is a full detailed map of the vehicle's location that includes directions to a previously requested destination. Based on the vehicle speed, or the rate of change in vehicle speed or direction, the detail shown on the map will be altered. As the vehicle speed increases, the detail shown on the map is reduced, for example, to include only the vehicle's present location in relation to nearby streets or intersections. Some or all of the presentation content, or map directions, may be translated to audio format and broadcast to the vehicle operator via speakers 28. In other examples, change in vehicle condition may result in alteration of the font or size of text, icons and graphics presented on the display, as well as increased or decreased audio broadcast. FIG. 103 illustrates an example, based on vehicle speed, of how processor 32 changes the output that is presented over user interface 22.

After blocks 64 and 68, processor 32 returns to block 60 to continue receiving more presentation content. In this embodiment, presentation content is processed in real-time from the time of reception from the server over the network to the output of presentation content to a vehicle operator through user interface 22. In an alternate embodiment, the presentation content can be received all at one time and stored by processor 32 before any determination is made of how to present the output. In another alternate embodiment, if a person other than the vehicle operator wishes to view the presentation content, presented output is set to whatever level of detail is desired.

FIG. 103 illustrates an example of the process performed at block 68 of FIG. 102. At block 80, vehicle speed information is determined, for example by reference to the vehicle speedometer. If the vehicle's speed is less than or equal to 25 mph, processor 32 generates a detailed display to present on display 26 of user interface 22 (block 82). As the speed of the vehicle increases, the amount of detailed visual information generated for display is reduced. Thus, if the vehicle speed is greater than 25 mph but less than or equal to 40 mph, processor 32 generates a display with less visual information than was generated for vehicle speeds of less than or equal to 25 mph (block 84). When the speed is greater than 40 mph but less than or equal to 70 mph, processor 32 reduces not only the amount of detail to be displayed on display 26, but also increases the font size of any text included in the displayed presentation content and changes the color to make it easier for an operator to view (block 86). When the speed is greater than 70 mph, processor 32 stops generating display information for presentation on display 26 and switches to a pure audio presentation for output over the speakers 28 (block 88). The specific speed ranges described are exemplary only. The exact trigger speeds may vary according to various factors, such as road conditions, vehicle specification, vehicle operator skill, etc., as well as user preference. Likewise, the output format of the presentation content may be varied according to user interface hardware or software constraints as well as user preference.

In addition to the example described above with reference to overall vehicle speed, presentation content can be automatically adjusted based upon one or more vehicle conditions related to rate of change in vehicle speed, rate of change in vehicle direction, cellular phone or headphone activation, radar detector activation, noise level decibels above a certain value, radio/CD player in use, TV/DVD console in use, turn signal, etc. The vehicle conditions are determined by vehicle systems, such as the vehicle speedometer, steering, engine, and braking and acceleration systems. Vehicle systems may also include additional components, such as temperature, humidity, wind speed and precipitation gauges, a compass, clock, etc. These additional vehicle system components may be integrated with or separate from system 20, so long as they are capable of being monitored by system 20. The method of A preferred embodiment of the present invention automatically adjusts the output of presentation content based upon a monitor of these vehicle conditions, or a combination of these vehicle conditions. For example, system 20 monitors vehicle braking and acceleration systems with reference to an internal clock to determine the rate of change of vehicle speed. If vehicle speed is increasing or decreasing rapidly, system 20 automatically reduces the amount of detail provided in visual presentation content, and may transfer some or all of the content to audio presentation. In another example, system 20 monitors movement of the steering wheel and vehicle direction with reference to a compass and a clock to determine rate of change of vehicle direction. If vehicle direction is changing rapidly, system 20 would again automatically reduce the amount of detail provided in visual presentation content, as well as transfer some or all of the content to audio presentation.

FIG. 104 illustrates a vehicle system 120, a telematics control unit, that performs an alternate embodiment of A preferred embodiment of the present invention. Vehicle system 120 includes a user interface 122 and a processor 124. User interface 122 includes a microphone that receives voice instructions from a user and sends them to processor 124. Processor 124 performs voice processing of the received voice signals. The processor outputs the processed voice signals over speakers or a display that are part of user interface 122. Also, processor 124 sends the processed voice signals to an operator 142 at an operator system 140 over a wireless network 130.

FIG. 105 illustrates a process performed by system 120 shown in FIG. 104. First, at block 210, the user inputs voice instructions to system 120 (processor 124) via user interface 122. Next, at block 212, processor 124 performs voice recognition processing on the received voice instructions to determine the content of the inputted instructions. The result of the voice recognition processing is presented to the user via user interface 122 in the form of voice over speakers or text on a display (block 214). If processor 124 has interpreted the inputted voice instructions properly, as shown in decision block 216, the user instructs system 120 to send the processed instructions to a predefined destination (block 218). The predefined destination is preferably a system server. Otherwise, the user has the opportunity to contact a human operator to make sure the instructions are properly entered (decision block 220). If the user decides to contact the human operator, a digest of the interaction between the user and processor 124 is sent to human operator system 140 (block 222). Then, at block 224, the user is connected to the human operator who is tending a phone and/or computer terminal. At this point the user and human operator resolve the content of the user-initiated instructions. If at the decision block 220 the user does not approve of the presented voice instructions or desire to be connected to a human operator, the user can return to providing new voice instructions (block 210).

In an alternate embodiment, processor 124 processes a received voice instruction based on previously recorded prior processing of the same voice instruction. For example, at five previous episodes, the user provided a certain voice instruction about a restaurant. Processor 124 made a first determination as to what the user requested for each of the five episodes. In the first four of the five episodes, the user desired directions to the restaurant. In the fifth episode, the user desired stock information about the publicly traded company by the same name that owns the restaurant. The approved results (four directions; one stock information) of the processed voice instruction are recorded at processor 124 with the voice instruction for each episode. The next time the user provides that same voice instruction, processor 124 uses the previously recorded approved results when processing the voice instruction. Various methods of using the previously recorded approved results can be performed. In a first method, the most frequent recorded result becomes the result of the newly provided specific voice instruction. So, using the example above, directions are provided to the user, because the recorded results show requests for directions to the restaurant (as opposed to requests for stock information) occurring more frequently. In a second method, the most recent recorded result becomes the result of the newly provided specific voice instruction. So, using the example above, stock information is provided to the user, because the last recorded result was stock information.

With respect to the first four episodes described above, processor 124 processed the voice instruction as either a request for directions or as a request for something other than directions. If the voice instruction was processed as a request for directions, the user approves of the processing, and the resulting request for directions to the restaurant is recorded with the voice instruction for the episode. If the voice instruction was processed as a request for something other than directions, the user makes a request that processor 124 provide directions, thereby indicating that the processing of the voice instructions was incorrect. The user can indicate that the processing was incorrect (and in this example that directions were desired) in a number of different ways. One way to make a change request is to contact a human operator (decision block 220 of FIG. 105). The human operator makes the change for that episode, and the change is recorded. Another way is to make a subsequent voice instruction requesting processor 124 to reinterpret the original voice instruction. Once the voice instruction has changed to a request for directions and the user approves of the change, the result of directions to the restaurant is recorded with the voice instruction for that episode.

While preferred embodiments of the invention have been illustrated and described, as noted above, many changes can be made without departing from the spirit and scope of the invention. For example, as noted above, the trigger event or threshold used to determine the output format of presentation content, as well as the specific output format, might vary according to different factors as well as user preference. Accordingly, the scope of the invention is not limited by the disclosure of a preferred embodiment. Instead, the invention should be determined entirely by reference to the claims that follow. See REAL-TIME DISPLAY OF SYSTEM INSTRUCTIONS Ser. No. 10/076,874.

The present invention provides a system, method, and computer program product for performing noise reduction in speech. The system includes a processing component 20 electrically coupled to a microphone 22, a user interface 24, and various system components 26. If the system shown in FIG. 121 is implemented in a vehicle, examples of some of the system components 26 include an automatic door locking system, an automatic window system, a radio, a cruise control system, and other various electrical or computer items that can be controlled by electrical commands. Processing component 20 includes a speech preprocessing component 30, a speech recognition engine 32, a control system application component 34, and memory (not shown).

Speech preprocessing component 30 performs a preliminary analysis of whether speech is included in a signal received from the microphone 20, as well as performs noise reduction of a sound signal that includes speech. If speech preprocessing component 30 determines that the signal received from microphone 22 includes speech, then it performs noise reduction of the received signal and forwards the noise-reduced signal to speech recognition engine 32. The process performed by speech preprocessing component 30 is illustrated and described below in FIGS. 122 and 123. When speech recognition engine 32 receives the signal from speech preprocessing component 30, the speech recognition engine analyzes the received signal based on a speech recognition algorithm. This analysis results in signals that are interpreted by control system application component 34 as instructions used to control functions at a number of system components 26 that are coupled to processing component 20. The type of algorithm used in speech recognition engine 32 is not the primary focus of the present invention, and could consist of any number of algorithms known to the relevant technical community. The method by which speech preprocessing component 30 filters noise out of a received signal from microphone 22 is described below in greater detail.

FIG. 122 illustrates a process for performing spectrum noise subtraction according to one embodiment of the present invention. At block 40, a sampling or estimate of noise is obtained. One embodiment for obtaining an estimate of noise is illustrated in FIG. 123 and, in an alternate embodiment, described below. At block 42, the obtained estimate of noise is subtracted from the input signal (i.e., the signal received by microphone 22 and sent to processing component 20). At block 44, the prediction of the result of the subtraction from block 42 is generated. The prediction is preferably generated using a linear prediction-coding algorithm. When a prediction is performed on a signal that includes speech and noise, the result is a signal that includes primarily speech. This is because a prediction performed on the combined signal will enhance a highly correlative signal, such as speech, and will diminish a less correlated signal, such as noise. At block 46, the prediction signal is sent to the speech recognition engine for processing.

In an alternate embodiment, a prediction of the input signal is generated prior to the subtraction of the obtained noise estimate. The result of this subtraction is then sent to speech recognition engine 32.

FIG. 123 illustrates a process performed in association with the process shown in FIG. 122. At block 50, a base threshold energy value or estimated noise signal is set. This value can be set in various ways. For example, at the time the process begins and before speech is inputted, the threshold energy value is set to an average energy value of the received signal. The initial base threshold value can be preset based on a predetermined value, or it can be manually set.

At decision block 52, the process determines if the energy level of received signal is above the set threshold energy value. If the energy level is not above the threshold energy value, then the received signal is noise (estimate of noise) and the process returns to the determination at decision block 52. If the received signal energy value is above the set threshold energy value, then the received signal may include noise. At block 54, the process generates a predictive signal of the received signal. The predictive signal is preferably generated using a linear predictive coding (LPC) algorithm. An LPC algorithm provides a process for calculating a new signal based on samples from an input signal. An example LPC algorithm is shown and described in more detail below.

At block 56, the predictive signal is subtracted from the received signal. Then, at decision block 58, the process determines if the result of the subtraction indicates the presence of speech. The result of the subtraction generates a residual error signal. In order to determine if the residual error signal shows that speech is present in the received signal, the process determines if the distances between the peaks of the residual error signal are within a preset frequency range. If speech is present in the received signal, the distance between the peaks of the residual error signal is in a frequency range that indicates the vibration time of ones vocal cords. An example frequency range (vocal cord vibration time) for analyzing the peaks is 60 Hz-500 Hz. An autocorrelation function determines the distance between consecutive peaks in the error signal.

If the subtraction result fails to indicate speech, the process proceeds to block 60, where the threshold energy value is reset to the level of the present received signal, and the process returns to decision block 52. If the subtraction result indicates the presence of speech, the process proceeds to block 62, where it sends the received signal to a noise reduction algorithm, such as that shown in FIG. 122. The estimate of noise used in the noise reduction algorithm is equivalent to the set or reset threshold energy value. At block 64, the result of the noise reduction algorithm is sent to a speech recognition engine. Because noise is experienced dynamically, the process returns to the block 54 after a sample period of time has passed.

The following is an example LPC algorithm used during the step at blocks 44 and 54 to generate a predictive signal. Defining as an estimated value of the received signal x(n−k) at time n, can be expressed as:

$$\overline{x(n)} = \sum_{k=1}^{K} a(k) * x(n-k)$$

The coefficients a(k), k=1, . . . , K, are prediction coefficients. The difference between x(n) and $\overline{x(n)}$ is the residual error, e(n). The goal is to choose the coefficients a(k) such that e(n) is minimal in a least-squares sense. The best coefficients a(k) are obtained by solving the following K linear equation:

$$\sum_{k=1}^{K} a(k) * R(i-k) = R(i),$$

for $i = 1, \ldots, K$ where R(i), is an autocorrelation function:

$$R(i) = \sum_{n=i}^{N} x(n) * x(n-i),$$

for $i = 1, \ldots, K$

These sets of linear equations are preferably solved using the Levinson-Durbin recursive procedure technique.

The following describes an alternate embodiment for obtaining an estimate of noise value $\overline{N(k)}$ when speech is assumed or determined to be present.

A phoneme is the smallest, single linguistic unit that can convey a distinction in meaning (e.g., m in mat; b in bat). Speech is a collection of phonemes that, when connected together, form a word or a set of words. The slightest change in a collection of phonemes (e.g., from bat to vat) conveys an entirely different meaning. Each language has somewhere between 30 and 40 phonemes. The English language has approximately 38.

Some phonemes are classified as voiced (stressed), such as /a/, /e/, and /o/. Others are classified as unvoiced (unstressed), such as /f/ and /s/. For voiced phonemes, most of the energy is concentrated at a low frequency. For unvoiced phonemes, energy is distributed in all frequency bands and looks to a recognizer more like a noise than a sound. Like unvoiced phonemes, the signal energy for unvoiced sounds (such as the hiss when an audio cassette is being played) is also lower than voiced sound.

FIG. 124 illustrates the recognizer's representation of the phrase "Wingcast here" in the time domain. It appears that unvoiced sounds are mostly noise. When the input signal is speech, the following occurs to update the noise estimate.

If the part of the speech being analyzed is unvoiced, we conclude that $$\overline{N(k)} = 0.75 * Y(k)$$

Where Y(k) is the power spectral energy of the current input window data. An example size of a window of data is 30 milliseconds of speech. If the part of the speech being analyzed is voiced, then $\overline{N(k)}$ remains unchanged.

With voiced sounds, most of the signal energy is concentrated at lower frequencies. Therefore, to differentiate between voiced and unvoiced sounds, we evaluate the maximum amount of energy, EF1, in a window of 300 Hz in intervals between 100 Hz and 1,000 Hz. This is the equivalent of evaluating the concentration of energy in the First Formant. We compare EF1 with the total signal energy (ETotal), that is, we define Edif as equal to:

$$Edif = \frac{EF1}{ETotal}$$

If Edif is less than $\alpha$, then we can conclude that the part of speech being analyzed is unvoiced. In our implementation, $\alpha=0.1$. This algorithm for classifying voiced and unvoiced speech works with 98% efficiency.

When the input data is not speech, then the noise estimated $\overline{N(k)}$ is equal to $Y(k)$. When the input data is speech, if the signal window being analyzed is unvoiced, then we conclude that $$\overline{N(k)}=0.75*Y(k)$$

The estimated energy spectra of the desired signal is given as $$\overline{S(k)}=Y(k)-0.5*\overline{N(k)}$$

This operation is followed by a return in the time domain using IFT. This algorithm works well because $\overline{N(k)}$ is updated regularly. The noise estimated $\overline{N(k)}$ above is then used in the process shown in FIG. 122. The classification of voiced and unvoiced speech is preferably performed in the frequency domain, the signal subtraction also is performed in the frequency domain. Before the signal is sent to the speech recognition engine it is returned to the time domain. See NOISE REDUCTION SYSTEM AND METHOD Ser. No. 10/024,446.

While preferred embodiments of the invention have been illustrated and described, as noted above, many changes can be made without departing from the spirit and scope of the invention. In particular, while many of the embodiments have perhaps maximum utility in the context of telematics, they may also be utilized in other contexts.

The embodiments of the invention in which an exclusive property or privilege is claimed are defined as follows:

1. A method comprising:
   receiving, with an electronic device, a voice signal from a source over a network;
   determining, with the electronic device, a destination address included in the received signal;
   determining, with the electronic device, a signal processing algorithm from a plurality of signal processing algorithms based on the determined address;
   processing, with the electronic device, the voice signal according to the determined algorithm; and
   sending, with the electronic device, the processed signal to the destination address.

2. The method of claim 1, wherein determining the processing algorithm comprises finding in memory a signal processing algorithm that is associated with the determined destination address.

3. The method of claim 1, further comprising:
   determining the originator of the voice signal, if the determined destination is a human recipient; and
   if the determined originator is a computer-based system, alerting the recipient that the voice signal is from a computer-based system.

4. A computer-based device comprising:
   a receiver configured to receive a voice signal from a source over a network;
   a processor configured to determine a destination address included in the received signal, determine a signal processing algorithm from a plurality of signal processing algorithms based on the determined address, and process the voice signal according to the determined algorithm; and
   a transmitter configured to send the processed signal to the destination address.

5. The device of claim 4, further comprising memory configured to store addresses with an associated signal processing algorithm, wherein the processing component finds in memory a signal processing algorithm that is associated with the determined destination address.

6. The device of claim 4, further comprising an alert component configured to alert the recipient that the voice signal is from a computer-based system, if the source is a computer-based system.

7. An apparatus comprising:
   a receiver configured to receive a voice signal from a source over a network;
   means for determining a destination address included in the received signal;
   means for determining a signal processing algorithm from a plurality of signal processing algorithms based on the determined address;
   means for processing the voice signal according to the determined algorithm; and
   means for sending the processed signal to the destination address.

* * * * *